(12) United States Patent
Hayes

(10) Patent No.: US 7,220,815 B2
(45) Date of Patent: May 22, 2007

(54) SULFONATED ALIPHATIC-AROMATIC COPOLYESTERS AND SHAPED ARTICLES PRODUCED THEREFROM

(75) Inventor: Richard Allen Hayes, Brentwood, TN (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 352 days.

(21) Appl. No.: 10/631,880

(22) Filed: Jul. 31, 2003

(65) Prior Publication Data
US 2005/0027098 A1    Feb. 3, 2005

(51) Int. Cl.
*C08G 63/02*    (2006.01)

(52) U.S. Cl. .................. 528/272; 264/176.1; 264/219; 428/411.1; 524/445

(58) Field of Classification Search ............. 264/176.1, 264/219; 428/411.1; 524/445; 528/271, 528/272
See application file for complete search history.

(56) References Cited

U.S. PATENT DOCUMENTS

| | | | |
|---|---|---|---|
| 3,563,942 A | 2/1971 | Heiberger | |
| 3,634,541 A | 1/1972 | Popp et al. | |
| 3,779,993 A | 12/1973 | Kibler et al. | |
| 4,104,262 A | 8/1978 | Schade | |
| 4,328,333 A * | 5/1982 | Barbee et al. | 528/301 |
| 4,340,519 A | 7/1982 | Kotera et al. | |
| 4,390,687 A | 6/1983 | Tung | |
| 4,476,189 A | 10/1984 | Posey et al. | |
| 5,171,308 A | 12/1992 | Gallagher et al. | |
| 5,171,309 A | 12/1992 | Gallagher et al. | |
| 5,219,646 A | 6/1993 | Gallagher et al. | |
| 5,295,985 A | 3/1994 | Romesser et al. | |
| 5,936,045 A | 8/1999 | Warzelhan et al. | |
| 6,018,004 A | 1/2000 | Warzelhan et al. | |
| 6,046,248 A | 4/2000 | Warzelhan et al. | |
| 6,114,042 A | 9/2000 | Warzelhan et al. | |
| 6,201,034 B1 | 3/2001 | Warzelhan et al. | |
| 6,258,924 B1 | 7/2001 | Warzelhan et al. | |
| 6,297,347 B1 | 10/2001 | Warzelhan et al. | |
| 6,342,304 B1 | 1/2002 | Buchanan et al. | |
| 6,368,710 B1 | 4/2002 | Hayes | |
| 6,746,779 B2 * | 6/2004 | Hayes et al. | 428/480 |
| 2003/0036626 A1 | 2/2003 | Hayes et al. | |
| 2003/0088033 A1 | 5/2003 | Shelby et al. | |

FOREIGN PATENT DOCUMENTS

| WO | WO 01/19909 A1 | 3/2001 |
|---|---|---|
| WO | WO 02/16468 A1 | 2/2002 |

OTHER PUBLICATIONS

PCT International Search Report for International application No. PCT/US2004/024463, dated Nov. 30, 2004.

* cited by examiner

*Primary Examiner*—Terressa Boykin
(74) *Attorney, Agent, or Firm*—Gail A. Dalickas; Barry Dale Cash

(57) ABSTRACT

Sulfonated aliphatic-aromatic copolyesters and articles made therefrom, and processes for producing the sulfonated aliphatic-aromatic copolyesters and articles are provided. Articles that can be made from the sulfonated aliphatic-aromatic copolyesters include films, coatings and laminates. Some of the compositions and articles are biocompostable. The films can further be used to form shaped articles such as sheets, food packaging such as sandwich wraps, thermoformed containers, and coatings for, for example, films and other substrates. The sulfonated aliphatic-aromatic copolyesters are derived from copolyesters produced from aliphatic-aromatic copolyesters formed from an aromatic dicarboxylic acid component, an aliphatic dicarboxylic acid component, a first glycol component consisting of 1,4-butanediol, a second glycol component, and optionally, a polyfunctional branching agent.

98 Claims, No Drawings

SULFONATED ALIPHATIC-AROMATIC COPOLYESTERS AND SHAPED ARTICLES PRODUCED THEREFROM

FIELD OF THE INVENTION

The present invention is directed to certain sulfonated aliphatic-aromatic copolyesters, and to shaped articles made from the copolyesters.

BACKGROUND OF THE INVENTION

The inadequate treatment of municipal solid waste that is being put in landfills and the increasing addition of nondegradable materials, including plastics, to municipal solid waste streams are combining to drastically reduce the number of landfills available and to increase the costs of municipal solid waste disposal. While recycling of reusable components of the waste stream is desirable in many instances, the costs of recycling and the infrastructure required to recycle materials is sometimes prohibitive. In addition, there are some products that do not easily fit into the framework of recycling. The composting of non-recyclable solid waste is a recognized and growing method to reduce solid waste volume for landfilling and/or making a useful product from the waste to improve the fertility of fields and gardens. One of the limitations to marketing such compost is the visible contamination by undegraded plastic, such as film or fiber fragments.

It is desired to provide components that are useful in disposable products and are degraded into less contaminating forms under the conditions typically existing in waste composting processes. These conditions can include temperatures up to about 70 degrees C., averaging in the 55–60 degrees C. range, humid conditions as high as 100 percent relative humidity, and exposure times ranging from weeks to months. It is further desirable to provide disposable components that will not only degrade aerobically/anaerobically in composting, but will continue to degrade in the soil or landfill. In the presence of water, it is desirable that the components further break down into low molecular weight fragments, which can be ultimately biodegraded by microorganisms into biogas, biomass, and liquid leachate, as occurs with naturally occurring organic materials such as wood.

Articles for which biodegradable materials are desirable include films and sheets. Biodegradable films are well known and are described, for example, by Wielicki, in U.S. Pat. No. 3,602,225, which discloses the use of barrier films comprising plasticized, regenerated cellulose films. Comerford, et. al., in U.S. Pat. No. 3,952,347, disclose biodegradable films comprising a non-biodegradable matrix, such as poly(vinyl alcohol), and about 40 to 60 weight percent of a biodegradable material, such as starch.

Polyesters are known for use in biodegradable articles. The biodegradable polyesters can be described as belonging to three general classes: aliphatic polyesters, aliphatic-aromatic polyesters and sulfonated aliphatic-aromatic polyesters.

Sulfonated aliphatic-aromatic polyesters are polyesters derived from a mixture of aliphatic dicarboxylic acids and aromatic dicarboxylic acids and, in addition, have incorporated therein a sulfonated monomer, such as a salt of 5-sulfoisophthalic acid. Heilberger, in U.S. Pat. No. 3,563,942, discloses aqueous dispersions of solvent soluble linear sulfonated aliphatic-aromatic copolyesters having incorporated therein from 0.1 to 10 mole percent of a sulfonated aromatic monomer. Popp, et. al., in U.S. Pat. No. 3,634,541, disclose fiber-forming sulfonated aliphatic-aromatic copolyesters that include 0.1 to 10 mole percent of xylylene sulfonated salt monomers. Kibler, et. al., in U.S. Pat. No. 3,779,993, disclose linear, water-dissipatable sulfonated aliphatic-aromatic copolyesters that include 2 to 12.5 mole percent of a sulfonated monomer.

Gallagher, et. al., in U.S. Pat. No. 5,171,308, discloses compostable sulfonated aliphatic-aromatic copolyesters and films made therefrom. However, the disclosed compositions have an undesirably low biodegradation rate. Warzelhan, et. al., in U.S. Pat. No. 6,018,004, U.S. Pat. No. 6,114,042, and U.S. Pat. No. 6,201,034, disclose certain sulfonated aliphatic-aromatic copolyester compositions and their use for substrate coatings, films, and foams. The relatively high level of aliphatic dicarboxylic acid incorporated in the exemplified composition results in a crystalline melting point of 92° C. Thus, some known sulfonated aliphatic-aromatic copolyester materials do not have the desired balance of properties, including a relatively high crystalline melting point and a relatively high level of crystallinity and crystallization rate, for some end uses of polyesters, particularly in films. As disclosed in WO 02/16468 A1, blends have been used in order to provide optimized film physical properties. As one skilled in the art would appreciate, the use of polymeric blends necessarily complicates the processes used to produce films, coatings, and laminates.

A higher level of crystallinity and crystallization rate than possessed by known sulfonated aliphatic-aromatic copolyesters would allow simplified production processes, such as a reduction of film sticking during the formation of polymeric films and faster mold cycle times in the production of molded shaped articles. Such compositions that are biodegradable are also desired.

SUMMARY OF THE INVENTION

The present invention provides sulfonated aliphatic-aromatic copolyesters having incorporated therein predominantly 1,4-butanediol as the glycol component. The sulfonated aliphatic-aromatic copolyesters of the present invention, which have a lower content of aliphatic dicarboxylic acid component than some known sulfonated aliphatic-aromatic copolyesters, offer an enhanced degree of crystallinity as compared to some known sulfonated aliphatic-aromatic copolyesters. In preferred embodiments, the relatively higher crystalline melting points and crystallinity levels of the sulfonated aliphatic-aromatic copolyesters disclosed herein allow for increased heat deformation temperature in articles formed therefrom.

One aspect of the present invention is a sulfonated aliphatic-aromatic copolyester comprising 94.9 to 40.0 mole percent of an aromatic dicarboxylic acid component, 5.0 to 50.0 mole percent of an aliphatic dicarboxylic acid component, 0.1 to 5.0 mole percent of a sulfonate component, 100.0–90.0 mole percent of a first glycol component consisting essentially of 1,4-butanediol, 0 to 5.0 mole percent of a second glycol component, and 0 to 5.0 mole percent of a polyfunctional branching agent. In some embodiments, the sulfonated aliphatic-aromatic copolyesters contain fillers.

Another aspect of the invention provides processes for producing sulfonated aliphatic-aromatic copolyesters. In a preferred embodiment the process includes: providing a reaction mixture of an aromatic dicarboxylic acid component, an aliphatic dicarboxylic acid component, a sulfonate component, and a first glycol component consisting essentially of 1,4-butanediol; and allowing the reaction mixture to polymerize to form a sulfonated aliphatic-aromatic copolyester comprising 94.9 to 40.0 mole percent of the aromatic dicarboxylic acid component, 5.0 to 50.0 mole percent of the aliphatic dicarboxylic acid component, 0.1 to 5.0 mole percent of the sulfonate component, and 100.0–90.0 mole percent of the 1,4-butanediol. In some preferred embodiments, the process also includes providing a second glycol component such that the copolyester contains up to 5.0 mole percent of the second glycol component. In some preferred embodiments, the process includes providing a polyfunctional branching agent such that the copolyester contains up to 5 mole percent of the branching agent.

A further aspect of the present invention is a shaped article formed from sulfonated aliphatic-aromatic copolyesters. The sulfonated aliphatic-aromatic copolyesters comprise 94.9 to 40.0 mole percent of an aromatic dicarboxylic acid component, 5.0 to 50.0 mole percent of an aliphatic dicarboxylic acid component, 0.1 to 5.0 mole percent of a sulfonate component, 100.0–90.0 mole percent of a first glycol component consisting essentially of 1,4-butanediol, 0 to 5.0 mole percent of a second glycol component, and 0 to 5.0 mole percent of a polyfunctional branching agent. Shaped articles include film, sheets, fiber, melt blown containers, molded parts, such as cutlery, foamed parts, polymeric melt extrusion coatings on substrates, and polymeric solution coatings on substrates. In some embodiments, the sulfonated aliphatic-aromatic copolyesters contain fillers.

A further aspect of the invention provides processes for producing shaped articles from sulfonated aliphatic-aromatic copolyesters.

Another aspect of the present invention is a film made from a sulfonated aliphatic-aromatic copolyester comprising 94.9 to 40.0 mole percent of an aromatic dicarboxylic acid component, 5.0 to 50.0 mole percent of an aliphatic dicarboxylic acid component, 0.1 to 5.0 mole percent of a sulfonate component, 100.0–90.0 mole percent of a first glycol component consisting essentially of 1,4-butanediol, 0 to 5.0 mole percent of a second glycol component, and 0 to 5.0 mole percent of a polyfunctional branching agent. In some embodiments, the films of the sulfonated aliphatic-aromatic copolyesters contain fillers.

In some preferred embodiments, the films are oriented. In some embodiments, the films contain fillers. In some embodiments, the films are laminated onto substrates. In other embodiments, the films are coated onto substrates.

A further aspect of the invention is a laminate structure that includes a film, comprising a sulfonated aliphatic-aromatic copolyester laminated onto a substrate. The film comprises 94.9 to 40.0 mole percent of an aromatic dicarboxylic acid component, 5.0 to 50.0 mole percent of an aliphatic dicarboxylic acid component, 0.1 to 5.0 mole percent of a sulfonate component, 100.0–90.0 mole percent of a first glycol component consisting essentially of 1,4-butanediol, 0 to 5.0 mole percent of a second glycol component, and 0 to 5.0 mole percent of a polyfunctional branching agent. In some embodiments, the laminated sulfonated aliphatic-aromatic copolyesters are used in a package. In some embodiments of laminate structures, the sulfonated aliphatic-aromatic copolyesters contain fillers.

A further aspect of the invention is a package comprising a sulfonated aliphatic-aromatic copolyester. The sulfonated aliphatic-aromatic copolyester comprises 94.9 to 40.0 mole percent of an aromatic dicarboxylic acid component, 5.0 to 50.0 mole percent of an aliphatic dicarboxylic acid component, 0.1 to 5.0 mole percent of a sulfonate component, 100.0–90.0 mole percent of a first glycol component consisting essentially of 1,4-butanediol, 0 to 5.0 mole percent of a second glycol component, and 0 to 5.0 mole percent of a polyfunctional branching agent. In some embodiments of packages, the sulfonated aliphatic-aromatic copolyesters contain fillers.

A further embodiment of the present invention includes a package comprising an oriented film comprising a sulfonated aliphatic-aromatic copolyester comprising 94.9 to 40.0 mole percent of an aromatic dicarboxylic acid component, 5.0 to 50.0 mole percent of an aliphatic dicarboxylic acid component, 0.1 to 5.0 mole percent of a sulfonate component, 100.0–90.0 mole percent of a first glycol component consisting essentially of 1,4-butanediol, 0 to 5.0 mole percent of a second glycol component, and 0 to 5.0 mole percent of a polyfunctional branching agent. In some embodiments of packages comprising oriented films, the sulfonated aliphatic-aromatic copolyesters contain fillers.

A further aspect of the present invention is a food package comprising a film laminated onto a substrates. The film contains a sulfonated aliphatic-aromatic copolyester comprising 94.9 to 40.0 mole percent of an aromatic dicarboxylic acid component, 5.0 to 50.0 mole percent of an aliphatic dicarboxylic acid component, 0.1 to 5.0 mole percent of a sulfonate component, 100.0–90.0 mole percent of a first glycol component consisting essentially of 1,4-butanediol, 0 to 5.0 mole percent of a second glycol component, and 0 to 5.0 mole percent of a polyfunctional branching agent. In some embodiments of food packages comprising films, the sulfonated aliphatic-aromatic copolyesters contain fillers. Exemplary substrates include paper, paperboard, inorganic foams, organic foams, and inorganic-organic foams.

A further aspect of the present invention is a film coated onto a substrates. The film contains a sulfonated aliphatic-aromatic copolyesters comprising 94.9 to 40.0 mole percent of an aromatic dicarboxylic acid component, 5.0 to 50.0 mole percent of an aliphatic dicarboxylic acid component, 0.1 to 5.0 mole percent of a sulfonate component, 100.0–90.0 mole percent of a first glycol component consisting essentially of 1,4-butanediol, 0 to 5.0 mole percent of a second glycol component, and 0 to 5.0 mole percent of a polyfunctional branching agent. In some embodiments of films coated onto substrates, the sulfonated aliphatic-aromatic copolyesters contain fillers. Exemplary substrates include paper, paperboard, inorganic foams, organic foams, and inorganic-organic foams.

DETAILED DESCRIPTION

The present invention includes compositions and shaped articles, preferably in the form of films, coatings, and laminates, of certain sulfonated aliphatic-aromatic copolyesters. Also within the scope of the present invention are processes for making the sulfonated aliphatic-aromatic copolyesters. The present invention further provides packages, including disposable food packaging such as, for example, wraps, cups, bowls, and plates, that include the sulfonated aliphatic-aromatic copolyesters. The packages can include the sulfonated aliphatic-aromatic copolyesters in the form of films either alone or on substrates, coatings on substrates, and laminates on substrates. Exemplary substrates include paper, paperboard, inorganic foams, organic foams, and inorganic-organic foams. Packaging containing the sulfonated aliphatic-aromatic copolyesters is particularly useful for foods.

The sulfonated aliphatic-aromatic copolyesters, also referred to herein as "the copolyesters", comprise 94.9 to 40.0 mole percent of an aromatic dicarboxylic acid component; 5.0 to 50.0 mole percent of an aliphatic dicarboxylic acid component; 0.1 to 5.0 mole percent of a sulfonate component; 100.00 to 90.0 mole percent of a first glycol component consisting essentially of 1,4-butanediol; 0 to 5.0 mole percent of an second glycol component; and 0–5.0 mole percent of a polyfunctional branching agent. Percentages as reported herein are based on 100 mole percent of combined dicarboxylic acid components and sulfonate components, and 100 mole percent of combined glycol components and branching agent. Thus, the total molar amount of aromatic dicarboxylic acid component, aliphatic dicarboxylic acid component and sulfonate component is 100 mole percent, and the total molar amount of first glycol component, optional second glycol component, and optional polyfunctional branching agent is 100 mole percent. The use of such molar percentages with regard to polyester compositions is well known to those skilled in the art.

Aromatic dicarboxylic acid components include unsubstituted and substituted aromatic dicarboxylic acid and the lower alkyl esters of aromatic dicarboxylic acids having from 8 carbons to 20 carbons. Examples of suitable diacid moieties include those derived from terephthalates, isophthalates, naphthalates and bibenzoates. Specific examples of desirable aromatic dicarboxylic acid components include terephthalic acid, dimethyl terephthalate, isophthalic acid, dimethyl isophthalate, 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), and mixtures derived therefrom. The term "mixtures derived therefrom", as used herein in reference to a list of components or other items, includes any mixture of two or more items in the list. Preferably, the aromatic dicarboxylic acid component is derived from terephthalate, dimethyl terephthalate, isophthalic acid, dimethyl isophthalate, 2,6-naphthalene dicarboxylic acid, dimethyl-2,6-naphthalate, and mixtures derived therefrom. Essentially any aromatic dicarboxylic acid known can be used. Preferably, the sulfonated polyester compositions contain from 80 to 50 mole percent of the aromatic dicarboxylic acid component.

Aliphatic dicarboxylic acid components include unsubstituted, substituted, linear, and branched, aliphatic dicarboxylic acids and the lower alkyl esters of aliphatic dicarboxylic acids having 2 to 36 carbon atoms. Specific examples of desirable aliphatic dicarboxylic acid components include oxalic acid, dimethyl oxalate, malonic acid, dimethyl malonate, succinic acid, dimethyl succinate, methylsuccinc acid, glutaric acid, dimethyl glutarate, 2-methylglutaric acid, 3-methylglutaric acid, adipic acid, dimethyl adipate, 3-methyladipic acid, 2,2,5,5-tetramethylhexanedioic acid, pimelic acid, suberic acid, azelaic acid, dimethyl azelate, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, and mixtures derived therefrom. Preferably, the aliphatic dicarboxylic acid component is selected from the group of succinc acid, dimethyl succinate, glutaric acid, dimethyl glutarate, adipic acid, dimethyl adipate and mixtures derived therefrom. Essentially any aliphatic dicarboxylic acid known can be used. Preferably, the sulfonated polyester compositions of the present invention contain from 20 to 50 mole percent of the aliphatic dicarboxylic acid component.

The aliphatic-aromatic sulfonated copolyesters include sulfonate groups. The sulfonate groups can be introduced in aliphatic or aromatic monomers or can be introduced as endgroups. An example of an aliphatic sulfonate component is a metal salt of sulfosuccinic acid. Specific examples of aromatic sulfonate components that can be used as endgroups include the metal salts of 3-sulfobenzoic acid, 4-sulfobenzoic acid, and 5-sulfosalicylic acid. Preferred are sulfonate components wherein the sulfonate salt group is attached to an aromatic dicarboxylic acid, i.e. a dicarboxylic acid containing an aromatic group. The aromatic group can be, for example, benzene, naphthalene, diphenyl, oxydiphenyl, sulfonyidiphenyl, or methylenediphenyl. Preferably, the sulfonate monomer is the residue of a sulfonate-substituted phthalic acid, terephthalic acid, isophthalic acid, or 2,6-naphthalenedicarboxylic acid.

More preferably, the sulfonate component is a metal salt of 5-sulfoisophthalic acid or a lower alkyl ester of 5-sulfoisophthalate. The metal salt can contain monovalent or polyvalent alkali metal ions, alkaline earth metal ions, or other metal ions. Preferred alkali metal ions include sodium, potassium and lithium. However, alkaline earth metals such as magnesium are also useful. Other useful metal ions include transition metal ions, such as, for example, zinc, cobalt or iron. The multivalent metal ions can be useful, for example, when an increase in the melt viscosity of the sulfonated aliphatic-aromatic copolyesters is desired. End use examples where such melt viscosity enhancements can be advantageous include melt extrusion coatings, melt blown containers or film, and foam. As little as 0.1 mole percent of the sulfonate group can influence the property characteristics of the resultant films or coatings. Preferably, the amount of the sulfonate group-containing component is from 0.1 to 4.0 mole percent.

In addition to a first glycol component that consists essentially of 1,4-butanediol, the sulfonated aliphatic-aromatic copolyesters include one or more second glycol components. The term "consists essentially of" is used herein to indicate that the first glycol component is predominantly 1,4-butanediol. Thus, the first glycol component may be entirely 1,4-butanediol, or may have minor amounts of other components and/or additives. The term "1,4-butanediol" when used herein with regard to components of the sulfonated aliphatic-aromatic copolyesters is intended to refer to the first glycol component that consists essentially of 1,4-butanediol. Preferably, the first glycol component is about 100% 1,4-butanediol. Second glycol components for use in the sulfonated aliphatic-aromatic copolyesters include unsubstituted, substituted, straight chain, branched, cyclic aliphatic, aliphatic-aromatic or aromatic diols having from 2 carbon atoms to 36 carbon atoms. Specific examples of desirable second glycol components include ethylene glycol, 1,3-propanediol, 1,6-hexanediol, 1,8-octanediol, 1,10-decanediol, 1,12-dodecanediol, 1,14-tetradecanediol, 1,16-hexadecanediol, dimer diol, 4,8-bis(hydroxymethyl)-tricyclo[5.2.1.0/2.6]decane, 1,4-cyclohexanedimethanol, isosorbide, di(ethylene glycol), tri(ethylene glycol), poly(alkylene ether)glycols in the molecular weight range of about 500 to about 4000, such as, for example; poly(ethylene glycol), poly(1,3-propylene glycol), poly(1,4-butylene glycol), (polytetrahydrofuran), poly(pentmethylene glycol), poly(hexamethylene glycol), poly(hepthamethylene glycol), poly(ethylene glycol)-block-poly(propylene glycol)-block-poly(ethylene glycol), 4,4'-isopropylidened phenol ethoxylate(Bisphenol A ethoxylate), 4,4'-(1-phenylethylidene) bisphenol ethoxylate(Bisphenol AP ethoxylate), 4,4'-ethylidenebisphenol ethoxylate(Bisphenol E ethoxylate), bis (4-hydroxyphenyl)methane ethoxylate(Bisphenol F ethoxylate), 4,4'-(1,3-phenylenediisopropylidene)bisphenol ethoxylate(Bisphenol M ethoxylate), 4,4'-(1,4-phenylenediisopropylidene)bisphenol ethoxylate(Bisphenol P ethoxylate), 4,4'sulfonyldiphenol ethoxylate(Bisphenol S ethoxylate), 4,4'-cyclohexylidenebisphenol ethoxylate(Bisphenol Z ethoxylate), and mixtures derived therefrom. Essentially any glycol known for use in forming polyesters can be used.

The optional polyfunctional branching agents include any materials having three or more carboxylic acid functions, hydroxy functions or a total of three or more functions comprising a mixture thereof. Specific examples of the desirable polyfunctional branching agent component include 1,2,4-benzenetricarboxylic acid (trimellitic acid), trimethyl-1,2,4-benzenetricarboxylate, 1,2,4-benzenetricarboxylic anhydride, (trimellitic anhydride), 1,3,5-benzenetricarboxylic acid, 1,2,4,5-benzenetetracarboxylic acid, (pyromellitic acid), 1,2,4,5-benzenetetracarboxylic dianhydride(pyromellitic anhydride), 3,3',4,4'-benzophenonetetracarboxylic dianhydride, 1,4,5,8-naphthalenetetracarboxylic dianhydride, citric acid, tetrahydrofuran-2,3,4,5-tetracarboxylic acid, 1,3,5-cyclohexanetricarboxylic acid, pentaerythritol, glycerol, 2-(hydroxymethyl)-1,3-propanediol, 2,2-bis(hydroxymethyl)propionic acid, and mixtures derived therefrom. Essentially any polyfunctional material having three or more carboxylic acid or hydroxyl functions can be used as the polyfunctional branching agent. The polyfunctional branching agent may be desirable, for example, when higher resin melt viscosity is desired for specific end uses, such as melt extrusion coatings, melt blown films or containers, and foams. Preferably, the sulfonated polyester includes 0 to 1.0 mole percent of the polyfunctional branching agent.

The molecular weight of the polyesters is generally not measured directly. Instead, the inherent viscosity of the polymer in solution or the melt viscosity is used as an indicator of molecular weight. As is known to those skilled in the art, the inherent viscosity is an indicator of molecular weight for comparisons of samples within a polymer family, such as poly(ethylene terephthalate), poly(butylene terephthalate), etc., and are used as an indicator of molecular weight herein. To give the desired physical properties, the sulfonated aliphatic-aromatic copolyesters of the present invention preferably have an inherent viscosity (IV) of at least 0.15, as measured on a 0.5 percent (weight/volume) solution of the copolyester in a 50:50 (weight) solution of trifluoroacetic acid:dichloromethane solvent system at room temperature. More preferably, the inherent viscosity of the sulfonated aliphatic-aromatic copolyesters is at least 0.35 dL/g. While the inherent viscosities recited herein are preferred for some applications, higher inherent viscosities are desirable for certain applications, such as, for example, films, bottles, sheet, and molding resin. The polymerization conditions used in producing the sulfonated aliphatic-aromatic copolyesters can be adjusted to obtain the desired inherent viscosities up to at least about 0.5. For some applications, desired inherent viscosities can be higher than 0.65 dL/g. Further processing of the copolyester, according to methods known to those skilled in the art, can provide inherent viscosities of 0.7, 0.8, 0.9, 1.0, 1.5, 2.0 dL/g and even higher.

The aliphatic-aromatic sulfonated copolyesters can be prepared by conventional polycondensation techniques. The copolyester compositions can vary depending upon the method of preparation used, particularly with regard to the amount of diol present within the copolyester. Suitable methods include the reaction of the diol monomers with the acid chlorides. For example, acid chlorides of the aromatic dicarboxylic acid component, acid chlorides of the aliphatic dicarboxylic acid component, and/or acid chlorides of the sulfonate component can be combined with the 1,4-butanediol and the second glycol component in a solvent, such as toluene, in the presence of a base, such as pyridine, which neutralizes hydrochloric acid as it is produced. Such procedures are disclosed, for example, by R. Storbeck, et. al., in *J. Appl. Polymer Science*, Vol. 59, pp. 1199–1202 (1996), the disclosures of which are hereby incorporated herein by reference. Other well-known variations using acid chlorides can also be used, such as the interfacial polymerization method. Alternatively, the monomers can simply be stirred together while heating.

When the polymer is made using acid chlorides, the ratio of the monomer units in the product polymer is about the same as the ratio of reacting monomers. Therefore, the ratio of monomers charged to the reactor is about the same as the desired ratio in the product. A stoichiometric equivalent of the diol components and the diacid components generally can be used to obtain a high molecular weight polymer.

Preferably, the sulfonated aliphatic-aromatic copolyesters are produced using a melt polymerization method. In an exemplary melt polymerization method, the aromatic dicarboxylic acid component, (either as acids, esters, or mixtures thereof), the aliphatic dicarboxylic acid component, (either as acids, esters, or mixtures thereof), the sulfonate component, the 1,4-butanediol, the second glycol component and optionally a polyfunctional branching agent, are combined in the presence of a catalyst at a temperature sufficient that the monomers combine to form esters and diesters, then oligomers, and finally polymers. The temperature depends, in part, on the nature of the components and can be determined by one skilled in the art. The polymerization process produces a molten product. Generally, the second glycol component and the 1,4-butanediol are volatile and distill from the reactor as the polymerization proceeds. Such procedures are known to those skilled in the art.

The melt process conditions used in forming the copolyesters, particularly the amounts of monomers used, depend on the polymer composition that is desired. The amount of 1,4-butanediol, second glycol component, aromatic dicarboxylic acid component, aliphatic dicarboxylic acid component, sulfonate compound and branching agent are desirably chosen so that the polymeric product contains the desired amounts of the various monomer units, desirably with equimolar amounts of monomer units derived from the respective diol and diacid components. Because of the volatility of some of the monomers, especially some of the second glycol components and the 1,4-butanediol component, and depending on such variables as whether the reactor is sealed, (i.e.; is under pressure), the polymerization temperature ramp rate, and the efficiency of the distillation columns used in synthesizing the polymer, it may be preferred that some of the monomers be included in excess at the beginning of the polymerization reaction and removed by distillation as the reaction proceeds, especially with regard to the second glycol component and of the 1,4-butanediol.

The amount of monomers to be charged to the reactor can be determined by one skilled in the art, but often will be within the following ranges. Excesses of the diacid, the 1,4-butanediol component, and the second glycol are often desirably charged, and the excesses of the diacid, the 1,4-butanediol and the second glycol are desirably removed by distillation or other method of evaporation as the polymerization reaction proceeds. 1,4-butanediol is desirably charged at about 10 to 100 percent greater than the amount desired in the copolyester. Preferably, the 1,4-butanediol component is charged at about 20 to 70 percent greater than the amount desired in the copolyester. The second glycol component is desirably charged at about 0 to 100 percent greater than the amount desired in the copolyester, depending on the volatility of the second glycol component.

The width of the ranges given for the monomers is due to the wide variation in the monomer loss during polymerization, depending in turn on the efficiency of distillation columns and/or other recovery and recycle systems, and are only an approximation. The amounts of monomers to be charged to a reactor to achieve a desired composition can be determined by one skilled in the art.

In a preferred polymerization process, the monomers are combined and heated gradually with mixing in the presence of a catalyst or catalyst mixture to a temperature preferably in the range of 230° C. to about 300° C., more preferably 250° C. to 295° C. The conditions and the catalysts used are determined, in part, by whether the diacids are polymerized as true acids or as dimethyl esters. The catalyst can be included initially with the reactants, and/or can be added one or more times to the mixture as it is heated. The catalyst used can be modified as the reaction proceeds. The heating and stirring are continued for a sufficient time and to a sufficient temperature, generally with removal, by distillation, of excess reactants, to yield a molten polymer having a high enough molecular weight to be suitable for making fabricated products.

Catalysts that can be used include salts of Li, Ca, Mg, Mn, Zn, Pb, Sb, Sn, Ge, and Ti, such as acetate salts and oxides, including glycol adducts, and Ti alkoxides. Such catalysts are known, and the catalyst, or combination or sequence of catalysts, used can be selected by a skilled practitioner. The preferred catalyst and preferred conditions for a particular polymerization can vary and depend on, for example, whether the diacid monomer is polymerized as a free diacid or as a dimethyl ester, and the chemical identity of the glycol components. Any catalyst system known for use in polymerization of esters can be used.

The monomer composition of the polymer can be chosen for specific uses and for specific sets of properties. As one skilled in the art will appreciate, the thermal properties observed in the copolyester are a function of the chemical identity and quantity of each component utilized in making the copolyester. Polymers having adequate inherent viscosity for many applications can be made by the melt condensation process described hereinabove. Solid state polymerization can be used to achieve even higher inherent viscosities and higher molecular weights.

After extruding, cooling and pelletizing, the polymer may be substantially noncrystalline. Noncrystalline material can be made semicrystalline by heating it to a temperature above the glass transition temperature for an extended period of time. This induces crystallization so that the product can then be heated to a higher temperature to raise the molecular weight. The semicrystalline polymer can be subjected to solid-state polymerization by placing the pelletized or pulverized polymer into a stream of an inert gas, such as nitrogen, or under a vacuum of 1 Torr, at an elevated temperature but below the melting temperature of the polymer for an extended period of time. Alternatively, the polymer can be crystallized prior to solid-state polymerization by treatment with a relatively poor solvent for polyesters, which induces crystallization. Such solvents reduce the glass transition temperature ($T_g$,) allowing for crystallization. Solvent induced crystallization of polyesters is known, and is described, for example, in U.S. Pat. No. 5,164,478 and U.S. Pat. No. 3,684,766.

The sulfonated aliphatic-aromatic copolyesters can contain and/or be used with known additives. Any additive known for use with polyesters can be used. For some applications, it is preferred that the additives are nontoxic, biodegradable and biobenign. Such additives can include thermal stabilizers, such as, for example, phenolic antioxidants; secondary thermal stabilizers, such as, for example, thioethers and phosphates; UV absorbers, such as, for example benzophenone- and benzotriazole-derivatives; and UV stabilizers, such as, for example, hindered amine light stabilizers (HALS). Other useful additives include plasticizers, processing aids, flow enhancing additives, lubricants, pigments, flame retardants, impact modifiers, nucleating agents to increase crystallinity, antiblocking agents such as silica, base buffers, such as sodium acetate, potassium acetate, and tetramethyl ammonium hydroxide. Suitable additives and their use are disclosed, for example, in U.S. Pat. No. 3,779,993, U.S. Pat. No. 4,340,519, U.S. Pat. No. 5,171,308, U.S. Pat. No. 5,171,309, and U.S. Pat. No. 5,219,646 and references cited therein.

Plasticizers may be desirable to improve processing or mechanical properties, or to reduce rattle or rustle of films, coatings and laminates made from the polyesters. Examples of suitable plasticizers include soybean oil, epoxidized soybean oil, corn oil, castor oil, linseed oil, epoxidized linseed oil, mineral oil, alkyl phosphate esters, Tween® 20, Tween® 40, Tween® 60, Tween® 80, and Tween® 85 plasticizers, sorbitan monolaurate, sorbitan monooleate, sorbitan monopalmitate, sorbitan trioleate, sorbitan monostearate, citrate esters, such as trimethyl citrate and Citroflex® citrates produced by Morflex, Inc., including Citroflex® 2 triethyl citrate, Citroflex® 4 tributyl citrate, trioctyl citrate, Citroflex® A-4 acetyltri-n-butyl citrate, Citroflex® A-2 acetyltri-ethyl citrate, Citroflex® A-6 acetyltri-n-hexyl citrate, and Citroflex® B-6 butyryltri-n-hexyl citrate, tartarate esters, such as dimethyl tartarate; diethyl tartarate, dibutyl tartarate, and dioctyl tartarate, poly(ethylene glycol), derivatives of poly(ethylene glycol), paraffin, monoacyl carbohydrates, such as 6-O-sterylglucopyranoside, glyceryl monostearate, Myvaplex® 600 concentrated glycerol monostearates, Nyvaplex® concentrated glycerol monostearate, Myvacet distilled acetylated monoglycerides of modified fats, e.g., Myvacet® 507 (48.5 to 51.5 percent acetylation), Myvacet® 707, (66.5 to 69.5 percent acetylation), and Myvacet® 908, (minimum of 96 percent acetylation), Myverol®, concentrated glyceryl monostearates, Acrawax®, N,N-ethylene bis-stearamide, N,N-ethylene bis-oleamide, dioctyl adipate, diisobutyl adipate, diethylene glycol dibenzoate, dipropylene glycol dibenzoate, polymeric plasticizers, such as poly (1,6-hexamethylene adipate), poly(ethylene adipate), Rucoflex®, and other compatible low molecular weight polymers and mixtures derived therefrom. Preferably, the plasticizers are nontoxic and biodegradable and/or bioderived.

In addition, the compositions of the present invention can be filled with inorganic, organic and/or clay fillers such as, for example, wood flour, gypsum, talc, mica, carbon black, wollastonite, montmorillonite minerals, chalk, diatomaceous earth, sand, gravel, crushed rock, bauxite, limestone, sandstone, aerogels, xerogels, microspheres, porous ceramic spheres, gypsum dihydrate, calcium aluminate, magnesium carbonate, ceramic materials, pozzolamic materials, zirconium compounds, xonotlite (a crystalline calcium silicate gel), perlite, vermiculite, hydrated or unhydrated hydraulic cement particles, pumice, perlite, zeolites, kaolin, clay fillers including both natural and synthetic clays and treated and untreated clays, such as organoclays and clays that have been surface treated with silanes and stearic acid to enhance adhesion with the copolyester matrix, smectite clays, magnesium aluminum silicate, bentonite clays, hectorite clays, silicon oxide, calcium terephthalate, aluminum oxide, titanium dioxide, iron oxides, calcium phosphate, barium sulfate, sodium carbonate, magnesium sulfate, aluminum sulfate, magnesium carbonate, barium carbonate, calcium oxide, magnesium oxide, aluminum hydroxide, calcium sulfate, barium sulfate, lithium fluoride, polymer particles, powdered metals, pulp powder, cellulose, starch, chemically modified starch, thermoplastic starch, lignin powder, wheat, chitin, chitosan, keratin, gluten, nut shell flour, wood flour, corn cob flour, calcium carbonate, calcium hydroxide, glass beads, hollow glass beads, seagel, cork, seeds, gelatins, wood flour, saw dust, agar-based materials, reinforcing agents, such as glass fiber, natural fibers such as sisal, hemp, cotton, wool, wood, flax, abaca, sisal, ramie, bagasse, and cellulose fibers, carbon fibers, graphite fibers, silica fibers, ceramic fibers, metal fibers, stainless steel fibers, and recycled paper fibers from, for example, repulping operations. Fillers can increase the Young's modulus, improve the dead-fold properties, improve the rigidity of the film, coating or laminate, decrease the cost, and reduce the tendency of a film, coating, or laminate to block or self-adhere during processing or use. The use of fillers has also been found to result in plastic articles having some qualities of paper, such as texture and feel, as disclosed by, for example, Miyazaki, et. al, in U.S. Pat. No. 4,578,296. The additives, fillers or blend materials can be added before the polymerization process, at any stage during the polymerization process or as a post polymerization process. Any filler material known for use in polyesters can be used in the sulfonated aliphatic-aromatic copolyesters.

Suitable clay fillers include natural and synthetic clays, and untreated and treated clays, such as organoclays and clays that have been surface treated with silanes or stearic acid to enhance the adhesion with the copolyester matrix. Specific usable clay materials include, for example, kaolin, smectite clays, magnesium aluminum silicate, bentonite clays, montmorillonite clays, hectorite clays, and mixtures derived therefrom. The clays can be treated with organic materials, such as surfactants, to make them organophilic. Specific commercial examples of usable clay fillers include Gelwhite® and Claytone® clays available from the Southern Clay Company, including Gelwhite® MAS 100 clay (magnesium aluminum silicate), Claytone® 2000 organophilic smectite clay, Gelwhite® L montmorillonite clay from white bentonite clay, Cloisite® clays from the Southern Clay Company, including Cloisite® 30 B organophilic natural montmorillonite clay with bis(2-hydroxyethyl)methyl tallow quarternary ammonium chloride salt, Cloisite® Na natural montmorillonite clay, Garamite® 1958 clay, a commercial product of the Southern Clay Company that is defined as a mixture of minerals; Laponite® RDS synthetic layered silicate with inorganic polyphosphate peptiser, a commercial product of the Southern Clay Company, Laponite® RD synthetic colloidal clay, a commercial product of the Southern Clay Company, Nanomers® clays from the Nanocor Company, including Nanomers® montmorillonite minerals treated with compatibilizing agents, Nanomer 1.24TL montmorillonite mineral surface treated with amino acids, "P Series" Nanomers® surface modified montmorillonite minerals, Polymer Grade (PG) Montmorillonite PGW, Polymer Grade (PG) Montmorillonite PGA clay, Polymer Grade (PG) Montmorillonite PGN clay and Polymer Grade (PG) Montmorillonite PGV clay, commercial products of the Nanocor Company, defined as high purity aluminosilicate minerals (sometimes referred to as phyllosilicates), and mixtures derived therefrom. Any clay filler known for use with polyesters can be used. Some clay fillers can exfoliate during the polymerization to form nanocomposites. This is especially true for the layered silicate clays, such as smectite clays, magnesium aluminum silicate, bentonite clays, montmorillonite clays, hectorite clays. As discussed above, such clays can be natural or synthetic, treated or not.

The particle size of the filler can be selected from a wide range of particle sizes. As one skilled within the art will appreciate, the filler particle size can be tailored for the desired use of the filled copolyester composition. It is generally preferred that the average diameter of the filler be less than about 40 microns, and more preferred that the average diameter of the filler be less than about 20 microns. However, other particle sizes can be used for particular applications. The filler can include particle sizes ranging up to 40 mesh, (US Standard), or larger. Mixtures of filler particle sizes can also be advantageously used. For example, mixtures of calcium carbonate fillers having average particle sizes of about 5 microns and of about 0.7 microns can provide better space filling of the filler within the copolyester matrix than can uniformly sized calcium carbonate particles. Use of two or more filler particle sizes allows for improved particle packing. Two or more ranges of filler particle sizes can be selected such that the spaces between a group of large particles are substantially occupied by a selected group of smaller filler particles. In general, the particle packing is increased whenever a first set of particles is mixed with another set of particles having a particle size that is at least about 2 times larger or smaller than the first group of particles. The particle packing density for a two-particle system is maximized whenever the size ratio of a first set of particles is from about 3 to 10 times the size of a second set of particles. Similarly, three or more different sets of particles can be used to further increase the particle packing density. The optimal degree of packing density depends on a number of factors, such as, for example, the types and concentrations of the various components within both the polymer phase and the solid filler phase, the film, coating or lamination process used, and the desired mechanical, thermal and other performance properties of the products to be manufactured from the polymer. Andersen, et. al., in U.S. Pat. No. 5,527,387, disclose particle packing techniques. Filler concentrates which incorporate a mixture of filler particle sizes based on the above particle packing techniques are commercially available by the Shulman Company as Papermatch® filler concentrates.

The filler can be added at any stage during the polymerization of the components to form the polymer, or after the polymerization is completed. For example, the fillers can be added with the copolyester monomers at the start of the polymerization process. This is preferred with the use of, for example, the silica and titanium dioxide fillers, to provide adequate dispersion of the fillers within the polyester matrix. Alternatively, the filler can be added at an intermediate stage of the polymerization, for example, as the precondensate passes into the polymerization vessel. As yet a further alternative, the filler can be added after the copolyester exits the polymerizer. For example, the copolyester can be melt fed to any intensive mixing operation, such as a static mixer or a single- or twin-screw extruder and compounded with the filler.

As yet a further process for producing filled copolyesters, the copolyester can be combined with the filler in a subsequent postpolymerization process. Typically, such a process involves intensive mixing of the molten copolyester with the filler. The intensive mixing can be provided by, for example, static mixers, Brabender mixers, single screw extruders, and twin screw extruders. In a typical process, the copolyester is dried. The dried copolyester can then be mixed with the filler, or the copolyester and the filler can be cofed through two different feeders. In an extrusion process, the copolyester and the filler can be fed into the back, feed section of the extruder. The copolyester and the filler can be advantageously fed into two different locations of the extruder. For example, the copolyester can be added in the back, feed section of the extruder while the filler is fed, ("side-stuffed"), in the front of the extruder near the die plate. The extruder temperature profile is selected to allow the copolyester to melt under the processing conditions. The screw design is selected to provide stress and, in turn, heat, as it mixes the molten copolyester with the filler. Such processes are disclosed, for example, by Dohrer, et. al., in U.S. Pat. No. 6,359,050. Alternatively, the filler can be blended with the copolyester during the formation of a film or coating, as described below.

The copolyesters can be blended with other polymeric materials, which can be biodegradable or not biodegradable, naturally derived, modified naturally derived or synthetic. Examples of blendable biodegradable materials include sulfonated aliphatic-aromatic copolyesters, such as Biomax® polyesters available from the DuPont Company; aliphatic-aromatic copolyesters, such as Eastar Bio® polyesters available from the Eastman Chemical Company; Ecoflex® polyesters available from the BASF Corporation and EnPol® polyesters available from the Ire Chemical Company; aliphatic polyesters, such as Bionolle® 1001 poly(1,4-butylene succinate), from Showa High Polymer Company; Bionolle® 3001 poly(ethylene succinate) and poly(1,4-butylene adipate-co-succinate, from the Showa High Polymer Company; and EnPol® poly(1,4-butylene adipate), from the Ire Chemical Company; Bionolle®, polymer sold by the Showa High Polymer Company, the Mitsui Toatsu Company, the Nippon Shokubai Company, the Cheil Synthetics Company, the Eastman Chemical Company, and the Sunkyon Industries Company; poly(amide esters), such as for example, Bak® poly(amide esters), sold by the Bayer Company; polycarbonates, such as poly(ethylene carbonate) sold by the PAC Polymers Company; poly(hydroxyalkanoates), such as poly(hydroxybutyrate)s, poly(hydroxyvalerate)s, poly(hydroxybutyrate-co-hydroxyvalerate)s, such as Biopol® polycarbonates sold by the Monsanto Company under the; poly(lactide-co-glycolide-co-caprolactone), for example as sold by the Mitsui Chemicals Company under the grade designations of H100J, S100, and T100; poly(caprolactone), for example, Tone® poly(caprolactones) sold by the Union Carbide Company, and as sold by the Daicel Chemical Company and the Solvay Company; and poly(lactide), for example EcoPLA® poly(lactides) as sold by the Cargill Dow Company and poly(lactides) sold by the Dianippon Company, and mixtures derived therefrom.

Examples of blendable nonbiodegradable polymeric materials include polyethylene, high density polyethylene, low density polyethylene, linear low density polyethylene, ultralow density polyethylene, polyolefins, poly(ethylene-co-glycidylmethacrylate), poly(ethylene-co-methyl (meth) acrylate-co-glycidyl acrylate), poly(ethylene-co-n-butyl acrylate-co-glycidyl acrylate), poly(ethylene-co-methyl acrylate), poly(ethylene-co-ethyl acrylate), poly(ethylene-co-butyl acrylate), poly(ethylene-co-(meth)acrylic acid), metal salts of poly(ethylene-co-(meth)acrylic acid), poly((meth)acrylates), such as poly(methyl methacrylate), poly(ethyl methacrylate), poly(ethylene-co-carbon monoxide), poly(vinyl acetate), poly(ethylene-co-vinyl acetate), poly(vinyl alcohol), poly(ethylene-co-vinyl alcohol), polypropylene, polybutylene, polyesters, poly(ethylene terephthalate), poly(1,3-propyl terephthalate), poly(1,4-butylene terephthalate), PETG, poly(ethylene-co-1,4-cyclohexanedimethanol terephthalate), poly(vinyl chloride), PVDC, poly(vinylidene chloride), polystyrene, syndiotactic polystyrene, poly(4-hydroxystyrene), novalacs, poly(cresols), polyamides, nylon, nylon 6, nylon 46, nylon 66, nylon 612, polycarbonates, poly(bisphenol A carbonate), polysulfides, poly(phenylene sulfide), polyethers, poly(2,6-dimethylphenylene oxide), polysulfones, and copolymers thereof and mixtures derived therefrom.

Examples of blendable natural polymeric materials include starch, starch derivatives, modified starch, thermoplastic starch, cationic starch, anionic starch, starch esters, such as starch acetate, starch hydroxyethyl ether, alkyl starches, dextrins, amine starches, phosphate starches, dialdehyde starches, cellulose, cellulose derivatives, modified cellulose, cellulose esters, such as cellulose acetate, cellulose diacetate, cellulose priopionate, cellulose butyrate, cellulose valerate, cellulose triacetate, cellulose tripropionate, cellulose tributyrate, and cellulose mixed esters, such as cellulose acetate propionate and cellulose acetate butyrate, cellulose ethers, such as methylhydroxyethylcellulose, hydroxymethylethylcellulose, carboxymethylcellulose, methyl cellulose, ethylcellulose, hydroxyethylcellulose, and hydroxyethylpropylcellulose, polysaccharides, alginic acid, alginates, phycocolloids, agar, gum arabic, guar gum, acaia gum, carrageenan gum, furcellaran gum, ghatti gum, psyllium gum, quince gum, tamarind gum, locust bean gum, gum karaya, xanthan gum, gum tragacanth, proteins, Zein® prolamine (derived from corn), collagen, (extracted from animal connective tissue and bones) and derivatives thereof such as gelatin and glue, casein, sunflower protein, egg protein, soybean protein, vegetable gelatins, gluten, and mixtures derived therefrom. Thermoplastic starch can be produced, for example, as disclosed in U.S. Pat. No. 5,362,777. They disclose the mixing and heating of native or modified starch with high boiling plasticizers, such as glycerin or sorbitol, in such a way that the starch has little or no crystallinity, a low glass transition temperature and a low water content. Any compatible polymeric material can be blended with the sulfonated aliphatic-aromatic polyesters.

Polymeric materials to be blended with the copolyester can be added to the copolyester at any stage during polymerization of the components to form the copolyester, or after the polymerization is completed. For example, the polymeric materials can be added with the copolyester monomers at the start of the polymerization process. Alternatively, the polymeric material can be added at an intermediate stage of the polymerization, for example, as the precondensate passes into the polymerization vessel. As yet a further alternative, the polymeric material can be added after the copolyester exits the polymerizer. For example, the copolyester and the polymeric material can be melt fed to any intensive mixing operation, such as a static mixer or a single- or twin-screw extruder, and compounded.

As yet a further process for producing blends of the copolyesters with polymeric materials, the copolyester can be combined with the polymeric material in a subsequent postpolymerization process. Typically, such a process involves intensive mixing of the molten copolyester with the polymeric material. The intensive mixing can be provided by static mixers, Brabender mixers, single-screw extruders, and twin-screw extruders. Typically, the copolyester is dried. The polymeric material can also be dried. The dried copolyester can then be mixed with the polymeric material. Alternatively, the copolyester and the polymeric material can be cofed through two different feeders. In an extrusion process, the copolyester and the polymeric material can be fed into the back, feed section of the extruder. The copolyester and the polymeric material can be advantageously fed into two different locations of the extruder. For example, the copolyester can be added in the back, feed section of the extruder while the polymeric material is fed ("side-stuffed") in the front of the extruder near the die plate. The extruder temperature profile is set up to allow the copolyester to melt under the processing conditions. The screw design also provides stress and, in turn, heat, to the resin as it mixes the molten copolyester with the polymeric material. Alternatively, the polymeric material can be blended with the polyester during the formation films and coatings, as described below.

The sulfonated aliphatic-aromatic copolyesters can be used in forming a wide variety of shaped articles. The shaped articles produced from the sulfonated aliphatic-aromatic copolyesters have greater thermal properties than those of shaped articles produced from known sulfonated aliphatic-aromatic copolyesters. Examples of shaped articles that can be made from the copolyesters include film, sheets, fiber, melt blown containers, molded parts such as cutlery, foamed parts, polymeric melt extrusion coatings onto substrates, and polymeric solution coatings on substrates. Such shaped articles comprising the sulfonated aliphatic-aromatic copolyesters can be made using any known process.

The sulfonated aliphatic-aromatic polyesters are also useful in forming films and other articles, including articles derived from films. Such films are suitable for a variety of uses, such as, for example, in packaging, especially of foodstuffs, adhesives, adhesive tapes, insulators, capacitors, dielectric insulators, photographic development, and x-ray development, and as laminates. For some uses, the heat resistance of the film is an important factor. For such uses, a higher melting point, glass transition temperature, and crystallinity level are desirable to provide better heat resistance and more stable electrical characteristics, along with a rapid biodegradation rate. Further, it is desired that the films have sufficient barrier properties for the intended application, such as, for example, moisture barrier, oxygen barrier and carbon dioxide barrier; grease resistance; as well as tensile strength and a suitably high elongation at break. The monomer composition of the copolyester is preferably chosen to result in a partially crystalline polymer desirable for the formation of film, wherein the crystallinity provides strength and elasticity. As produced, the copolyester is generally semi-crystalline in structure. The crystallinity increases on reheating and/or stretching of the polymer, as occurs in the production of film.

Film can be made from the copolyesters by any known process for forming films. For example, thin films can be formed by dipcoating as disclosed in U.S. Pat. No. 4,372,311, by compression molding as disclosed in U.S. Pat. No. 4,427,614, by melt extrusion as disclosed in U.S. Pat. No. 4,880,592, by melt blowing as disclosed in U.S. Pat. No. 5,525,281, or other known processes. The difference between a film and a sheet is the thickness, but there is no set industry standard as to when a film becomes a sheet. As used herein, a film is 0.25 mm (10 mils) thick or thinner, preferably between about 0.025 mm and 0.15 mm (1 mil and 6 mils). However, thicker films can be formed up to a thickness of about 0.50 mm (20 mils).

Films are preferably formed from the copolyesters by either solution casting or extrusion. Extrusion is particularly preferred for formation of "endless" products, such as films and sheets, which emerge as a continuous length. In extrusion, the polymeric material, whether provided as a molten polymer or as plastic pellets or granules, is fluidized and homogenized. Additives, such as thermal or UV stabilizers, plasticizers, fillers and/or blendable polymeric materials, can be added, if desired. The fluidized polymer is then forced through a suitably shaped die to produce the desired cross-sectional film shape. The extruding force can be exerted by a piston or ram (ram extrusion), or by a rotating screw (screw extrusion), which operates within a cylinder in which the material is heated and plasticized and from which it is then extruded through the die in a continuous flow. Single screw, twin-screw, and multi-screw extruders can be used. Different kinds of dies can be used to produce a variety of products, such as blown film (formed by a blow head for blown extrusions), sheets and strips (formed using slot dies) and hollow and solid sections (formed using circular dies). Films having a variety of widths and thickness can be produced. After extrusion, the polymeric film is taken up on rollers, cooled and taken off by means of suitable devices designed to prevent subsequent deformation of the film.

Using known extruders, film can be produced by extruding a thin layer of polymer over chilled rolls and then further drawing down the film to size by tension rolls. In the extrusion casting process, the polymer melt is conveyed from the extruder through a slot die, (T-shaped or "coat hanger" die). The die can be as wide as 10 feet and typically has thick wall sections on the final lands to minimize deflection of the lips from internal pressure. Die openings can be within a wide range, but 0.015 inch to 0.030 inch is typical. The nascent cast film can be drawn down, and thinned significantly, depending on the speed of the rolls taking up the film. The film is then solidified by cooling below the crystalline melting point or glass transition temperature. Cooling can be accomplished by passing the film through a water bath or over two or more chrome-plated chill rolls that are cored for water cooling. The cast film is then conveyed through nip rolls and a slitter to trim the edges, and then wound up. In cast film, conditions can be tailored to allow a relatively high degree of orientation in the machine direction, especially at high draw down conditions and wind up speeds, and a much lower level of orientation in the transverse direction. Alternatively, the conditions can be tailored to minimize the level of orientation, thus providing films having substantially equivalent physical properties in both the machine direction and the transverse direction. Preferably, the finished film is no more than about 0.25 mm thick. Also preferably, the finished film is at least about 0.015 mm thick. More preferably, the film thickness is from about 0.025 to about 0.15 mm.

Blown film, which is generally stronger and tougher and can be made more rapidly than cast film, is made by extruding a tube. In producing blown film, the melt flow of molten polymer is typically turned upward from the extruder and fed through an annular die having a ring-shaped opening. The melt flows around a mandrel and emerges through the ring-shaped opening in the form of a tube. As the tube leaves the die, internal pressure is applied by the introduction of air through the die mandre, which expands the tube to from about 1.5 to about 2.5 times the die diameter and simultaneously draws the film, causing a reduction in the thickness of the film. The air contained in the bubble cannot escape because it is sealed by the die on one end and by nip rolls (also called pinch rolls) on the other. Desirably, a uniform air pressure is maintained to ensure uniform thickness of the film bubble. The tubular film can be cooled internally and/or externally by directing air onto the film. Faster quenching in the blown film method can be accomplished by passing the expanded film about a cooled mandrel that is situated within the bubble. For example, one such method using a cooled mandrel is disclosed by Bunga, et. al., in Canadian Patent 893,216. If the polymer being used to prepare blown film is semicrystalline, the bubble may become cloudy as it cools below the softening point of the polymer. Drawdown of the extrudate is not essential, but preferably the drawdown ratio is between 2 and 40. The drawdown ratio is defined as the ratio of the die gap to the product of the thickness of the cooled film and the blow-up ratio. Drawdown can be induced by tension from pinch rolls. Blow-up ratio is the ratio of the diameter of the cooled film bubble to the diameter of the circular die. The blow-up ratio can be as great as 4 to 5, but a blow up ratio of 2.5 is more typical. The drawdown induces molecular orientation with the film in the machine direction, (i.e., direction of the extrudate flow), and the blow-up ratio induces molecular orientation in the film in the transverse or hoop direction. The quenched bubble moves upward through guiding devices into a set of pinch rolls, which flattens it. The resulting sleeve can subsequently be slit along one side, providing a larger film width than could be conveniently made via the cast film method. The slit film can be gusseted and surface-treated in line.

Alternatively, a blown film can be produced by more elaborate techniques, such as the double bubble, tape bubble, or trapped bubble processes. The double-bubble process is a technique in which the polymeric tube is first quenched and then reheated and oriented by inflating the polymeric tube above the glass transition temperature (Tg), but below the crystalline melting temperature (Tm), of the polyester, if the polyester is crystalline. The double bubble technique is disclosed, for example, by Pahkle in U.S. Pat. No. 3,456,044.

The conditions used to produce blown film are determined by a combination of factors, such as the chemical composition of the polymer, the amount and type of additives, such as plasticizers, used, and the thermal properties of the polymer. However, the blown film process offers advantages such as relative ease of changing the film width and caliber by changing the volume of air in the bubble and the speed of the screw, the elimination of end effects, and the capability of providing biaxial orientation in the film upon production. Typical film thicknesses from a blown film operation can be in the range of about 0.004 to 0.008 inch and the flat film width can range up to 24 feet or larger after slitting.

For manufacturing large quantities of film, a sheeting calender can be employed. A rough film is fed into the gap of the calender, a machine comprising a number of heatable parallel cylindrical rollers that rotate in opposite directions and spread out the polymer and stretch it to the required thickness. The last roller smoothes the film thus produced. If the film is required to have a textured surface, the final roller is provided with an appropriate embossing pattern. Alternatively, the film can be reheated and then passed through an embossing calender. The calender is followed by one or more cooling drums. Finally, the finished film is reeled Up.

Extruded films can also be used as starting materials for other products. For example, the film can be cut into small segments for use as feed material for other processing methods, such as injection molding. As a further example, the film can be laminated onto a substrate as described below. As yet a further example, the films can be metallized, using known processes. The film tubes available from blown film operations can be converted to bags by, for example, heat-sealing processes. The extrusion process can be combined with a variety of post-extruding operations for expanded versatility. Such post-forming operations include altering round to oval shapes, blowing the film to different dimensions, machining and punching, and biaxial stretching, using processes known to those skilled in the art.

A film can also be made by solution casting, which produces more consistently uniform gauge film than does melt extrusion. Solution casting includes dissolving polymeric granules or powder in a suitable solvent, optionally with any desired formulant, such as a plasticizer or colorant. The solution is filtered to remove dirt and/or large particles, cast from a slot die onto a moving belt, preferably of stainless steel, and dried, whereupon the film cools. The extrudate thickness is five to ten times that of the finished film. The film can then be finished in a like manner to the extruded film. One of ordinary skill in the art can determine appropriate process parameters depending upon the polymeric composition and process used for film formation. The solution cast film can then be subjected to post-formation treatments such as those described for the extrusion cast film.

Multilayer films can also be produced from the copolyesters, such as bilayer, trilayer, and multilayer film structures. One advantage to multilayer films is that specific properties can be tailored into the film to solve critical use needs by incorporating the more costly ingredients into the outer layers where they can have the greatest influence on the properties of the film, while less costly ingredients can be used in inner layers. The multilayer films can be formed by coextrusion, blown film processes, dipcoating, solution coating, blade, puddle, air-knife, printing, Dahlgren, gravure, powder coating, spraying, or other known processes. Generally, multilayer films are produced by extrusion casting processes. In an exemplary process, the polymer is heated in a uniform manner, with other optional materials such as additives, to melt, and the molten polymer and optional other materials are conveyed to a coextrusion adapter that combines the molten materials to form a multilayer coextruded structure. The layered polymeric material is transferred through an extrusion die opened to a predetermined gap, commonly between about 0.05 inch (0.13 cm) and 0.012 inch (0.03 cm). The material is then drawn down to the intended gauge thickness by a primary chill or casting roll typically maintained within the temperature range of about 15 to 55 C, (60–130 F). Typical draw down ratios range from about 5:1 to about 40:1. The layers of a multilayer film can function as barrier layers, adhesive layers, antiblocking layers, and/or for other purposes. Further, for example, the inner layers can be filled and the outer layers can be unfilled, as disclosed in U.S. Pat. No. 4,842,741 and U.S. Pat. No. 6,309,736. Multilayer film production processes are disclosed, for example, in U.S. Pat. No. 3,748,962, U.S. Pat. No. 4,522,203, U.S. Pat. No. 4,734,324, U.S. Pat. No. 5,261,899 and U.S. Pat. No. 6,309,736. El-Afandi, et. al., in U.S. Pat. No. 5,849,374, U.S. Pat. No. 5,849,401, and U.S. Pat. No. 6,312,823, disclose compostable multilayer films with a core poly(lactide) layer, inner layers, and outer layers of blocking reducing layers of aliphatic polyesters.

Thus, multilayer structures can be made that include one or more layers containing the copolyesters, and one or more additional layers. The term "additional layers" is used herein to refer to layers other than a single layer containing the aliphatic-aromatic copolyesters of the present invention. The additional layers can contain the copolyesters and/or other materials that can be biodegradable or not biodegradable. The materials can be naturally derived, modified naturally derived or synthetic. Examples of biodegradable materials suitable as additional layers include biodegradable materials disclosed hereinabove for use in blends. Examples of non-biodegradable polymeric materials suitable as additional layers include non-biodegradable materials disclosed hereinabove for use in blends. Examples of natural polymeric materials suitable as additional layers include natural materials disclosed hereinabove for use in blends. Additional layers can be formed from any suitable material known for use in multilayer structures.

Regardless of how the film is formed, it can be subjected to biaxial orientation by stretching in both the machine and transverse direction after formation. The machine direction stretch is initiated in forming the film simply by rolling out and taking up the film. This inherently stretches the film in the direction of takeup, orienting some of the fibers. Although this strengthens the film in the machine direction, it allows the film to tear easily in the direction at right angles to the machine direction because all of the fibers are oriented in one direction.

Biaxial stretching orients the fibers parallel to the plane of the film, but leaves the fibers randomly oriented within the plane of the film. This provides increased tensile strength, flexibility, toughness and shrinkability, for example, in comparison to non-oriented films. It is desirable to stretch the film along two axes at right angles to each other. This increases tensile strength and elastic modulus in the directions of stretch. It is preferred that the amount of stretch in each direction be substantially equivalent, thereby providing similar properties observed in the film when the film is tested from any direction. However, certain applications, such as those for which a certain amount of shrinkage or greater strength in one direction over another is desired, as in labels or adhesive and magnetic tapes, require uneven, also referred to as uniaxial, orientation of the fibers of the film.

Biaxial orientation can be obtained by any known process. However, tentering is preferred, wherein the material is stretched while heating in the transverse direction simultaneously with, or subsequent to, stretching in the machine direction. The orientation can be performed on available commercial equipment. For example, suitable equipment is available from Bruckner Maschenenbau of West Germany. One example of such equipment operates by clamping on the edges of the sheet to be drawn and, at the appropriate temperature, separating the edges of the sheet at a controlled rate. For example, a film can be fed into a temperature-controlled box, heated above its glass transition temperature and grasped on either side by tenterhooks which simultaneously exert a drawing tension (longitudinal stretching) and a widening tension (lateral stretching). Typically, stretch ratios in the machine direction and longitudinal direction of 3:1 to 4:1 can be employed. Alternatively, and preferably for some commercial purposes, the biaxial drawing process is conducted continuously at high production rates in multi-stage roll drawing equipment, such as that available from Bruckner, whereby the drawing of the extruded film stock takes place in a series of steps between heated rolls rotating at different and increasing rates. When the appropriate combinations of draw temperatures and draw rates are employed, the uniaxial stretching in the machine direction is preferably from about 4 to about 20, more preferably from about 4 to about 10. A biaxially oriented film can further be subjected to additional drawing of the film in the machine direction, in a process known as tensilizing.

Uniaxial orientation can be obtained by stretching the film in only one direction in the same manner as in the above-described biaxial processes, or by directing the film through a machine direction orienter, ("MDO"), such as is commercially available from vendors such as the Marshall and Williams Company of Providence, R.I. The MDO apparatus has a plurality of stretching rollers, which progressively stretch and thin the film in the machine direction, which is the direction of travel of the film through the apparatus.

The appropriate temperature for stretching depends in part on the rate of stretching. Preferably, stretching is carried out at a temperature of at least 10 degrees C. above the glass transition temperature of the polymer in the film and also preferably below the Vicat softening temperature of the polymer, more preferably at least 10 degrees C. below the Vicat softening point.

Orientation can be enhanced in blown film operations by adjusting the blow-up ratio. For example, it is generally preferred to have a BUR of 1 to 5 for the production of bags or wraps. However, the preferred BUR can vary, depending on the balance of properties desired in the machine direction and/or the transverse direction. For a balanced film, a BUR of about 3:1 is generally appropriate. If it is desired to have a "splitty" film, i.e. a film that easily tears in one direction, then a BUR of 1:1 to about 1.5:1 is generally preferred. Shrinkage can be controlled by holding the film in a stretched position and heating for a few seconds before quenching. Heating stabilizes the oriented film, which then can be forced to shrink only at temperatures above the heat stabilization temperature. Further, the film can also be subjected to rolling, calendering, coating, embossing, printing, or any other typical finishing operations. The preferred process conditions and parameters for film making by any method can be determined by a skilled artisan for any given polymeric composition and desired application.

The properties of a film depend on several factors as discussed above, including the polymer composition, the method of forming the polymer, the method of forming the film, and whether the film was treated for stretch or biaxially oriented. These factors affect properties of the film such as shrinkage, tensile strength, elongation at break, impact strength, dielectric strength and constant, tensile modulus, chemical resistance, melting point, and heat deflection temperature. The film properties can be further adjusted by adding additives and fillers to the copolyester composition, such as colorants, dyes, UV and thermal stabilizers, antioxidants, plasticizers, lubricants, antiblock agents, and slip agents, as recited above. Alternatively, the sulfonated aliphatic-aromatic copolyesters can be blended with one or more other polymeric materials to improve certain characteristics, as described above. As disclosed by Moss, in U.S. Pat. No. 4,698,372, Haffner, et. al., in U.S. Pat. No. 6,045, 900, and McCormack, in WO 95/16562, and in U.S. Pat. No. 4,626,252, U.S. Pat. No. 5,073,316, and U.S. Pat. No. 6,359,050, the films, especially the filled films, can be formed microporous, if desired. As is known to those skilled in the art, stretching of a filled film can create fine pores, which allows the film to serve as a barrier to liquids and particulate matter, yet allow air and water vapor to pass through. To enhance the printability (ink receptivity), adhesion or other desirable characteristics, the films can be treated by known, conventional post forming operations, such as, for example, corona discharge, chemical treatments, or flame treatment.

The films are useful in a wide variety of applications. For example, the films can be used as a component of personal sanitary items, such as disposable diapers, incontinence briefs, feminine pads, sanitary napkins, tampons, tampon applicators, motion sickness bags, baby pants, and personal absorbent products. Films comprising the copolyesters combine excellent water barrier properties, to avoid leak through, with excellent toughness to easily conform to the body and to stretch with the body movements during use. After their use, the articles will biocompost when discarded appropriately. As further examples, the films can be used as protective films for agriculture, such as mulch films, seed coverings, agriculture mats containing seeds, ("seed tapes"), garbage and lawn waste bags, adhesive tape substrates, bags, bag closures, bed sheets, bottles, cartons, dust bags, fabric softener sheets, garment bags, industrial bags, trash bags, waste bin liners, compost bags, labels, tags, pillow cases, bed liners, bedpan liners, bandages, boxes, handkerchiefs, pouches, wipes, protective clothing, surgical gowns, surgical sheets, surgical sponges, temporary enclosures, temporary siding, toys, and wipes.

A preferred use of the films comprising the sulfonated aliphatic-aromatic copolyesters is in food packaging, especially for fast food packaging. Specific examples of food packaging uses include fast food wrappers, stretch wrap films, hermetic seals, food bags, snack bags, grocery bags, cups, trays, cartons, boxes, bottles, crates, food packaging films, blister pack wrappers, and skin packaging.

A specific example of a preferred food packaging made from the polyesters is a wrap. Wraps comprising the sulfonated aliphatic-aromatic copolyesters can be used to enclose meats, other perishable items, and especially fast food items, such as, for example, sandwiches, burgers, and dessert items. Desirably, the films of the copolyesters when used as wraps will combine a balance of physical properties, including paper-like stiffness combined with sufficient toughness so as not to tear when used to wrap food items, deadfold characteristics such that once folded, wrapped or otherwise manipulated into the desired shape, the wraps will maintain their shape and not tend to spontaneously unfold or unwrap, grease resistance, where desired. Desirably, the films also provide a moisture barrier, while not allowing for moisture to condense onto food wrapped therein. The wraps can have smooth surfaces or textured surfaces produced by, for example, embossing, crimping, or quilting. The wraps can contain fillers such as, for example, inorganic particles, organic particles, such as starch, and combinations of fillers. The films can be further processed to produce additional desirable articles, such as containers. For example, the films can be thermoformed as disclosed, for example, in U.S. Pat. No. 3,303,628, U.S. Pat. No. 3,674,626, and U.S. Pat. No. 5,011,735. The films can also be used to package foods, such as meats, by vacuum skin packaging techniques, as disclosed, for example, in U.S. Pat. No. 3,835,618, U.S. Pat. No. 3,950,919, U.S. Re 30,009, and U.S. Pat. No. 5,011,735. The films can further be laminated onto substrates, as disclosed below.

The sulfonated aliphatic-aromatic copolyesters are also useful in coatings. Coatings containing the copolyesters can be produced by coating a substrate with a polymer solution, dispersion, latex, or emulsion of the copolyesters by rolling, spreading, spraying, brushing, or pouring processes, followed by drying; by coextruding the copolyesters with other materials; by powder coating onto a preformed substrate, or by melt/extrusion coating a preformed substrate with the copolyester. The substrate can be coated on one side or on both sides. The polymeric coated substrates have a variety of uses, such as in packaging, especially of foodstuffs, and as disposable cups, plates, bowls and cutlery. For some uses, the heat resistance of the coating is an important property and a higher melting point, glass transition temperature, and degree of crystallinity are desirable to provide better heat resistance, along with a desirably rapid biodegradation rate. Further, it may be desired that the coatings provide good barrier properties for moisture, grease, oxygen, and carbon dioxide, and have good tensile strength and a high elongation at break.

Coatings can be made from the copolyesters by any known coating process. For example, thin coatings can be formed by dipcoating as disclosed in U.S. Pat. No. 4,372,311 and U.S. Pat. No. 4,503,098, extrusion onto substrates, as disclosed, for example, in U.S. Pat. No. 5,294,483, U.S. Pat. No. 5,475,080, U.S. Pat. No. 5,611,859, U.S. Pat. No. 5,795,320, U.S. Pat. No. 6,183,814, and U.S. Pat. No. 6,197,380, blade, puddle, air-knife, printing, Dahlgren, gravure, powder coating, spraying, or other known processes. The coatings can be of any thickness, but are preferably about 0.25 mm (10 mils) thick or thinner, more preferably between about 0.025 mm and 0.15 mm (1 mil and 6 mils). However, thicker coatings can be formed, having thicknesses up to about 0.50 mm (20 mils) or greater. Various substrates can be coated directly. The coatings are preferably formed by solution, dispersion, latex, oremulsion casting, by powder coating, or by extrusion of a coating onto a preformed substrate.

Solution casting onto a substrate produces a more consistently uniform gauge coating than melt extrusion. Solution casting processes are described hereinabove with regard to the formation of films. Coatings can be applied to textiles, nonwovens, foil, paper, paperboard, and other sheet materials by continuously operating spread-coating machines. A coating knife, such as a "doctor knife", ensures uniform spreading of the coating (in the form of a solution, emulsion, or dispersion, in water or an organic medium) on the substrate, which is moved along by rollers. The coating is then dried. Alternatively, the polymeric solution, emulsion, or dispersion can be sprayed, brushed, rolled or poured onto the substrate. For example, Potts, in U.S. Pat. No. 4,372,311 and U.S. Pat. No. 4,503,098, discloses coating water-soluble substrates with solutions of water-insoluble materials. U.S. Pat. No. 3,378,424 discloses processes for coating a fibrous substrate with an aqueous polymeric emulsion.

Coatings of the copolyester can also be applied to substrates by powder coating processes. In a powder coating process, the polymer is coated onto the substrate in the form of a powder having a fine particle size. The substrate to be coated can be heated to above the fusion temperature of the polymer and the substrate dipped into a bed of the powdered polymer fluidized by the passage of air through a porous plate. The fluidized bed is typically not heated. A layer of the polymer adheres to the hot substrate surface and melts to form the coating. Coating thicknesses can be in the range of about 0.005 inch to 0.080 inch, (0.13 to 2.00 mm). Other powder coating processes include spray coating, wherein the substrate is not heated until after it is coated, and electrostatic coating. For example, paperboard containers such as cups can be electrostatically spray-coated with a thermoplastic polymer powder, as disclosed in U.S. Pat. No. 4,117,971, U.S. Pat. No. 4,168,676, U.S. Pat. No. 4,180,844, U.S. Pat. No. 4,211,339, and U.S. Pat. No. 4,283,189. The containers are then heated, causing the polymeric powder to melt to form the laminated polymeric coating.

Metal articles of complex shapes can also be coated using a whirl sintering process. The articles, heated to above the melting point of the polymer, are introduced into a fluidized bed of powdered polymer wherein the polymer particles are held in suspension by a rising stream of air, thus depositing a coating on the metal by sintering.

Coatings containing the copolyesters can also be applied by spraying a molten, atomized polymeric composition onto substrates, such as paperboard. Such processes are disclosed for use in applying wax coatings in, for example, U.S. Pat. No. 5,078,313, U.S. Pat. No. 5,281,446, and U.S. Pat. No. 5,456,754, and are adaptable for use in applying coatings of the copolyesters.

In preferred embodiments, coatings of the copolyesters on substrates are formed by melt or extrusion coating processes. Extrusion is particularly preferred for the formation of coated "endless" products, such as coated paper and paperboard, which emerge as a continuous length. Extrusion processes suitable for extrusion coating are described hereinabove with respect to the formation of films. In extrusion coating, the substrate, which can be, for example, paper, foil, fabric, or polymeric film, is compressed together with the extruded polymeric melt by the pressure rolls so that the polymer impregnates the substrate for maximum adhesion. The molten polymer on the substrate is then cooled by the water-cooled, chromium-plated chill rolls. The coated substrate can be then passed through a slitter to trim the edges and taken off by means of suitable devices designed to prevent subsequent deformation of the coated substrate.

Extrusion coating of polyesters onto paperboard is disclosed, for example, in U.S. Pat. No. 3,924,013, U.S. Pat. No. 4,147,836, U.S. Pat. No. 4,391,833, U.S. Pat. No. 4,595,611, U.S. Pat. No. 4,957,578, and U.S. Pat. No. 5,942,295. Kane, in U.S. Pat. No. 3,924,013, discloses the formation of ovenable trays mechanically formed from paperboard previously laminated polyester. Chaffey, et. al., in U.S. Pat. No. 4,836,400, disclose the production of cups formed from paper stock that has been coated with a polymer on both sides. Beavers, et. al., in U.S. Pat. No. 5,294,483, disclose the extrusion coating of certain polyesters onto paper substrates. As a further example of extrusion coating, wires and cable can be sheathed directly with polymeric films extruded from oblique heads.

Calendering processes can also be used to produce coatings on substrates. Calenders can consist of two, three, four, or five hollow rolls arranged for steam heating or water-cooling. Typically, the polymer to be calendered is softened, for example in ribbon blenders, such as a Banbury mixer. Other components can be mixed in, such as plasticizers. The softened polymer is then fed to the rollers and is squeezed into the form of a film. If desired, thicker sections can be formed by applying one layer of polymer onto a previous layer, (double plying). The substrate, such as textile or nonwoven fabric or paper, is fed through the last two rolls of the calender so that the film is pressed into the substrate. The thickness of the laminate is determined by the gap between the last two rolls of the calender. The surface can be made glossy, matte, or embossed. The coated substrate is then cooled and wound up on rolls.

Multiple polymer layers coated onto a substrate can also be produced, such as bilayer, trilayer, and multilayer film structures, as disclosed hereinabove with respect to films. Additional layers can contain the sulfonated aliphatic-aromatic copolyesters or other materials that can biodegradable or not biodegradable, naturally derived, modified naturally derived or synthetic. Examples of biodegradable and non-biodegradable materials suitable as additional layers are disclosed hereinabove with regard to the formation of blends. Also, polymeric materials suitable for use in multi-layer coatings are disclosed hereinabove with regard to the formation of blends.

Generally, the coating is applied to a thickness of between about 0.2 to 15 mils, typically in the range of between 0.5 to 2 mils. The substrates can vary widely in thickness, but a range of about 0.5 to about 24 mils thickness is common. Suitable substrates for coating with the aliphatic-aromatic copolyesters include articles made of paper, paperboard, cardboard, fiberboard, cellulose such as Cellophane® cellulose, starch, plastic, polystyrene foam, glass, metal, for example; aluminum or tin cans, metal foils, polymeric foams, organic foams, inorganic foams, organic-inorganic foams, and polymeric films. Preferred are biodegradable substrates, such as paper, paperboard, cardboard, cellulose, starch, and biobenign substrates such as inorganic and inorganic-organic foams. Polymeric films suitable as substrates can contain the aliphatic-aromatic copolyesters and/or other polymeric materials that are biodegradable or not biodegradable, naturally derived, modified naturally derived or synthetic. Suitable such materials are already disclosed hereinabove.

Organic foams, such as derived from expanded starches and grains, can be used as substrates. Such materials are disclosed, for example, in U.S. Pat. No. 3,137,592, U.S. Pat. No. 4,673,438, U.S. Pat. No. 4,863,655, U.S. Pat. No. 5,035,930, U.S. Pat. No. 5,043,196, U.S. Pat. No. 5,095,054, U.S. Pat. No. 5,300,333, U.S. Pat. No. 5,413,855, U.S. Pat. No. 5,512,090, and U.S. Pat. No. 6,106,753. Specific examples of the materials include; EcoFoam®, a product of the National Starch Company of Bridgewater, N.J., which is a hydroxypropylated starch product, and EnviroFil®, a product of the EnPac Company, a DuPont-Con Agra Company.

Preferred organic-inorganic foams for use as substrates are cellular foams highly filled with inorganic fillers such as, for example, calcium carbonate, clays, cement, or limestone, and having a starch-based binder such as potato starch, corn starch, waxy corn starch, rice starch, wheat starch, tapioca, and a small amount of fiber, as disclosed, for example, by Andersen, et. al., in U.S. Pat. No. 6,030,673. Such materials can be made by mixing the ingredients together, such as limestone, potato starch, fiber and water, to form a batter. The substrate is formed by pressing the batter between two heated molds. The water contained within the batter is turned to steam, raising the pressure within the mold, forming a foamed product. Such foam substrate materials are commercially available in the form of finished products from the EarthShell Packaging Company. The products include 9-inch plates, 12-ounce bowls and hinged-lid sandwich and salad containers, ("clam shells").

Inorganic and organic-inorganic foam substrates are also disclosed in, for example: U.S. Pat. No. 5,095,054, U.S. Pat. No. 5,108,677, U.S. Pat. No. 5,234,977, U.S. Pat. No. 5,258,430, U.S. Pat. No. 5,262,458, U.S. Pat. No. 5,292,782, U.S. Pat. No. 5,376,320, U.S. Pat. No. 5,382,611, U.S. Pat. No. 5,405,564, U.S. Pat. No. 5,412,005, U.S. Pat. No. 5,462,980, U.S. Pat. No. 5,462,982, U.S. Pat. No. 5,512,378, U.S. Pat. No. 5,514,430, U.S. Pat. No. 5,549,859, U.S. Pat. No. 5,569,514, U.S. Pat. No. 5,569,692, U.S. Pat. No. 5,576,049, U.S. Pat. No. 5,580,409, U.S. Pat. No. 5,580,624, U.S. Pat. No. 5,582,670, U.S. Pat. No. 5,614,307, U.S. Pat. No. 5,618,341, U.S. Pat. No. 5,626,954, U.S. Pat. No. 5,631,053, U.S. Pat. No. 5,658,603, U.S. Pat. No. 5,658,624, U.S. Pat. No. 5,660,900, U.S. Pat. No. 5,660,903, U.S. Pat. No. 5,660,904, U.S. Pat. No. 5,665,442, U.S. Pat. No. 5,679,145, U.S. Pat. No. 5,683,772, U.S. Pat. No. 5,705,238, U.S. Pat. No. 5,705,239, U.S. Pat. No. 5,709,827, U.S. Pat. No. 5,709,913, U.S. Pat. No. 5,753,308, U.S. Pat. No. 5,766,525, U.S. Pat. No. 5,770,137, U.S. Pat. No. 5,776,388, U.S. Pat. No. 5,783,126, U.S. Pat. No. 5,800,647, U.S. Pat. No. 5,810,961, U.S. Pat. No. 5,830,305, U.S. Pat. No. 5,830,548, U.S. Pat. No. 5,843,544, U.S. Pat. No. 5,849,155, U.S. Pat. No. 5,868,824, U.S. Pat. No. 5,879,722, U.S. Pat. No. 5,897,944, U.S. Pat. No. 5,910,350, U.S. Pat. No. 5,928,741, U.S. Pat. No. 5,976,235, U.S. Pat. No. 6,083,586, U.S. Pat. No. 6,090,195, U.S. Pat. No. 6,146,573, U.S. Pat. No. 6,168,857, U.S. Pat. No. 6,180,037, U.S. Pat. No. 6,200,404, U.S. Pat. No. 6,214,907, U.S. Pat. No. 6,231,970, U.S. Pat. No. 6,242,102, U.S. Pat. No. 6,347,934, U.S. Pat. No. 6,348,524, and U.S. Pat. No. 6,379,446. Essentially any material known for use as a substrate for coating or lamination can be used as a substrate for coating with the sulfonated aliphatic-aromatic copolyesters.

To enhance the coating process, the substrates can be treated by known, conventional post forming operations, such as corona discharge; or chemical treatments, such as primers, flame treatments, and adhesives. The substrate layer can be primed with, for example, an aqueous solution of polyethyleneimine, (Adcote® 313), or a styrene-acrylic latex, or can be flame treated, as disclosed in U.S. Pat. No. 4,957,578 and U.S. Pat. No. 5,868,309. If desired, the substrate can be coated with an adhesive, by conventional coating technologies or by extrusion. Examples of adhesives that can be used in enhancing the adherence of the coating to a substrate include: glue, gelatine, caesin, starch, cellulose esters, aliphatic polyesters, poly(alkanoates), aliphatic-aromatic polyesters, sulfonated aliphatic-aromatic polyesters, polyamide esters, rosin/polycaprolactone triblock copolymers, rosin/poly(ethylene adipate) triblock copolymers, rosin/poly(ethylene succinate) triblock copolymers, poly(vinyl acetates), poly(ethylene-co-vinyl acetate), poly(ethylene-co-ethyl acrylate), poly(ethylene-co-methyl acrylate), poly(ethylene-co-propylene), poly(ethylene-co-1-butene), poly(ethylene-co-1-pentene), poly(styrene), acrylics, Rhoplex® N-1031, (an acrylic latex from the Rohm & Haas Company), polyurethanes, AS 390, (an aqueous polyurethane adhesive base for Adhesion Systems, Inc.) with AS 316, (an adhesion catalyst from Adhesion Systems, Inc.), Airflex® 421, (a water-based vinyl acetate adhesive formulated with a crosslinking agent), sulfonated polyester urethane dispersions, (such as sold as Dispercoll® U-54, Dispercoll® U-53, and Dispercoll® KA-8756 by the Bayer Corporation), nonsulfonated urethane dispersions, (such as Aquathane® 97949 and Aquathane® 97959 by the Reichold Company; Flexthane® 620 and Flexthane® 630 by the Air Products Company; Luphen® D DS 3418 and Luphen® D 200A by the BASF Corporation; Neorez® 9617 and Neorez® 9437 by the Zeneca Resins Company; Quilastic® DEP 170 and Quilastic® 172 by the Merquinsa Company; Sancure® 1601 and Sancure® 815 by the B. F. Goodrich Company), urethane-styrene polymer dispersions, (such as Flexthane® 790 and Flexthane® 791 of the Air Products & Chemicals Company), Non-ionic polyester urethane dispersions, (such as Neorez® 9249 of the Zeneca Resins Company), acrylic dispersions, (such as Jagotex® KEA-5050 and Jagotex® KEA 5040 by the Jager Company; Hycar® 26084, Hycar® 26091, Hycar® 26315, Hycar® 26447, Hycar® 26450, and Hycar® 26373 by the B. F. Goodrich Company; Rhoplex® AC-264, Rhoplex® HA-16, Rhoplex® B-60A, Rhoplex® AC-234, Rhoplex® E-358, and Rhoplex® N-619 by the Rohm & Haas Company), silanated anionic acrylate-styrene polymer dispersions, (such as Acronal® S-710 by the BASF Corporation and Texigel® 13–057 by Scott Bader Inc.), anionic acrylate-styrene dispersions, (such as Acronal®296D, Acronal® NX 4786, Acronal® S-305D, Acronal® S-400, Acronal® S-610, Acronal® S-702, Acronal® S-714, Acronal® S-728, and Acronal® S-760 by the BASF Corporation; Carboset® CR-760 by the B. F. Goodrich Company; Rhoplex® P-376, Rhoplex® P-308, and Rhoplex® NW-1715K by the Rohm & Haas Company; Synthemul® 40402 and Synthemul® 40403 by the Reichold Chemicals Company; Texigel® 13–57 Texigel® 13–034, and Texigel® 13–031 by Scott Bader Inc.; and Vancryl® 954, Vancryl® 937 and Vancryl®D 989 by the Air Products & Chemicals Company), anionic acrylate-styrene-acrylonitrile dispersions, (such as Acronal® S 886S, Acronal® S 504, and Acronal® DS 2285×by the BASF Corporation), acrylate-acrylonitrile dispersions, (such as Acronal® 35D, Acronal® 81 D, Acronal® B 37D, Acronal® DS 3390, and Acronal® V275 by the BASF Corporation), vinyl chloride-ethylene emulsions, (such as Vancryl® 600, Vancryl® 605, Vancryl® 610, and Vancryl® 635 by Air Products and Chemicals Inc.), vinylpyrrolidone/styrene copolymer emulsions, (such as Polectron® 430 by ISP Chemicals), carboxylated and non-carboxylated vinyl acetate ethylene dispersions, (such as Airflex® 420, Airflex® 421, Airflex® 426, Airflex® 7200, and Airflex® A-7216 by Air Products and Chemicals Inc. and Dur-o-set® E150 and Dur-o-set® E-230 by ICI), vinyl acetate homopolymer dispersions, (such as Resyn® 68–5799 and Resyn® 25–2828 by ICI), polyvinyl chloride emulsions, (such as Vycar® 460×24, Vycar® 460×6 and Vycar® 460×58 by the B. F. Goodrich Company), polyvinylidene fluoride dispersions, (such as Kynar® 32 by Elf Atochem), ethylene acrylic acid dispersions, (such as Adcote® 50T4990 and Adcote® 50T4983 by Morton International), polyamide dispersions, (such as Micromid® 121RC, Micromid® 141L, Micromid® 142LTL, Micromid® 143LTL, Micromid® 144LTL, Micromid® 321RC, and Micromid® 632HPL by the Union Camp Corporation), anionic carboxylated or noncarboxylated acrylonitrile-butadiene-styrene emulsions and acrylonitrile emulsions, (such as Hycar® 1552, Hycar® 1562×107, Hycar® 1562×117 and Hycar® 1572×64 by B. F. Goodrich), resin dispersions derived from styrene, (such as Tacolyn® 5001 and Piccotex® LC-55WK by Hercules), resin dispersions derived from aliphatic and/or aromatic hydrocarbons, (such as Escorez® 9191, Escorez® 9241, and Escorez® 9271 by Exxon), styrene-maleic anhydrides, (such as SMA® 1440H and SMA® 1000 by AtoChem), and mixtures derived therefrom. Any adhesive known for use in coating substrates can be used. As an example, the substrate can be coated with a biodegradable adhesion binder layer of, for example, glue, gelatine, casein, or starch. The adhesives can be applied by melt processes or by solution, emulsion, dispersion, or coating processes. For example, U.S. Pat. No. 4,343,858 discloses a coated paperboard formed by the coextrusion of a polyester top film and an intermediate layer of an ester of acrylic acid, methacrylic acid, or ethacrylic acid, on a paperboard. U.S. Pat. No. 4,455,184 discloses a process to coextrude a polyester layer and a polymeric adhesive layer onto a paperboard substrate. Fujita, et. al., in U.S. Pat. No. 4,543,280, disclose the use of adhesives in the extrusion coating of polyester onto ovenable paperboard. Huffman, et. al., in U.S. Pat. No. 4,957,578, disclose the extrusion of a polyester layer on a polyethylene coated paperboard. One of ordinary skill in the art can identify appropriate process parameters based on the polymeric composition and process used for the coating formation, the polymeric composition, and the intended application.

The properties exhibited by a polymeric coating depend on several factors indicated above, including the polymeric composition, the method of forming the polymer, the method of forming the coating, and whether the coating was oriented during manufacture. These factors affect many properties of the coating, such as shrinkage, tensile strength, elongation at break, impact strength, dielectric strength and constant, tensile modulus, chemical resistance, melting point, heat deflection temperature. Some coating properties can be adjusted by adding certain additives and fillers to the polymeric composition, such as colorants, dyes, UV and thermal stabilizers, antioxidants, plasticizers, lubricants antiblock agents, slip agents, as recited above. The sulfonated aliphatic-aromatic copolyesters for use in coatings can be blended with one or more other polymeric materials to improve certain characteristics, as described above.

The substrates can be formed into articles prior to coating or can be formed into articles after being coated. For example, containers can be produced from flat, coated paperboard by pressforming methods such as vacuum forming or by folding and adhering them into the final desired shape. Coated, flat paperboard stock can be formed into trays by the application of heat and pressure, as disclosed, for example, in U.S. Pat. No. 4,900,594, or vacuum formed into containers for foods and beverages, as disclosed in U.S. Pat. No. 5,294,483. The articles can include, for example, cutlery, flower pots, mailing tubes, light fixtures, ash trays, gameboards, food containers, fast food containers, cartons, boxes, milk cartons, fruit juice containers, carriers for beverage containers, ice cream cartons, cups, disposable drinking cups, two-piece cups, one-piece pleated cups, cone cups, coffee cups, lidding, lids, straws, cup tops, french fry containers, fast food carry out boxes, packaging, support boxes, confectionery boxes, boxes for cosmetics, plates, bowls, vending plates, pie plates, trays, baking trays, breakfast plates, microwavable dinner trays, "TV" dinner trays, egg cartons, meat packaging plafters, disposable single use liners which can be utilized with containers such as cups or food containers, substantially spherical objects, boftles, jars, crates, dishes, medicine vials, interior packaging, such as partitions, liners, anchor pads, corner braces, corner protectors, clearance pads, hinged sheets, trays, funnels, cushioning materials, and other objects used in packaging, storing, shipping, portioning, serving, or dispensing an object within a container. Water-resistant polymer coated paper and paperboard are commonly used in packaging material for foodstuffs and as disposable containers. Coating polymers and multilamellar coating structures including water-resistant polymer coated paper and paperboard have been developed to give to a package a good oxygen, water vapor, and aroma tightness in order to ascertain good preservation of items packaged therein.

Coatings of the aliphatic-aromatic copolyesters are useful in a wide variety of applications. For example, the coatings can be used in making personal sanitary items and as protective films for agriculture, as described hereinabove. Further examples of uses for the coatings include adhesive tape substrates, bags, bag closures, bed sheets, bottles, cartons, dust bags, fabric softener sheets, garment bags, industrial bags, trash bags, waste bin liners, compost bags, labels, tags, pillow cases, bed liners, bedpan liners, bandages, boxes, handkerchiefs, pouches, wipes, protective clothing, surgical gowns, surgical sheets, surgical sponges, temporary enclosures, temporary siding, toys, and wipes.

A particularly preferred use of the coatings comprising the sulfonated aliphatic-aromatic copolyesters is in food packaging, especially for fast food packaging, examples of which are disclosed hereinabove. A specifically preferred use for the coatings of the copolyesters is in making wraps, which can be made of, for example, paper coated with the copolyesters. Such wraps can be used to enclose food items, as disclosed above. Desirably, the coatings provide a balance of physical properties, including paper-like stiffness combined with sufficient toughness not to tear when used to wrap a food item, deadfold characteristics such that once folded, wrapped or otherwise manipulated into the desired shape, the wraps will maintain their shape and not tend to spontaneously unfold or unwrap, good grease resistance, where desired, and a moisture barrier while not allowing for moisture to condense onto food contained therein. The wraps can have smooth surface or a textured surface, such as by embossing, crimping, quilting, and can be filled, with, for example, inorganic particles, organic particles, such as starch, or combinations of fillers.

The sulfonated aliphatic-aromatic copolyesters can be used to make laminates, including laminated finished articles. Films comprising the sulfonated aliphatic-aromatic copolyesters, prepared as described above, can be laminated onto a wide variety of substrates by known processes such as, for example, thermoforming, vacuum thermoforming, vacuum lamination, pressure lamination, mechanical lamination, skin packaging, and adhesion lamination. A laminate is differentiated from a coating in that, in a laminate, a preformed film is attached to a substrate.

The substrate can be shaped into the final use shape, such as in the form of a plate, cup, bowl, or tray, or can be in an intermediate shape still to be formed, such as a sheet or film. The film can be attached to the substrate by the application of heat and/or pressure, as with, for example heated bonding rolls. The laminate bond strength, also referred to as peel strength, can be enhanced by the use of higher temperatures and/or pressures. When adhesives are used, the adhesives can be hot melt adhesives or solvent-based adhesives. To enhance the lamination process, the films and/or the substrates can be treated by known, conventional post forming operations, such as corona discharge, chemical treatments, such as primers, flame treatments, as previously described. For example, U.S. Pat. No. 4,147,836 describes subjecting a paperboard to a corona discharge to enhance the lamination process with a poly(ethylene terephthalate) film. Quick, et. al., in U.S. Pat. No. 4,900,594, disclose the corona treatment of a polyester film to aide in the lamination to paperstock with adhesives. Schirmer, in U.S. Pat. No. 5,011,735, discloses the use of corona treatments to aid the adhesion between various blown films.

U.S. Pat. No. 5,679,201 and U.S. Pat. No. 6,071,577 disclose the use of flame treatments to aid in the adhesion within polymeric lamination processes. Sandstrom, et. al., in U.S. Pat. No. 5,868,309, disclose the use of paperboard substrate primer consisting of certain styrene-acrylic materials to improve the adhesion with polymeric laminates.

Processes for producing polymeric coated or laminated paper and paperboard substrates for use as containers and cartons are known and are disclosed, for example, in U.S. Pat. No. 3,863,832, U.S. Pat. No. 3,866,816, U.S. Pat. No. 4,337,116, U.S. Pat. No. 4,456,164, U.S. Pat. No. 4,698,246, U.S. Pat. No. 4,701,360, U.S. Pat. No. 4,789,575, U.S. Pat. No. 4,806,399, U.S. Pat. No. 4,888,222, and U.S. Pat. No. 5,002,833. Kane, in U.S. Pat. No. 3,924,013, discloses the formation of ovenable trays mechanically formed from paperboard previously laminated with polyester. Schmidt, in U.S. Pat. No. 4,130,234, discloses the polymeric film lamination of paper cups. The lamination of films onto nonwoven fabrics is disclosed in U.S. Pat. No. 6,045,900 and U.S. Pat. No. 6,309,736. Depending on the intended use of the polyester laminated substrate, the substrate can be laminated on one side or on both sides.

Films of the copolyesters can be passed through heating and pressure/nip rolls to be laminated onto flat substrates. Alternatively, the films can be laminated onto substrates utilizing processes derived from thermoforming. In such processes, the films can be laminated onto substrates by vacuum lamination, pressure lamination, blow lamination, or mechanical lamination. When the films are heated, they soften and can be stretched onto a substrate of substantially any shape. Processes for adhering a polymeric film to a preformed substrate are disclosed, for example, in U.S. Pat. No. 2,590,221. In vacuum lamination, the film can be clamped or simply held against the substrate and then heated until it becomes soft. A vacuum is then applied, typically through a porous substrate or designed-in holes, causing the softened film to mold into the contours of the substrate and laminate onto the substrate. The laminate is then cooled as formed. The vacuum can be maintained or not during the cooling process. For substrate shapes that require a deep draw, such as cups, deep bowls, boxes, and cartons, a plug assist can be utilized. In such substrate shapes, the softened film tends to thin out significantly before it reaches the base or bottom of the substrate shape, leaving only a thin and weak laminate on the bottom of the substrate shape. The plug assist is any type of mechanical helper that carries more film stock toward an area of the substrate shape where the lamination would otherwise be too thin. Plug assist techniques can be adapted to vacuum and pressure lamination processes. Vacuum lamination processes of films onto preformed substrates are known and are disclosed, for example, in U.S. Pat. No. 4,611,456 and U.S. Pat. No. 4,862,671. Knoell, in U.S. Pat. No. 3,932,105, discloses processes for the vacuum lamination of a film onto a folded paperboard carton. Lee, et. al., in U.S. Pat. No. 3,957,558, disclose the vacuum lamination of thermoplastic films onto a molded pulp product, such as a plate. Foster, et. al., in U.S. Pat. No. 4,337,116, disclose the lamination of poly(ethylene terephthalate) films onto preformed molded pulp containers by preheating the pulp container and the film, pressing the film into contact with the substrate and applying vacuum through the molded pulp container substrate. Plug assisted, vacuum lamination processes are also known and are disclosed, for example, in Wommelsdorf, et. al., U.S. Pat. No. 4,124,434, for deep drawn laminates, such as coated cups. Faller, in U.S. Pat. No. 4,200,481 and U.S. Pat. No. 4,257,530, discloses the production processes of lined trays by such processes.

In pressure lamination, an alternative to vacuum lamination, the film can be clamped, heated until it softens, and then forced into the contours of the substrate to be laminated by the application of pressure, e.g., air pressure, to the side of the film opposite to the substrate. Exhaust holes can be present to allow the trapped air to escape, or if the substrate is porous to air, the air escapes through the substrate. The air pressure can be released once the laminated substrate cools and the film solidifies. Pressure lamination tends to allow a faster production cycle, improved part definition and greater dimensional control over vacuum lamination. Processes for pressure lamination of films onto preformed substrates are known and are disclosed, for example, in U.S. Pat. No. 3,657,044 and U.S. Pat. No. 4,862,671. Wommelsdorf, in U.S. Pat. No. 4,092,201, discloses a process for lining an air-permeable container, such as a paper cup, with a thermoplastic foil through use of a warm pressurized stream of gas.

A further alternative is mechanical lamination, which includes any lamination method that does not use vacuum or air pressure. In mechanical lamination, the film is heated and then mechanically applied to the substrate. Examples of the mechanical application include the use of molds or pressure rolls.

Suitable substrates for lamination include articles of paper, paperboard, cardboard, fiberboard, cellulose, such as Cellophane® cellulose, starch, plastic, polystyrene foam, glass, metal, such as in aluminum or tin cans or metal foils, polymeric foams, organic foams, inorganic foams, organic-inorganic foams, and polymeric films. Preferred are biodegradable substrates, such as paper, paperboard, cardboard, cellulose, starch, and biobenign substrates such as inorganic and inorganic-organic foams.

Polymeric films suitable as substrates for lamination can contain the sulfonated aliphatic-aromatic copolyesters and/or other materials, which can be biodegradable or not biodegradable. The materials can be naturally derived, modified naturally derived or synthetic. Examples of biodegradable materials and non-biodegradable materials suitable as substrates are disclosed hereinabove with respect to blends. Examples of natural polymeric materials suitable as substrates are also disclosed hereinabove.

Organic foams, such as foams derived from expanded starches and grains, can be used as substrates, and are also disclosed hereinabove. Preferred organic-inorganic foams for use as substrates are cellular foams filled with inorganic fillers such as, for example; calcium carbonate, clays, cement, or limestone, having a starch-based binder, as disclosed hereinabove with respect to substrates for coating.

The substrates can be formed into their intended final shape prior to lamination. Any conventional process to form the substrates can be used. For example, for molded pulp substrates, a "precision molding", "die-drying", and "close-drying" processes can be used. The processes include molding fibrous pulp from an aqueous slurry against a screen-covered open-face suction mold to the substantially finished contoured shape, followed by drying the damp pre-form under a strong pressure applied by a mated pair of heated dies. Such processes are disclosed, for example, in U.S. Pat. No. 2,183,869, U.S. Pat. No. 4,337,116, and U.S. Pat. No. 4,456,164. Precision molded pulp articles tend to be dense, hard and boardy, with an extremely smooth, hot-ironed surface finish. Chinet® disposable paper plates produced by such processes have been sold by the Huhtamaki Company.

Molded pulp substrates can also be produced by "free-dried" or "open-dried" processes. The free-dried process includes molding fibrous pulp from an aqueous slurry against a screen-covered, open-face suction mold to essentially the final molded shape and then drying the resulting damp pre-form in a free space, such as by placing it on a conveyor and moving it slowly through a heated drying oven. Such molded pulp articles can have a non-compacted consistency, resilient softness, and an irregular fibrous feel and appearance. Molded pulp substrates can also be "after pressed" after forming in a free-dried process, for example, as disclosed in U.S. Pat. No. 2,704,493. They can also be produced by other conventional processes, such as described, for example, in U.S. Pat. No. 3,185,370.

The laminated substrates can be formed into a final shape by known processes, such as press forming or folding up. Such processes are disclosed, for example in U.S. Pat. Nos. 3,924,013, 4,026,458, and U.S. Pat. No. 4,456,164. Quick, et. al., in U.S. Pat. No. 4,900,594, disclose the production of trays from flat, polyester laminated paperstock through the use of pressure and heat. If desired, adhesive can be applied to the film and/or to the substrate to enhance the bond strength of the laminate. Adhesive lamination of films onto preformed substrates is disclosed, for example, in U.S. Pat. No. 2,434,106, U.S. Pat. No. 2,510,908, U.S. Pat. No. 2,628,180, U.S. Pat. No. 2,917,217, U.S. Pat. No. 2,975,093, U.S. Pat. No. 3,112,235, U.S. Pat. No. 3,135,648, U.S. Pat. No. 3,616,197, U.S. Pat. No. 3,697,369, U.S. Pat. No. 4,257,530, U.S. Pat. No. 4,016,327, U.S. Pat. No. 4,352,925, U.S. Pat. No. 5,037,700, U.S. Pat. No. 5,132,391, and U.S. Pat. No. 5,942,295. Schmidt, in U.S. Pat. No. 4,130,234, discloses the use of hot melt adhesives in the lamination of polymeric films to paper cups. Dropsy, in U.S. Pat. No. 4,722,474, discloses the use of adhesives for plastic laminated cardboard packaging articles. Quick, et. al, in U.S. Pat. No. 4,900,594, disclose the formation of paperboard trays through pressure and heat forming of a flat polyester laminated paperboard stock adhered with a crosslinkable adhesives system. Martini, et. al, in U.S. Pat. No. 5,110,390, disclose the lamination of coextruded bilayer films onto water soluble substrates through the use of adhesives. Gardiner, in U.S. Pat. No. 5,679,201 and U.S. Pat. No. 6,071,577, discloses the use of adhesives to provide improved bond strengths between polyester coated paperboard onto polyethylene coated paperboard to produce, for example, juice containers. Coating of the film and/or substrate with adhesive can be accomplished using conventional processes or by coextrusion. Examples of adhesives that can be used in laminates are disclosed hereinabove with respect to the application of coatings.

Laminates comprising the sulfonated aliphatic-aromatic copolyesters are useful in a wide variety of applications, including sanitary items and protective films for agriculture, as disclosed hereinabove. A particularly preferred use of the laminates comprising the sulfonated aliphatic-aromatic copolyesters is in food packaging, especially for fast food packaging. Specific examples of food packaging uses are disclosed hereinabove. A preferred use of the laminates is in wraps. Such wraps can take the form of a polymeric laminated paper. Wraps can be used to enclose foods and other perishable items, as described above, and preferably provide a balance of physical properties, including paper-like stiffness combined with toughness, deadfold characteristics, grease resistance, where desired, and a balance barrier properties, as described hereinabove. The wraps can have a smooth surface or a textured surface, and can be filled with organic and/or organic fillers, as disclosed hereinabove.

In some embodiments, the sulfonated aliphatic-aromatic copolyesters can be formed into sheets. The difference between a sheet and a film is the thickness, but there is no set industry standard as to when a film becomes a sheet. As the term is used herein, a sheet is greater than about 0.25 mm (10 mils) thick, preferably between about 0.25 mm and 25 mm, more preferably from about 2 mm to about 15 mm, and even more preferably from about 3 mm to about 10 mm. In a preferred embodiment, a sheet has a thickness sufficient to render the sheet rigid, which generally occurs at thicknesses of at least about 0.50 mm. However, sheets thicker than 25 mm, and thinner than 0.25 mm can be formed and may be desirable for some applications. Polymeric sheets have a variety of uses, such as in signage, glazings, thermoforming articles, displays and display substrates, displays, automobile lights and in thermoforming articles. For some uses, the heat resistance of the sheet is an important factor. Therefore, a higher melting point, glass transition temperature, and crystallinity level are desirable to provide better heat resistance and greater stability. Further, it may be desired that the sheets have ultraviolet (UV) and scratch resistance, good tensile strength, high optical clarity, and good impact strength, particularly at low temperatures.

The sulfonated aliphatic-aromatic copolyesters can be formed into sheets using known methods, directly from the polymerization melt. Alternatively, the copolyester can be formed into an easily handled shape (such as pellets) from the melt, which can then be used to form a sheet. Known processes that can be used in forming sheet include extrusion, solution casting and injection molding. The preferred parameters for the processes can be determined by one of ordinary skill in the art and depend, in part, on viscosity characteristics of the sulfonated aliphatic-aromatic copolyester and the desired thickness of the sheet. Sheets are preferably formed from the aliphatic-aromatic copolyesters by either solution casting or extrusion. Extrusion is particularly preferred for formation of "endless" products. PCT applications WO 96/38282 and WO 97/00284 disclose exemplary processes for the formation of crystallizable sheets by melt extrusion. Melt extrusion can be carried out as described hereinabove with respect to the formation of films. A sheet can be produced by extruding a thin layer of polymer over chilled rolls and then further drawing down the sheet to the desired thickness by tension rolls. For manufacturing large quantities of sheets, a sheeting calender can be employed. Calendering processes suitable for making sheet are disclosed hereinabove with respect to the formation of film. Extrusion processes can be followed by post-forming operations for expanded versatility. Exemplary post-forming operations include altering round to oval shapes, stretching the sheet to different dimensions, machining, punching, and biaxial stretching. The copolyester sheet can be combined with other polymeric materials during extrusion and/or finishing to form laminates or multilayer sheets having desired characteristics, such as water vapor resistance. A multilayer or laminate sheet can be made using known methods, and can have as many as five or more separate layers joined together by, for example, heat, adhesive and/or tie layers. Alternatively, sheets can be made from the copolyesters by solution casting, which produces more consistently uniform gauge sheet than melt extrusion. Solution casting comprises dissolving polymeric granules or powder in a suitable solvent with optional desired formulants, such as a plasticizer or colorant. The solution is filtered to remove dirt and/or large particles and cast from a slot die onto a moving belt, preferably of stainless steel, then dried, whereupon the sheet cools. The thickness of the sheet as it emerges from the belt is generally about five to ten times that of the finished sheet. The sheet can then be finished in a like manner to an extruded sheet. As a further alternative, sheets and sheet-like articles, such as discs, can be formed by injection molding, using known methods. One of ordinary skill in the art can identify appropriate process parameters for manufacturing sheets, based on the polymeric composition and specific sheet-forming process used.

Regardless of how the sheet is formed, it is desirably subjected to biaxial orientation by stretching in both the machine and transverse direction after formation. The machine direction stretch is initiated on forming the sheet simply by rolling out and taking up the sheet. This inherently stretches the sheet in the direction of takeup, orienting some of the fibers. Although this strengthens the sheet in the machine direction, it allows the sheet to tear easily in the direction at right angles because all of the fibers are oriented in one direction. Therefore, biaxially stretched sheets are preferred for certain uses where uniform sheeting is desired. Biaxial stretching orients the fibers parallel to the plane of the sheet, but leaves the fibers randomly oriented within the plane of the sheet. This provides superior tensile strength, flexibility, toughness and shrinkability, for example, in comparison to non-oriented sheets. It is desirable to stretch the sheet along two axes at right angles to each other. This increases tensile strength and elastic modulus in the directions of stretch. It is most desirable for the amount of stretch in each direction to be substantially equivalent, thereby providing similar properties or behavior within the sheet when tested from any direction. Biaxial orientation can be obtained using any known method. However, tentering is preferred. Shrinkage can be controlled by holding the sheet in a stretched position and heating for a few seconds before quenching. The heat stabilizes the oriented sheet, which then can be forced to shrink only at temperatures above the heat stabilization temperature.

The properties exhibited by a sheet depend on several factors indicated above, including the polymeric composition, the method of forming the polymer, the method of forming the sheet, and whether the sheet was treated for stretch or biaxially oriented. Properties affected by such parameters include shrinkage, tensile strength, elongation at break, impact strength, dielectric strength and constant, tensile modulus, chemical resistance, melting point, and heat deflection temperature. The sheet properties can be further adjusted by adding certain additives and fillers to the polymeric composition, such as colorants, dyes, UV and thermal stabilizers, antioxidants, plasticizers, lubricants antiblock agents, and slip agents, as recited above. Alternatively, the sulfonated aliphatic-aromatic copolyester can be blended with one or more other polymers, such as starch, to modify specific characteristics. Other polymers can be added to modify such characteristics as air permeability, optical clarity, strength and/or elasticity, for example.

The sheets can be thermoformed by any known method into any desirable shape, such as covers, skylights, shaped greenhouse glazings, displays, and food trays. The thermoforming is accomplished by heating the sheet to a sufficient temperature and for sufficient time to soften the copolyester so that the sheet can be molded into the desired shape. One of ordinary skill in the art can determine the optimal thermoforming parameters, depending upon, for example, the viscosity and crystallization characteristics of the polyester sheet.

The sulfonated aliphatic-aromatic copolyesters can also be used in making plastic containers. Plastic containers are widely used for foods and beverages, and also for non-food materials. Poly(ethylene terephthalate) (PET) is used to make containers because of its appearance (optical clarity), ease of blow molding, chemical and thermal stability, and price. PET is generally fabricated into bottles by blow molding processes, and generally by stretch blow molding. The sulfonated aliphatic-aromatic copolyesters can be used in applications where PET is conventionally used, and can offer the advantage of biodegradability. The containers can be made by known methods, such as extrusion, injection molding, injection blow molding, rotational molding, thermoforming of a sheet, and stretch-blow molding. For the sulfonated aliphatic-aromatic copolyesters, a preferred method for molding a container is stretch-blow molding, which is used in the production of poly(ethylene terephthalate) (PET) containers, such as bottles. Cold parison methods can also be used, in which a preformed parison (generally made by injection molding) is taken out of the mold and then subjected to stretch blow molding in a separate step. Alternatively, hot parison methods can be used, wherein the hot parison is immediately subjected to stretch blow molding in the same equipment without complete cooling after injection molding to make the parison. The parison temperature depends upon on the composition of the polymer to be used, but as a general guideline, parison temperatures within the range of about 90° C. to about 160° C. are useful. The desired stretch blow molding temperature also depends upon polymer composition, but a mold temperature of about 80° C. to about 150° C. is generally useful.

Containers can have any shape desirable. Exemplary containers include narrow-mouth bottles and wide-mouth bottles having threaded tops and a volume of about 400 mL to about 3 liters, although smaller and larger containers of varied shapes can be formed. Containers made from the sulfonated aliphatic-aromatic copolyesters can be used in standard cold fill applications. Containers made from the sulfonated aliphatic-aromatic copolyesters and having appropriate compositions can also be used in hot fill applications.

Containers made from the sulfonated aliphatic-aromatic copolyesters can be used for containing foods and beverages, as well as non-food solids and liquids. The containers are preferably clear and transparent, but can be modified to have color or to be opaque, rather than transparent, if desired, by adding colorants or dyes, or by inducing crystallinity in the copolyesters sufficient to result in opaqueness.

The sulfonated aliphatic-aromatic copolyesters can be formed into fibers. The term "fibers" as used herein refers to continuous monofilaments, non-twisted or entangled multifilament yarns, staple yarns, spun yarns, and non-woven materials. Such fibers can be used to form uneven fabrics, knitted fabrics, fabric webs, or any other fiber-containing structures, such as tire cords. Polyester fibers are produced in large quantities for use in a variety of applications, such as in textiles, particularly in combination with natural fibers such as cotton and wool, for end uses including clothing, rugs, and other items. Further, polyester fibers are desirable for use in industrial applications due to their elasticity and strength. In particular, they are used to make articles such as tire cords and ropes. Synthetic fibers, such as, for example, fibers nylon, acrylic, and polyesters, are made by spinning and drawing a polymer into a filament, which is then formed into a yarn by winding many filaments together. The fibers are often treated mechanically and/or chemically to impart desirable characteristics such as strength, elasticity, heat resistance, hand (feel of fabric), depending upon the desired end product to be fashioned from the fibers.

For forming fibers, the monomer composition of the sulfonated aliphatic-aromatic copolyester is preferably chosen to result in a partially crystalline polymer. The crystallinity is desirable for the formation of fibers because it can provide strength and elasticity. As first produced, the polyester is mostly amorphous in structure. In preferred embodiments, the polyester polymer readily crystallizes on reheating and/or extension of the polymer.

Fibers can be made from the copolyesters using any known process for making fibers from polyesters. Fibers can be made from the copolyesters using melt spinning processes known for use in making polyester fibers. Melt spinning includes heating the polymer to form a molten liquid. The polymer can be melted against a heated surface. The molten polymer is forced through a spinneret having a plurality of fine holes. Upon contact with air or a non-reactive gas stream after passing through the spinneret, the polymer from each spinneret solidifies into filaments. The filaments are gathered together downstream from the spinneret by a convergence guide, and can be taken up by a roller or a plurality of rollers. This process allows filaments of various sizes and cross sections to be formed, such as, for example, filaments having a round, elliptical, square, rectangular, lobed or dog-boned cross section. Following the extrusion and uptake of the fiber, the fiber is usually drawn, which increases the crystallization and maximizing desirable properties such as orientation along the longitudinal axis, and thus increases elasticity, and strength. The drawing can be done in combination with takeup by using a series of rollers, some of which can be heated, as known in the art, or can be done as a separate stage in the process of fiber formation.

The polymer can be spun at speeds of from about 600 to 6000 meters per minute or higher, depending on the desired fiber size. For textile applications, a fiber with a denier per filament of from about 0.1 to about 100 is desired. Preferably, the denier is about 0.5 to 20, more preferably 0.7 to 10. However, for industrial applications the fiber should be from about 0.5 to 100 denier per filament, preferably about 1.0 to 10.0, most preferably 3.0 to 5.0 denier per filament. The required size and strength of a fiber can be readily determined by one of ordinary skill in the art for any given application.

The resulting filamentary material is amenable to further processing by additional processing equipment, or it can be used directly in applications requiring a continuous filament textile yarn. If desired, the filamentary material can be converted from a flat yarn to a textured yarn using known false twist texturing conditions or other processes known in the art. In particular, it is desirable to increase the surface area of the fiber to provide a softer feel and to enhance the ability of the fibers to breathe, thereby providing better insulation and water retention by, for example, textiles intended for specific applications. The fibers can be crimped or twisted by the false twist method, air jet, edge crimp, gear crimp, or stuffer box, for example. Alternatively, the fibers can be cut into shorter lengths, called staple, which can be processed into yarn. A skilled artisan can determine the best method of crimping or twisting based on the desired application and the composition of the fiber. The staple fiber can be blended with natural fibers, especially cotton and wool. Polyesters, including the sulfonated aliphatic-aromatic copolyesters, are generally resistant to mold, mildew, and other problems inherent to natural fibers. The polyester fiber further provides strength and abrasion resistance and lowers the cost of material. Therefore, it is ideal for use in textiles and other commercial applications, such as for use in fabrics for apparel, home furnishings and carpets.

After formation, the fibers can be finished by any method appropriate to the desired final use. Finishing of fibers for textiles can include dyeing, sizing, or addition of chemical agents such as antistatic agents, flame retardants, UV light stabilizers, antioxidants, pigments, dyes, stain resistants, and antimicrobial agents. For some applications, finishing can be effective to adjust the look and hand of the fibers. For industrial applications, the fibers can be treated to impart additional desired characteristics such as strength, elasticity or shrinkage, for example.

Continuous filament fiber can be used either as produced or texturized for use in some applications such as, for example, textile fabrics for apparel and home furnishings, for example. High tenacity fiber can be used in industrial applications such as, for example, high strength fabrics, tarpaulins, sailcloth, sewing threads and rubber reinforcement for tires and V-belts. The sulfonated aliphatic-aromatic copolyester can be used with another synthetic or natural polymer to form heterogenous fiber or bicomponent fiber, providing a fiber with desired properties determined by the properties of the individual fibers. A heterogeneous fiber can be formed by known methods, such as side-by-side, sheath-core, and matrix designs.

In some embodiments, the copolyesters are foamable. Because polyesters typically have a much higher density, (e.g.; 1.3 g/cc), than other polymers, it may desirable for some applications to foam polyester materials to decrease the weight of molded parts, films, sheets, food trays, thermoformed parts. Such foamed articles also provide improved insulating properties than unfoamed articles. The sulfonated aliphatic-aromatic copolyesters can also be formed into shaped foamed articles. Thermoplastic polymeric materials are foamed to provide low-density articles, such as, for example, films, cups, food trays, decorative ribbons, and furniture parts. For example, polystyrene beads containing low boiling hydrocarbons, such as pentane, are formed into lightweight foamed cups for hot drinks. Polypropylene can be extruded in the presence of blowing agents such as nitrogen or carbon dioxide gas to form decorative films and ribbons for package wrappings. Also, polypropylene can be injection molded in the presence of blowing agents to form lightweight furniture such as chairs and furniture parts such as table legs. For foaming, the copolyester preferably has a sufficiently high melt viscosity to hold a foamed shape as formed, sufficiently long for the copolyester to solidify to form the final foamed article. High melt viscosity can be obtained, for example, by raising the inherent viscosity of the polyester as produced, by post-polymerization processes such as solid state polymerization method, as described above. Alternatively, a branching agent can be incorporated into the polyester, as described, for example, in U.S. Pat. No. 4,132,707, U.S. Pat. No. 4,145,466, U.S. Pat. No. 4,999,388, U.S. Pat. No. 5,000,991, U.S. Pat. No. 5,110,844, U.S. Pat. No. 5,128,383, and U.S. Pat. No. 5,134,028. Such branched polyesters can additionally be subjected to solid-state polymerization, as described above, to further enhance the melt viscosity. The polyester can further include a chain extension agent, such as a dianhydride or a polyepoxide, which can be added during the foaming process.

The polyesters can be foamed by a wide variety of methods. For example, an inert gas such as nitrogen or carbon dioxide can be injected into the melt during extrusion or molding operations. Alternatively, inert hydrocarbon gases such as methane, ethane, propane, butane, and pentane, or chlorofluorocarbons, hydrochlorofluorocarbons, or hydrofluorocarbons, can be used. Another method involves the dry blending of chemical blowing agents with the copolyester and then extruding or molding the copolyester to provide foamed articles. During the extrusion or molding operation, an inert gas such as nitrogen is released from the blowing agents and provides the foaming action. Typical blowing agents include azodicaronamide, hydrazocarbonamide, dinitrosopenta-methylenetetramine, p-toluenesulfonyl hydrazodicarboxylate, 5-phenyl-3,6-dihydro-1,3,4-oxadiazin-2-one, sodium borohydride, sodium bicarbonate, 5-phenyltetrazole, p,p'-oxybis(benzenesulfonylhydrazide). Still another method for use with pellets of the copolyester involves the blending of sodium carbonate or sodium bicarbonate with one portion of the copolyester pellets, blending of an organic acid, such as citric acid, with another portion of the polyester pellets and then blending of the two portions of pellets by extrusion or molding at elevated temperatures. Carbon dioxide gas is released from the interaction of the sodium carbonate and citric acid to provide the desired foaming action in the polymeric melt. It is desirable that the nucleation agents used with the copolyesters create sites for bubble initiation, determine the cell size of the foamed sheet or object, and hasten the solidification of the foam as the copolyester is formed into an article. Examples of suitable nucleation agents include sodium acetate, talc, titanium dioxide, and polyolefin materials such as polyethylene and polypropylene.

Polymeric foaming equipment and processes are known and are disclosed in, for example, U.S. Pat. No. 5,116,881, U.S. Pat. No. 5,134,028, U.S. Pat. No. 4,626,183, U.S. Pat. No. 5,128,383, U.S. Pat. No. 4,746,478, U.S. Pat. No. 5,110,844, U.S. Pat. No. 5,000,844, and U.S. Pat. No. 4,761,256. Reviews on foaming technology can be found in Kirk-Othmer Encyclopedia of Chemical Technology, Third Edition, Volume 11, pp. 82–145 (1980), John Wiley and Sons, Inc., New York, N.Y. and the Encyclopedia of Polymer Science and Engineering, Second Edition, Volume 2, pp. 434–446 (1985), John Wiley and Sons, Inc., New York, N.Y. The foamable copolyesters can include a wide variety of additives and/or fillers as disclosed herein, or can be blended with other materials. For biodegradable foams, the addition of cellulose, cellulose derivatives, such as chemically modified cellulose, starch, and starch derivatives, such as chemically modified starch and thermoplastic starch, is especially preferred.

EXAMPLES

Test Methods

Differential Scanning Calorimetry, (DSC), is performed on a TA Instruments Model Number 2920 machine. Samples are heated under a nitrogen atmosphere at a rate of 20 degrees C./minute to 300 degrees C., programmed cooled back to room temperature at a rate of 20 degrees C./minute and then reheated to 300 degrees C. at a rate of 20 degrees C./minute. The observed sample glass transition temperature (Tg) and crystalline melting temperature (Tm) noted below were from the second heating step.

Inherent Viscosity, (IV), is defined in "Preparative Methods of Polymer Chemistry", W. R. Sorenson and T. W. Campbell, 1961, p. 35. It is determined at a concentration of 0.5 g./100 mL of a 50:50 weight percent trifluoroacetic acid:dichloromethane acid solvent system at room temperature by a Goodyear R-103B method.

Laboratory Relative Viscosity, (LRV), is the ratio of the viscosity of a solution of 0.6 gram of the polyester dissolved in 10 mL of hexafluoroisopropanol, (HFIP) containing 80 ppm sulfuric acid, to the viscosity of the sulfuric acid-containing hexafluoroisopropanol itself, both measured at 25 degrees C. in a capillary viscometer. The LRV can be numerically related to IV. Where this relationship is utilized, the term "calculated IV" is noted.

Biodegradation is measured according to the ISO 14855 method "Determination of the ultimate aerobic biodegradability and disintegration of plastic materials under controlled composting conditions—Method by analysis of evolved carbon". Biodegradation testing involves injecting an inoculum consisting of a stabilized and mature compost derived from the organic fraction of municipal solid waste with ground powder of the polymer to be tested on a vermiculite matrix, and composting under standard conditions at an incubation temperature controlled at 58° C.+/−2° C. The carbon dioxide evolved is used to determine the extent of biodegradation.

Prior to testing film properties, samples of film are conditioned for 40 hours at 72° F. and 50 percent humidity. Elmendorf Tear was determined according to ASTM 1922. Graves Tear was determined according to ASTM D1004. Tensile Strength at break, tensile modulus and percent elongation at break was determined according to ASTM D882.

Example 1

To a 250 milliliter glass flask was added dimethyl terephthalate, (48.55 grams), 1,4-butanediol, (58.58 grams), dimethyl isophthalate-3-sodium sulfonate, (2.96 grams), dimethyl glutarate, (40.04 grams), and titanium(IV) isopropoxide, (0.0603 grams) to form a reaction mixture. The reaction mixture was stirred and heated to 180° C. under a slow nitrogen purge. After achieving 180° C., the reaction mixture was heated to 200° C. over 2.6 hours with stirring under a slow nitrogen purge. The resulting reaction mixture was stirred at 200° C. for 1 hour with a slight nitrogen purge. The reaction mixture was then heated to 255° C. over 0.60 hours with stirring and a slow nitrogen purge. The resulting reaction mixture was stirred at 255° C. under a slight nitrogen purge for 1.0 hour. 30.7 grams of a colorless distillate was collected over this heating cycle. The reaction mixture was then staged to full vacuum with stirring at 255° C. The resulting reaction mixture was stirred for 3.0 hours under full vacuum (pressure less than 100 mtorr). The vacuum was then released with nitrogen and the reaction mass allowed to cool to room temperature. An additional 1.5 grams of distillate was recovered and 103.9 grams of a solid product was recovered. The product was found to have an LRV of 13.80, and was calculated to have an inherent viscosity of 0.50 dL/g. By DSC analysis, a crystalline Tm was observed at 129.2° C., (14.6 J/g).

Example 2

To a 250 milliliter glass flask was added dimethyl terephthalate, (48.55 grams), 1,4-butanediol, (58.58 grams), dimethyl isophthalate-3-sodium sulfonate, (2.96 grams), dimethyl glutarate, (40.04 grams), 1,2,4,5-benzenetetracarboxylic dianhydride, (0.1015 grams), and titanium(IV) isopropoxide, (0.0603 grams) to form a reaction mixture. The reaction mixture was stirred and heated to 180° C. under a slow nitrogen purge. After achieving 180° C., the reaction mixture was heated to 200° C. over 2.5 hours with stirring under a slow nitrogen purge. The resulting reaction mixture was stirred at 200° C. for 1 hour with a slight nitrogen purge. The reaction mixture was then heated to 255° C. over 0.90 hours with stirring and a slow nitrogen purge. The resulting reaction mixture was stirred at 255° C. under a slight nitrogen purge for 0.7 hours. 67.5 grams of a colorless distillate was collected over this heating cycle. The reaction mixture was then staged to full vacuum with stirring at 255° C. The resulting reaction mixture was stirred for 3.1 hours under full vacuum, (pressure less than 100 mtorr). The vacuum was then released with nitrogen and the reaction mass allowed to cool to room temperature. An additional 2.8 grams of distillate was recovered and 99.8 grams of a solid product was recovered. The product was found to have an LRV of 33.15 and was calculated to have an inherent viscosity of 0.85 dL/g. By DSC analysis, a broad crystalline Tm was observed at 129.2° C., (16.9 J/g).

Comparative Example CE 1

To a 250 milliliter glass flask was added bis(2-hydroxyethyl) terephthalate, (62.92 grams), ethylene glycol, (18.93 grams), dimethyl isophthalate-3-sodium sulfonate, (0.74 grams), dimethyl adipate, (43.55 grams), manganese(II) acetate tetrahydrate, (0.042 grams), and antimony(III) trioxide, (0.034 grams) to form a reaction mixture. The reaction mixture was stirred and heated to 180° C. under a slow nitrogen purge. After achieving 180° C., the reaction mixture was heated to 275° C. over 3.7 hours with stirring under a slow nitrogen purge. The resulting reaction mixture was stirred at 275° C. under a slight nitrogen purge for 1 hour. 6.7 grams of a colorless distillate was collected over this heating cycle. The reaction mixture was then staged to full vacuum with stirring at 275° C. The resulting reaction mixture was stirred for 3.5 hours under full vacuum, (pressure less than 100 mtorr). The vacuum was then released with nitrogen and the reaction mass allowed to cool to room temperature. An additional 15.8 grams of distillate was recovered and 70.5 grams of a solid product was recovered. The product was found to have an IV of 0.44 dL/g. By DSC analysis, a broad crystalline Tm of 142.0° C., (6.3 J/g), was observed.

Example 3

To a 1 liter glass flask was added dimethyl terephthalate, (240.31 grams), 1,4-butanediol, (292.89 grams), dimethyl isophthalate-3-sodium sulfonate, (3.70 grams), dimethyl adipate, (217.75 grams), manganese(II) acetate tetrahydrate, (0.234 grams), and antimony(III) trioxide, (0.189 grams) to form a reaction mixture. The reaction mixture was stirred and heated to 180° C. under a slow nitrogen purge. After achieving 180° C., the reaction mixture was heated to 255° C. over 2.2 hours with stirring under a slow nitrogen purge. The resulting reaction mixture was stirred at 255° C. under a slight nitrogen purge for 1.2 hours. 188.2 grams of a colorless distillate was collected over this heating cycle. The reaction mixture was then staged to full vacuum with stirring at 255° C. The resulting reaction mixture was stirred for 4.7 hours under full vacuum, (pressure less than 100 mtorr). The vacuum was then released with nitrogen and the reaction mass allowed to cool to room temperature. An additional 17.4 grams of distillate was recovered and 461.0 grams of a solid product was recovered. The product had an LRV of 5.74 and calculated to have an inherent viscosity of 0.35 dL/g. By DSC analysis, a broad crystalline Tm was observed at 133.6° C., (20.0 J/g).

A sample of the product was ground into powder and tested for biodegradation, as described above. The sample was found to biodegrade 36.2 percent within 13 days under these test conditions. This example demonstrates the higher level of crystallinity found within the sulfonated copolyesters of the present invention in comparison with known sulfonated copolyesters. The product formed in example 3 was found to have three times the level of crystallinity than that of Comparative Example CE 1, which is representative of known sulfonated copolyesters. This example further demonstrates the relatively high crystalline melting point of the sulfonated copolyesters of the present invention.

Example 4

To a 250 milliliter glass flask was added dimethyl terephthalate, (47.58 grams), 1,4-butanediol, (72.10 grams), dimethyl isophthalate-3-sodium sulfonate, (1.48 grams), DBE dibasic ester, (a product of the DuPont Company, a mixture of dimethyl succinate, dimethyl glutarate, and dimethyl adipate, approximately in a 20:60:20 molar ratio, 40.04 grams), silica, (12.04 grams), and titanium(IV) isopropoxide, (0.06 grams) to form a reaction mixture. The reaction mixture was stirred and heated to 180° C. under a slow nitrogen purge. After achieving 180° C., the reaction mixture was heated to 190° C. over 0.3 hours with stirring under a slow nitrogen purge. After stirring at 190° C. for 1.0 hour, the reaction mixture was heated to 200° C. over 0.4 hours with stirring under a slow nitrogen purge. The resulting reaction mixture was stirred at 200° C. for 1.1 hours with a slight nitrogen purge. The reaction mixture was then heated to 255° C. over 2.2 hours with stirring and a slow nitrogen purge. The resulting reaction mixture was stirred at 255° C. under a slight nitrogen purge for 0.6 hours. 44.97 grams of a colorless distillate was collected over this heating cycle. The reaction mixture was then staged to full vacuum with stirring at 255° C. The resulting reaction mixture was stirred for 3.3 hours under full vacuum, (pressure less than 100 mtorr). The vacuum was then released with nitrogen and the reaction mass allowed to cool to room temperature. An additional 5.65 grams of distillate was recovered and 105.75 grams of solid product was recovered. The product was found to have an LRV of 27.60 and was calculated to have an inherent viscosity of 0.75 dL/g. By DSC analysis, a broad crystalline Tm was observed at 125.4° C., (12.4 J/g).

Example 5

To a 250 milliliter glass flask was added a reaction mixture of dimethyl isophthalate-3-sodium sulfonate, (3.65 grams), dimethyl glutarate, (39.42 grams), 1,2,4-benzenetricarboxylic anhydride, (0.12 grams), sodium acetate, (0.69 grams), and titanium(IV) isopropoxide, (0.16 grams) to form a reaction mixture. The reaction mixture was stirred and heated to 180° C. under a slow nitrogen purge. After achieving 180° C., the reaction mixture was heated to 190° C. over 0.3 hours with stirring under a slow nitrogen purge. After stirring at 190° C. for 0.5 hours, the reaction mixture was heated to 200° C. over 0.5 hours with stirring under a slow nitrogen purge. The resulting reaction mixture was stirred at 200° C. for 1 hour with a slight nitrogen purge. The reaction mixture was then heated to 255° C. over 1.1 hours with stirring and a slow nitrogen purge. The resulting reaction mixture was stirred at 255° C. under a slight nitrogen purge for 1.0 hour. 55.46 grams of a colorless distillate was collected over this heating cycle. The reaction mixture was then staged to full vacuum with stirring at 255° C. The resulting reaction mixture was stirred for 3.4 hours under full vacuum, (pressure less than 100 mtorr). The vacuum was then released with nitrogen and the reaction mass allowed to cool to room temperature. An additional 2.17 grams of distillate was recovered and 118.99 grams of a solid product was recovered. The product was found to have an LRV of 18.59 and was calculated to have an inherent viscosity of 0.58 dL/g. By DSC analysis, a broad crystalline Tm was observed at 153.6° C., (22.0 J/g).

Example 6

To a 1 liter glass flask was added dimethyl terephthalate, (277.20 grams), 1,4-butanediol, (288.36 grams), dimethyl isophthalate-3-sodium sulfonate, (14.60 grams), dimethyl glutarate, (157.68 grams), 1,2,4-benzenetricarboxylic anhydride, (0.48 grams), sodium acetate, (2.76 grams), and titanium(IV) isopropoxide, (0.61 grams) to form a reaction mixture. The reaction mixture was stirred and heated to 180° C. under a slow nitrogen purge. After achieving 180° C., the reaction mixture was heated to 190° C. over 0.3 hours with stirring under a slow nitrogen purge. After stirring at 190° C. for 0.5 hours, the reaction mixture was heated to 200° C. over 0.3 hours with stirring under a slow nitrogen purge. The resulting reaction mixture was stirred at 200° C. for 1 hour with a slight nitrogen purge. The reaction mixture was then heated to 255° C. over 1.0 hour with stirring and a slow nitrogen purge. The resulting reaction mixture was stirred at 255° C. under a slight nitrogen purge for 1.0 hour. 148.58 grams of a colorless distillate was collected over this heating cycle. The reaction mixture was then staged to full vacuum with stirring at 255° C. The resulting reaction mixture was stirred for 4.6 hours under full vacuum, (pressure less than 100 mtorr). The vacuum was then released with nitrogen and the reaction mass allowed to cool to room temperature. An additional 54.12 grams of distillate was recovered and 443.00 grams of a solid product was recovered. The product was found to have an LRV of 18.75 and was calculated to have an inherent viscosity of 0.59 dL/g. By DSC analysis, a broad crystalline Tm was observed at 151.9° C., (22.90 µg).

Example 7

To a 250 milliliter glass flask was added dimethyl terephthalate, (75.27 grams), 1,4-butanediol, (83.40 grams), dimethyl isophthalate-3-sodium sulfonate, (3.65 grams), dimethyl glutarate, (34.49 grams), 1,2,4-benzenetricarboxylic anhydride, (0.12 grams), sodium acetate, (0.69 grams), and titanium(IV) isopropoxide, (0.20 grams) to form a reaction mixture. The reaction mixture was stirred and heated to 180° C. under a slow nitrogen purge. After achieving 180° C., the reaction mixture was heated to 190° C. over 0.2 hours with stirring under a slow nitrogen purge. After stirring at 190° C. for 0.5 hours, the reaction mixture was heated to 200° C. over 0.4 hours with stirring under a slow nitrogen purge. The resulting reaction mixture was stirred at 200° C. for 1 hour with a slight nitrogen purge. The reaction mixture was then heated to 255° C. over 0.7 hours with stirring and a slow nitrogen purge. The resulting reaction mixture was stirred at 255° C. under a slight nitrogen purge for 1.2 hours. 60.0 grams of a colorless distillate was collected over this heating cycle. The reaction mixture was then staged to full vacuum with stirring at 255° C. The resulting reaction mixture was stirred for 3.2 hours under full vacuum, (pressure less than 100 mtorr). The vacuum was then released with nitrogen and the reaction mass allowed to cool to room temperature. An additional 3.3 grams of distillate was recovered and 115 grams of a solid product was recovered. The product was found to have an LRV of 31.41, and was calculated to have an inherent viscosity of 0.81 dL/g. By DSC analysis, a broad crystalline Tm was observed at 163.0° C., (25.1 J/g).

Example 8

To a 250 milliliter glass flask was added dimethyl terephthalate, (75.27 grams), 1,4-butanediol, (83.17 grams), dimethyl isophthalate-3-sodium sulfonate, (3.65 grams), dimethyl glutarate, (34.49 grams), 1,2,4-benzenetricarboxylic anhydride, (0.12 grams), sodium acetate, (0.69 grams), and titanium(IV) isopropoxide, (0.15 grams) to form a reaction mixture. The reaction mixture was stirred and heated to 180° C. under a slow nitrogen purge. After achieving 180° C., the reaction mixture was heated to 190° C. over 0.3 hours with stirring under a slow nitrogen purge. After stirring at 190° C. for 0.4 hours, the reaction mixture was then heated to 255° C. over 1.8 hours with stirring and a slow nitrogen purge. The resulting reaction mixture was stirred at 255° C. under a slight nitrogen purge for 1.0 hour. 54.86 grams of a colorless distillate was collected over this heating cycle. The reaction mixture was then staged to full vacuum with stirring at 255° C. The resulting reaction mixture was stirred for 5.4 hours under full vacuum, (pressure less than 100 mtorr). The vacuum was then released with nitrogen and the reaction mass allowed to cool to room temperature. An additional 2.40 grams of distillate was recovered and 118.92 grams of a solid product was recovered. The product was found to have an LRV of 19.92 and was calculated to have an inherent viscosity of 0.61 dL/g. By DSC analysis a broad crystalline Tm was observed at 162.6° C., (24.7 J/g).

Example 9

To a 250 milliliter glass flask was added dimethyl terephthalate, (75.27 grams), 1,4-butanediol, (83.17 grams), dimethyl isophthalate-3-sodium sulfonate, (3.65 grams), dimethyl succinate, (31.48 grams), 1,2,4-benzenetricarboxylic anhydride, (0.12 grams), sodium acetate, (0.69 grams), and titanium(IV) isopropoxide, (0.16 grams) to form a reaction mixture. The reaction mixture was stirred and heated to 180° C. under a slow nitrogen purge. After achieving 180° C., the reaction mixture was heated to 190° C. over 0.3 hours with stirring under a slow nitrogen purge. After stirring at 190° C. for 0.6 hours, the reaction mixture was heated to 200° C. over 0.6 hours with stirring under a slow nitrogen purge. The resulting reaction mixture was stirred at 200° C. for 1 hour with a slight nitrogen purge. The reaction mixture was then heated to 255° C. over 1.0 hour with stirring and a slow nitrogen purge. The resulting reaction mixture was stirred at 255° C. under a slight nitrogen purge for 1.0 hour. 56.00 grams of a colorless distillate was collected over this heating cycle. The reaction mixture was then staged to full vacuum with stirring at 255° C. The resulting reaction mixture was stirred for 3.0 hours under full vacuum, (pressure less than 100 mtorr). The vacuum was then released with nitrogen and the reaction mass allowed to cool to room temperature. An additional 3.3 grams of distillate was recovered and 101 grams of a solid product was recovered. The product was found to have an LRV of 16.11 and was calculated to have an inherent viscosity of 0.54 dL/g. By DSC analysis, a broad crystalline Tm was observed at 167.6° C., (26.9 J/g).

Example 10

To a 250 milliliter glass flask was added dimethyl terephthalate, (66.02 grams), 1,4-butanediol, (58.58 grams), dimethyl isophthalate-3-sodium sulfonate, (2.96 grams), dimethyl glutarate, (24.03 grams), 1,2,4-benzenetricarboxylic anhydride, (0.21 grams), and titanium(IV) isopropoxide, (0.0623 grams) to form a reaction mixture. The reaction mixture was stirred and heated to 180° C. under a slow nitrogen purge. After achieving 180° C., the reaction mixture was heated to 200° C. over 3.1 hours with stirring under a slow nitrogen purge. The resulting reaction mixture was stirred at 200° C. for 1 hour under a slight nitrogen purge. The reaction mixture was then heated to 255° C. over 1.0 hour with a slow nitrogen purge. The resulting reaction mixture was stirred at 255° C. under a slight nitrogen purge for 0.7 hour. 31.0 grams of a colorless distillate was collected over this heating cycle. The reaction mixture was then staged to full vacuum with stirring at 255° C. The resulting reaction mixture was stirred for 3.3 hours under full vacuum, (pressure less than 100 mtorr). The vacuum was then released with nitrogen and the reaction mass allowed to cool to room temperature. An additional 0.5 grams of distillate was recovered and 101.2 grams of a solid product was recovered. The product was found to have an LRV of 9.08 and was calculated to have an inherent viscosity of 0.41 dL/g. By DSC analysis, a crystalline Tm was observed at 173.6° C., (23.2 J/g).

This example illustrates some properties of the sulfonated aliphatic-aromatic copolyesters of the present invention in comparison to known materials. The product made in this example, while having a comparable amount of an aliphatic dicarboxylic acid to known polyesters, but does not contain a glycol other than 1,4-butanediol, was found to have a substantially higher crystalline melting point than some such known polyesters.

Comparative Example CE 2

To a 250 milliliter glass flask was added bis(2-hydroxyethyl) terephthalate, (88.86 grams), ethylene glycol, (6.27 grams), dimethyl isophthalate-3-sodium sulfonate, (0.15 grams), dimethyl glutarate, (24.03 grams), manganese(II) acetate tetrahydrate, (0.042 grams), and antimony(III) trioxide, (0.034 grams) to form a reaction mixture. The reaction mixture was stirred and heated to 180° C. under a slow nitrogen purge. After achieving 180° C., the reaction mixture was heated to 275° C. over 3.6 hours with stirring under a slow nitrogen purge. The resulting reaction mixture was stirred at 275° C. under a slight nitrogen purge for 1 hour. 12.8 grams of a colorless distillate was collected over this heating cycle. The reaction mixture was then staged to full vacuum with stirring at 275° C. The resulting reaction mixture was stirred for 2.4 hours under full vacuum, (pressure less than 100 mtorr). The vacuum was then released with nitrogen and the reaction mass allowed to cool to room temperature. An additional 7.0 grams of distillate was recovered and 64.0 grams of a solid product was recovered. The product was found to have an LRV of 32.7, and was calculated to have an inherent viscosity of 0.84 dL/g. By DSC analysis, a Tg was found with an onset temperature of 35.8° C., a midpoint temperature of 37.6 C, and an endpoint temperature of 39.5° C. A broad crystalline Tm was observed at 185.1° C., (16.8 J/g).

Comparative Example CE 3

To a 250 milliliter glass flask was added dimethyl terephthalate, (48.5 grams), bis(2-hydroxyethyl) terephthalate, (25.40 grams), 1,4-butanediol, (43.40 grams), dimethyl isophthalate-3-sodium sulfonate, (0.15 grams), dimethyl glutarate, (24.30 grams), manganese(II) acetate tetrahydrate, (0.042 grams), and antimony(III) trioxide, (0.035 grams) to form a reaction mixture. The reaction mixture was stirred and heated to 180° C. under a slow nitrogen purge. After achieving 180° C., the reaction mixture was heated to 200° C. over 0.8 hours with stirring under a slow nitrogen purge. The resulting reaction mixture was stirred at 200° C. under a slight nitrogen purge for 1.1 hours. The resulting reaction mixture was then heated to 255° C. over 1.3 hours with stirring under a slight nitrogen purge. The reaction mixture was then stirred at 255° C. for 0.5 hours under a slight nitrogen purge. 16.4 grams of a colorless distillate was collected over this heating cycle. The reaction mixture was then staged to full vacuum with stirring at 255° C. The resulting reaction mixture was stirred for 3 hours under full vacuum, (pressure less than 100 mtorr). The vacuum was then released with nitrogen and the reaction mass allowed to cool to room temperature. An additional 3.9 grams of distillate was recovered and 85.6 grams of a solid product was recovered. The product was found to have an LRV of 12.2, and was calculated to have an inherent viscosity of 0.47 dL/g. By DSC analysis a crystalline Tm was observed at 154.2° C., (24.5 J/g).

Example 11

To a 250 milliliter glass flask was added dimethyl terephthalate, (67.87 grams), 1,4-butanediol, (58.58 grams), dimethyl isophthalate-3-sodium sulfonate, (0.148 grams), dimethyl glutarate, (24.03 grams), manganese(II) acetate tetrahydrate, (0.042 grams), and antimony(III) trioxide, (0.034 grams) to form a reaction mixture. The reaction mixture was stirred and heated to 180° C. under a slow nitrogen purge. After achieving 180° C., the reaction mixture was heated to 255° C. over 2.7 hours with stirring under a slow nitrogen purge. The resulting reaction mixture was stirred at 255° C. under a slight nitrogen purge for 1.0 hour. 35.4 grams of a colorless distillate was collected over this heating cycle. The reaction mixture was then staged to full vacuum with stirring at 255° C. The resulting reaction mixture was stirred for 3.7 hours under full vacuum, (pressure less than 100 mtorr). The vacuum was then released with nitrogen and the reaction mass allowed to cool to room temperature. An additional 1.1 grams of distillate was recovered and 91.0 grams of a solid product was recovered. The product was found to have an LRV of 6.56, and was calculated to have an inherent viscosity of 0.36 dL/g. By DSC analysis a crystalline Tm was observed at 174.3° C., (25.2 J/g).

Comparative Example CE 4

To a 250 milliliter glass flask was added dimethyl terephthalate, (58.26 grams), 1,4-butanediol, (46.80 grams), ethylene glycol, (20.86 grams), dimethyl isophthalate-3-sodium sulfonate, (3.55 grams), dimethyl adipate, (39.72 grams), dimethyl isophthalate, (11.65 grams), manganese (II) acetate tetrahydrate, (0.0586 grams), and antimony(III) trioxide, (0.0471 grams) to form a reaction mixture. The reaction mixture was stirred and heated to 180° C. under a slow nitrogen purge. After achieving 180° C., the reaction mixture was heated to 200° C. over 1.8 hours with stirring under a slow nitrogen purge. The resulting reaction mixture was stirred at 200° C. for 1.3 hours under a slight nitrogen purge. The reaction mixture was then heated to 260° C. over 1.1 hours with stirring under a slight nitrogen purge. The resulting reaction mixture was stirred at 260° C. under a slight nitrogen purge for 1.0 hour. 25.7 grams of a colorless distillate was collected over this heating cycle. The reaction mixture was then staged to full vacuum with stirring at 260° C. The resulting reaction mixture was stirred for 3.1 hours under full vacuum, (pressure less than 100 mtorr). The vacuum was then released with nitrogen and the reaction mass allowed to cool to room temperature. An additional 1.7 grams of distillate was recovered and 107.2 grams of a solid product was recovered. The product was found to have an LRV of 5.63 and was calculated to have an inherent viscosity of 0.35 dL/g. By DSC analysis a broad crystalline Tm was observed at 106.1° C., (1.5 J/g).

Example 12

To a 250 milliliter glass flask was added dimethyl terephthalate, (58.26 grams), 1,4-butanediol, (81.11 grams), dimethyl isophthalate-3-sodium sulfonate, (3.55 grams), dimethyl adipate, (39.72 grams), dimethyl isophthalate, (11.65 grams), manganese(II) acetate tetrahydrate, (0.0586 grams), and antimony(III) trioxide, (0.0471 grams) to form a reaction mixture. The reaction mixture was stirred and heated to 180° C. under a slow nitrogen purge. After achieving 180° C., the reaction mixture was heated to 200° C. over 1.5 hours with stirring under a slow nitrogen purge. The resulting reaction mixture was stirred at 200° C. for 1 hour under a slight nitrogen purge. The reaction mixture was then heated to 260° C. over 2.0 hours with stirring under a slight nitrogen purge. The resulting reaction mixture was stirred at 260° C. under a slight nitrogen purge for 0.8 hours. 41.0 grams of a colorless distillate was collected over this heating cycle. The reaction mixture was then staged to full vacuum with stirring at 260° C. The resulting reaction mixture was stirred for 3.6 hours under full vacuum, (pressure less than 100 mtorr). The vacuum was then released with nitrogen and the reaction mass allowed to cool to room temperature. An additional 0.6 grams of distillate was recovered and 100.8 grams of a solid product was recovered. The product was found to have an LRV of 2.97, and was calculated to have an inherent viscosity of 0.30 dL/g. By DSC analysis, a broad crystalline Tm was observed at 118.6° C., (10.1 J/g).

Example 13

To a 250 milliliter glass flask was added dimethyl terephthalate, (161.18 grams), 1,4-butanediol, (144.2 grams), dimethyl isophthalate-3-sodium sulfonate, (5.92 grams), dimethyl glutarate, (24.02 grams), manganese(II) acetate tetrahydrate, (0.168 grams), and antimony(II) trioxide, (0.068 grams) to form a reaction mixture. The reaction mixture was stirred and heated to 180° C. under a slow nitrogen purge. After achieving 180° C., the reaction mixture was heated to 200° C. over 1.6 hours with stirring under a slow nitrogen purge. The resulting reaction mixture was allowed to stir at 200° C. for 1.0 hour while under a slight nitrogen purge. The stirred reaction mixture was then heated to 255° C. over 1.8 hours under a slight nitrogen purge. The resulting reaction mixture was stirred at 255° C. under a slight nitrogen purge for 0.2 hour. 96.5 grams of a colorless distillate was collected over this heating cycle. The reaction mixture was then staged to full vacuum with stirring at 255° C. The resulting reaction mixture was stirred for 2.6 hours under full vacuum, (pressure less than 100 mtorr). The vacuum was then released with nitrogen and the reaction mass allowed to cool to room temperature. 184.7 grams of a solid product was recovered. The product was found to have an LRV of 2.64, and was calculated to have an inherent viscosity of 0.29 dL/g. By DSC, a crystalline Tm was observed at 178.0° C., (29.7 J/g).

Example 14

A polymer prepared as described in Example 6, except at a larger scale, is dried in a hopper dryer for 8 hours at 60° C. to a −40° C. dew point. The material is then fed at a rate of 20 pounds per hour into the feed section of a 1½-inch diameter single screw Davis Standard extruder, (screw L/D of 24:1, model number DS-15H). The extruder conditions and temperature profile are noted below. The molten polymer is then fed into a Killion 3 roll stack sheet line under the conditions and temperature profile noted below.
Extruder Zone 1 temperature, (feed section): 290° F.
Extruder Zone 2 temperature: 335° F.
Extruder Zone 3 temperature: 335° F.
Extruder Zone 4 (front) temperature: 315° F.
Flange: 335° F.
Pipe: 335° F.
Flange: 335° F.
Die temperature: 330° F.
Die Lips: 330° F.
Melt Temperature: 335° F.
Extruder Amps: 3.4
Extruder RPM: 50
Chill Roll Top temperature: 70° F.
Chill Roll Middle temperature: 70° F.
Chill Roll Bottom temperature: 70° F.
Film Take Off Speed: 275 inches/minute A film 8 inches wide with a thickness of 0.003 inches, (3 mils), is produced. The film is tested as a fast food sandwich wrap packaging.

Example 15

2 inch squares of the film produced in Example 14 are preheated to 50° C. for 4 minutes, being careful not to allow the hot air to impinge directly onto the film so as to avoid hot spots, and biaxially oriented on a tenter frame T. M. Long Biaxial stretcher. The draw ratio of the stretcher is set at 3 times 3 and the stretching rate is 5 inches per second (12.7 cm/second). The biaxially stretched film is found to have at least a 10 percent greater tensile strength in both the machine direction, (MD), and in the transverse direction, (TD), than does an undrawn film. The biaxially stretched film is tested as a fast food sandwich wrap packaging.

Examples 16–26

Polymers prepared as described above in the Examples listed below in Table 1, except at a larger scale, are dried in a hopper dryer for 8 hours at 60° C. to a −40° C. dew point. The materials are placed in the hopper of a single screw volumetric feeder, (K-tron Model No. 7), from which they free fall to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 RPM screw speed with the heater profile shown in Table 1.

TABLE 1

| | | Extruder Heater Profile | | | | | | |
|---|---|---|---|---|---|---|---|---|
| Example | Polymer Example | Zone 1 (C. °) | Zone 2 (C. °) | Zone 3 (C. °) | Zone 4 (C. °) | Zone 5 (C. °) | Die (C. °) | Melt (C. °) |
| 16 | 1 | 120 | 150 | 150 | 150 | 155 | 160 | 165 |
| 17 | 2 | 120 | 150 | 150 | 150 | 155 | 160 | 165 |
| 18 | 3 | 125 | 155 | 155 | 155 | 160 | 165 | 170 |
| 19 | 4 | 115 | 145 | 145 | 145 | 150 | 155 | 160 |

TABLE 1-continued

| | | Extruder Heater Profile | | | | | | |
|---|---|---|---|---|---|---|---|---|
| Example | Polymer Example | Zone 1 (C. °) | Zone 2 (C. °) | Zone 3 (C. °) | Zone 4 (C. °) | Zone 5 (C. °) | Die (C. °) | Melt (C. °) |
| 20 | 5 | 140 | 175 | 175 | 175 | 180 | 185 | 190 |
| 21 | 7 | 150 | 185 | 185 | 185 | 190 | 195 | 200 |
| 22 | 9 | 155 | 190 | 190 | 190 | 195 | 200 | 205 |
| 23 | 10 | 160 | 195 | 195 | 195 | 200 | 205 | 210 |
| 24 | 11 | 160 | 195 | 195 | 195 | 195 | 200 | 205 |
| 25 | 12 | 100 | 140 | 140 | 140 | 140 | 145 | 145 |
| 26 | 13 | 165 | 200 | 200 | 200 | 205 | 210 | 210 |

The extruded polymer films are electrostatically pinned on an 12 inch diameter smooth quench drum maintained at a temperature of 26° C. with cold water and collected on release paper using a standard tension roll. The quench drum speed is adjusted from 5 to 15 feet per minute to obtain film samples with a thickness of about 8 mils to about 1.5 mils.

The films of Examples 16 to 26 are tested as fast food sandwich wraps and are found to have excellent deadfold performance. The films of Examples 16 to 26 are tested for toughness, as measured by Elmendorf Tear, Graves Tear, and percent elongation at break, and strength, as measured by tensile strength at break and tensile modulus.

10 inch by 16 inch rectangles are cut out of the film of Example 18, Example 25, Comparative Example CE 6 and Comparative Example CE 7 and the size accurately measured. The film rectangles are placed in a Fisher Scientific Isotemp Incubator, Model Number 625D, heated to 60° C. for 1 hour. The sizes of the film rectangles are then accurately remeasured.

Examples 27–38

The films produced in the Examples listed below in Table 2, having a thickness of between about 1.5 mils to 8 mils, were sent through a Machine Direction Orienter (MDO) Model Number 7200 from the Marshall and Williams Company of Providence, R.I. The MDO unit was preheated to the temperature listed in Table 2, below, and the film is stretched as noted below in Table 2 while at that temperature. For example, MDO stretch of "3×" for a 1 meter long film means that the film is stretched to a resultant length of 3 meters.

TABLE 2

| Example | Cast Film Example | MDO Temperature (° C.) | MDO Stretch |
|---|---|---|---|
| 27 | 16 | 40 | 3X |
| 28 | 17 | 40 | 3X |
| 29 | 17 | 50 | 4X |
| 30 | 18 | 50 | 3.5X |
| 31 | 19 | 40 | 4X |
| 32 | 20 | 55 | 3X |
| 33 | 21 | 60 | 4.5X |
| 34 | 22 | 60 | 3.5X |
| 35 | 23 | 60 | 3X |
| 36 | 24 | 60 | 3X |
| 37 | 25 | 35 | 4X |
| 38 | 26 | 60 | 3.5X |

Results: Remove if Prophetic

The uniaxially stretched films of Examples 27 to 38 are found to have at least a 10 percent greater tensile strength in the machine direction (MD) than the corresponding undrawn films. The uniaxially stretched films of Examples 27 to 38 are tested as a fast food sandwich wrap packaging and found to have excellent deadfold performance.

Examples 39–49

2 inch squares of the films produced above and detailed in Table 3 below are preheated to the temperature noted below in Table 3 for 4 minutes, (being careful not to allow the hot air to impinge directly onto the film so as to avoid hot spots), and biaxially oriented on a tenter frame T. M. Long Biaxial stretcher. The draw ratio of the stretcher is set at 3 times 3 and the stretching rate is 5 inches per second (12.7 cm/second).

TABLE 3

| Example | Cast Film Example | Biaxial Stretch Temperature (° C.) |
|---|---|---|
| 39 | 16 | 45 |
| 40 | 17 | 50 |
| 41 | 18 | 55 |
| 42 | 19 | 45 |
| 43 | 20 | 60 |
| 44 | 21 | 65 |
| 45 | 22 | 65 |
| 46 | 23 | 60 |
| 47 | 24 | 65 |
| 48 | 25 | 45 |
| 49 | 26 | 60 |

The tensile strength in both the machine direction, (MD), and in the transverse direction, (TD) is measured. The biaxially stretched films are tested as a fast food sandwich wrap packaging.

Examples 50–54

A polymer prepared as described in Example 10, except at a larger scale, is dried in a hopper dryer for 8 hours at 75° C. to a −40° C. dew point. The material is powder blended with 0.10 weight percent (based on polymer weight) Irganox-1010, a hindered phenolic antioxidant from the Ciba Company. The material is placed in the hopper of a single screw volumetric feeder, (K-tron Model No. 7), from which it free falls to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 RPM screw speed with a heater profile as follows:

| Zone 1 (C. °) | Zone 2 (C. °) | Zone 3 (C. °) | Zone 4 (C. °) | Zone 5 (C. °) | Die (C. °) |
|---|---|---|---|---|---|
| 160 | 190 | 195 | 195 | 200 | 205 |

A plasticizer, acetyl tri-n-butyl citrate, from Morflex, Inc., is injected into zone 2 at a rate to provide the compositions listed below in Table 4 with an Accurate feeder. The quantity of plasticizer listed in Table 4 is based on the weight of the total composition.

TABLE 4

| Example | Plasticizer (wt. %) |
|---|---|
| 50 | 0 |
| 51 | 5 |
| 52 | 10 |
| 53 | 15 |
| 54 | 20 |

The extruded polymer film is electrostatically pinned on an 12 inch diameter smooth quench drum maintained at a temperature of 26° C. with cold water and collected on release paper using a standard tension roll. The quench drum speed is adjusted from 5 to 15 feet per minute to obtain film samples with a thickness of about 8 mils to about 1.5 mils. The films are tested as fast food sandwich wrap packaging.

Examples 55–60

A polymer prepared as in Example 6, above, except at a larger scale, is dried overnight in a large tray dryer at 60° C. with hot dry air recirculation to a moisture content of less than 0.04 percent. Corn starch, (Corn Products 3005 from CPC International, Inc.), and rice starch, (Sigma Chemicals catalog number S7260), are dried in a large tray vacuum oven at 90° C. and less than 1 mm Hg vacuum to a moisture content of less than 1 percent and stored in sealed containers until used. Polyethylene adipate, (Rucoflex® S-101–55, nominal molecular weight of 2000, from the Ruco Polymer Corporation), is used as received without pretreatment.

Blends of the polymer and starch are made by manually tumbling the materials in plastic bags. The dry starch is added to the warm polymer from the dryer, and the warm mixture fed to the extruder. When Rucoflex® polyethylene adipate is used, the polyethylene adipate is melted and liquid injected into the second heater zone of the extruder through a metering pump. The final compositions listed in Table 5, below are prepared.

TABLE 5

| Example | Polymer (wt. %) | Cornstarch (wt. %) | ric starch (wt. %) | poly thylen adipate (wt. %) |
|---|---|---|---|---|
| 55 | 80 | 20 | | |
| 56 | 60 | 40 | | |
| 57 | 55 | 40 | | 5 |
| 58 | 45 | 35 | | 20 |
| 59 | 60 | | 40 | |
| 60 | 45 | 35 | | 20 |

The blends are placed, with a nitrogen purge, in the feed hopper of a Ktron twin screw feeder, (Model Number T-35 with 190 6300 controller), and metered to a Werner and Pfleider ZSK 30 mm twin screw extruder having an L/D of 30/1 with a vacuum port and a mild mixing screw. The temperature of the extruder barrel is electrically heated from 135° C. at the feed end of the extruder to 170° C. at the discharge. The extruder is operated at 150 RPM, and the vacuum port is connected to house vacuum and permitted to fluctuate with process conditions. A single hole die, (⅛-inch diameter) is used for discharge of a strand. The resulting strand is quenched in a 6 foot long water trough, dewatered with an air knife and cut into pellets with a Conair cutter, (Model number 304). Operating conditions for each composition are listed below in Table 6.

TABLE 6

| Example Number | Feed Rate (pph) | Screw Torque (% max.) | Die Pressure (psig) | Melt Temperature (C. °) | Vacuum (Inches Hg) |
|---|---|---|---|---|---|
| 55 | 34 | 58 | 800 | 175 | 13 |
| 56 | 32 | 60 | 800 | 180 | 13 |
| 57 | 31 | 50 | 750 | 175 | 12 |
| 58 | 32 | 35 | 600 | 170 | 12 |
| 59 | 33 | 60 | 800 | 180 | 13 |
| 60 | 32 | 35 | 600 | 170 | 13 |

Examples 61–66

The polymer-starch blends prepared above in Examples 55 to 60 are dried in a hopper dryer for 8 hours at 70° C. to a −40° C. dew point. The materials are placed in the hopper of a single screw volumetric feeder, (K-tron Model No. 7), from which they free fall to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 RPM screw speed with a heater profile as follows:

| Zone 1 (C. °) | Zone 2 (C. °) | Zone 3 (C) | Zone 4 (C. °) | Zone 5 (C. °) | Die (C. °) | Melt (C. °) |
|---|---|---|---|---|---|---|
| 135 | 170 | 180 | 180 | 180 | 185 | 190 |

The extruded polymer films are electrostatically pinned on an 12 inch diameter smooth quench drum maintained at a temperature of 26° C. with cold water and collected on release paper using a standard tension roll. The quench drum speed is adjusted from 5 to 15 feet per minute to obtain film samples with a thickness of about 8 mils to about 1.5 mils.

TABLE 7

| Example | Starch Blend Example |
|---|---|
| 61 | 55 |
| 62 | 56 |
| 63 | 57 |
| 64 | 58 |
| 65 | 59 |
| 66 | 60 |

The films are tested as fast food sandwich packaging.

Examples 67–73

A polymer prepared as in Example 8, above, except at a larger scale, is dried overnight in a large tray dryer at 60° C.

with hot dry air recirculation to a moisture content of less than 0.04 percent. Talc, (from Luzenac, located in Englewood, Colo., having a particle size of 3.8 microns), titanium dioxide, (supplied by Kerr-McGee Chemical, LLC, located in Oklahoma City, Okla., grade Tronox® 470, having a particle size of 0.17 micron), and calcium carbonate, (from ECCA Calcium Products, Inc., of Sylacauga, Ala., ECC Supercoat(T) grade with a 1 micron average particle size), are dried in a large tray vacuum oven at 90° C. and less than 1 mm Hg vacuum to a moisture content of less than 1 percent and stored in sealed containers until used.

Blends of the polymer and the inorganic fillers are made by manually tumbling the materials in plastic bags. The dry inorganic fillers are added to the warm polymer from the dryer, and the still warm mixture fed to the extruder. The compositions listed in Table 8, below, are prepared.

TABLE 8

| Example | Polymer (wt. %) | Talc (wt. %) | Titanium dioxide (wt. %) | Calcium carbonate (wt. %) |
|---|---|---|---|---|
| 67 | 85 | 2.5 | 5 | 7.5 |
| 68 | 70 | 5 | 5 | 20 |
| 69 | 70 | 5 | 10 | 15 |
| 70 | 30 | 10 | 15 | 45 |
| 71 | 95 | 5 | | |
| 72 | 95 | | 5 | |
| 73 | 70 | | | 30 |

The blends are placed, with a nitrogen purge, in the feed hopper of a Ktron twin screw feeder, (Model Number T-35 with 190 6300 controller), and metered to a Werner and Pfleider ZSK 30 mm twin screw extruder having an L/D of 30/1 with a vacuum port and a hard mixing screw. The temperature of the extruder barrel is electrically heated from 150° C. at the feed end of the extruder to 200° C. at the discharge. The extruder is operated at 150 RPM, and the vacuum port is connected to house vacuum and permitted to fluctuate with process conditions. A single hole die, (⅛-inch diameter), is used for discharge. The resulting strand is quenched in a 6 foot long water trough, dewatered with an air knife and cut into pellets with a Conair cutter, (Model number 304). Specific operating conditions for the individual compositions are listed below in Table 9.

TABLE 9

| Example Number | Feed Rate (pph) | Screw Torque (% max.) | Die Pressure (psig) | Melt Temperature (C. °) | Vacuum (Inches Hg) |
|---|---|---|---|---|---|
| 67 | 34 | 58 | 800 | 195 | 13 |
| 68 | 30 | 70 | 800 | 215 | 13 |
| 69 | 31 | 70 | 800 | 215 | 12 |
| 70 | 32 | 80 | 800 | 225 | 12 |
| 71 | 33 | 50 | 600 | 195 | 13 |
| 72 | 32 | 50 | 600 | 195 | 13 |
| 73 | 30 | 70 | 800 | 215 | 12 |

Examples 74–80

The polymer-inorganic filler blends prepared above in Examples 67–73 and a polymer prepared similarly to that described for Example 8, above, except at a larger scale, are dried in a hopper dryer for 8 hours at 60° C. to a −40° C. dew point. The materials are placed in the hopper of a single screw volumetric feeder, (K-tron Model No. 7), from which they free fall to the inlet of a 28 mm Werner and Pfleider twin screw extruder with a vacuum port maintained at house vacuum attached to a 10 inch wide film die with about a 0.010 inch gap. Example 77 is composed of a tumbled blend of 50 weight percent of Example 70 and 50 weight percent of Example 8. A dry nitrogen purge is maintained in the feed hopper and the feed throat of the extruder. The extruder is operated at a 150 RPM screw speed with the following heater profile:

| Zone 1 (C. °) | Zone 2 (C. °) | Zone 3 (C. °) | Zone 4 (C. °) | Zone 5 (C. °) | Die (C. °) | Melt (C. °) |
|---|---|---|---|---|---|---|
| 170 | 195 | 210 | 210 | 210 | 215 | 220 |

The extruded polymer films are electrostatically pinned on a 12 inch diameter smooth quench drum maintained at a temperature of 26° C. with cold water and collected on release paper using a standard tension roll. The quench drum speed is adjusted from 5 to 15 feet per minute to obtain film samples with a thickness of about 8 mils to about 1.5 mils.

TABLE 10

| Example | Blend Example |
|---|---|
| 74 | 67 |
| 75 | 68 |
| 76 | 69 |
| 77 | 50 wt. % 70 and 50 wt. % 8 |
| 78 | 71 |
| 79 | 72 |
| 80 | 73 |

The films are tested for use in fast food sandwich packaging.

Examples 81–86

Polymers prepared as described in the Examples noted below in Table 11, except at a larger scale, are dried overnight at 60° C. in a dehumidified air dryer. The dried polymers are fed to a laboratory scale blown film line that includes a Killion 1.25 inch diameter extruder with a 15:1 gear reducer. The extruder heater zones are set around the temperature noted below in Table 11. The screw is a Maddock mixing type with an L/D of 24 to 1. The compression ratio for the mixing screw is 3.5:1. The screw speed is 25 to 30 RPM. A 1.21 inch diameter die with a 25 mil die gap is used. The air ring is a Killion single-lip, No. 2 type. Blowing conditions can be characterized by the blow up ratio, (BUR), which is the ratio of the bubble diameter to die the die diameter which gives an indication of hoop or transverse direction, (TD), stretch, or the draw-down ratio, (DDR), which is an indication of the axial or machined direction, (MD), stretch. The greater the level of stretch, the greater the orientation in the film.

TABLE 11

| Example Number | Polymer Example Number | Extruder Heater Zones (C. °) | Film Thickness (mils) | BUR | DDR |
|---|---|---|---|---|---|
| 81 | 2 | 150 | 2.5 | 3.2 | 3.9 |
| 82 | 8 | 185 | 2.0 | 2.6 | 4.6 |
| 83 | 13 | 200 | 1.2 | 3.1 | 8.0 |
| 84 | 60 | 170 | 2.0 | 2.5 | 5.0 |
| 85 | 67 | 195 | 1.5 | 3.0 | 7.0 |
| 86 | 69 | 215 | 2.3 | 2.0 | 2.0 |

The tubular films are slit and tested as fast food sandwich packaging.

Examples 87–89

Bilayer films are produced on a 10 inch, two layer, Streamlined Coextrusion Die, (SCD), blown film die manufactured by Brampton Engineering. Layer configuration of the die is as follows from outside to inside layers of the die, A/B. Two 3½ inch David Standard extruders fed the A and B layers. The process line further utilizes a Brampton Engineering rotating air ring for polymer cooling. Layer A contains a polymer prepared similarly to that described for Example 10, except at a larger scale. Layer B contains a polymer prepared similarly to that described for Example 2, except at a larger scale. Both polymers are dried in a dehumidified dryer at 60° C. The operation was tailored to provide the layer ratios for the films noted below in Table 12 as of the total film structure. The thickness of the film is about 2.25 mil (0.00225 inch). The processing conditions for the film are provided in Table 13, below.

TABLE 12

| Example | Layer A (wt. %) | Layer B (wt. %) |
|---|---|---|
| 87 | 25 | 75 |
| 88 | 50 | 50 |
| 89 | 75 | 25 |

TABLE 13

| | Extruder A | Extruder B |
|---|---|---|
| Zone 1 | 160° C. | 115° C. |
| Zone 2 | 185° C. | 140° C. |
| Zone 3 | 195° C. | 150° C. |
| Zone 4 | 195° C. | 150° C. |
| Zone 5 | 200° C. | 155° C. |
| Screen Changer | 195° C. | 150° C. |
| Adapter 1 | 195° C. | 150° C. |
| Adapter 2 | 195° C. | 150° C. |
| Adapter 4 | 195° C. | 150° C. |
| Die 1 | 195° C. | 195° C. |
| Die 2 | 195° C. | 195° C. |
| Die 3 | 195° C. | 195° C. |
| Line Speed | 122 feet per minute | |
| Notes | 10 | 2 |

The multilayer films prepared above are converted into bags using an inline bag machine manufactured by Battenfeld Gloucester Engineering Co., Inc. downstream of the extrusion line nips. The slit films are tested as fast food sandwich wraps.

Example 90–92

Bilayer films are produced on a 10 inch, two layer, Streamlined Coextrusion Die, (SCD), blown film die manufactured by Brampton Engineering. Layer configuration of the die is as follows from outside to inside layers of the die, A/B. Two 3½ inch David Standard extruders fed the A and B layers. The process line further utilizes a Brampton Engineering rotating air ring for polymer cooling. Layer A contains a polymer prepared similarly to that described for Example 68, except at a larger scale. Layer B contains a polymer prepared similarly to that described for Example 5, except at a larger scale. Both polymers are dried in a dehumidified dryer at 60° C. The operation was tailored to provide the layer ratios for the films noted below in Table 14 as of the total film structure. The thickness of the film is about 2.25 mil (0.00225 inch). The processing conditions for the film are provided in Table 15, below.

TABLE 14

| Example | Layer A (wt. %) | Layer B (wt. %) |
|---|---|---|
| 90 | 25 | 75 |
| 91 | 50 | 50 |
| 92 | 75 | 25 |

TABLE 15

| | Extruder A | Extruder B |
|---|---|---|
| Zone 1 | 155° C. | 140° C. |
| Zone 2 | 170° C. | 160° C. |
| Zone 3 | 215° C. | 175° C. |
| Zone 4 | 215° C. | 175° C. |
| Zone 5 | 220° C. | 180° C. |
| Screen Changer | 215° C. | 175° C. |
| Adapter 1 | 215° C. | 175° C. |
| Adapter 2 | 215° C. | 175° C. |
| Adapter 4 | 215° C. | 175° C. |
| Die 1 | 215° C. | 215° C. |
| Die 2 | 215° C. | 215° C. |
| Die 3 | 215° C. | 215° C. |
| Line Speed | 122 feet per minute | |
| Notes | 68 | 5 |

The multilayer films prepared above are converted into bags using an inline bag machine manufactured by Battenfeld Gloucester Engineering Co., Inc. downstream of the extrusion line nips. The slit films are tested as fast food sandwich wraps.

Examples 93–95

Bilayer films are produced on a 10 inch, two layer, Streamlined Coextrusion Die, (SCD), blown film die manufactured by Brampton Engineering. Layer configuration of the die is as follows from outside to inside layers of the die, A/B. Two 3½ inch David Standard extruders fed the A and B layers. The process line further utilizes a Brampton Engineering rotating air ring for polymer cooling. Layer A contains a starch-filled polymer prepared similarly to that described for Example 58. Layer B contains Eastar® Bio, from the Eastman Chemical Company and as described above. Both polymers are dried in a dehumidified dryer at 60° C. The operation was tailored to provide the layer ratios for the films noted below in Table 16 as of the total film structure. The thickness of the film is about 2.25 mil (0.00225 inch). The processing conditions for the film are provided in Table 17, below.

TABLE 16

| Example | Layer A (wt. %) | Layer B (wt. %) |
|---|---|---|
| 93 | 25 | 75 |
| 94 | 50 | 50 |
| 95 | 75 | 25 |

TABLE 17

|  | Extruder A | Extruder B |
| --- | --- | --- |
| Zone 1 | 140° C. | 100° C. |
| Zone 2 | 160° C. | 115° C. |
| Zone 3 | 170° C. | 130° C. |
| Zone 4 | 170° C. | 130° C. |
| Zone 5 | 175° C. | 135° C. |
| Screen Changer | 170° C. | 130° C. |
| Adapter 1 | 170° C. | 130° C. |
| Adapter 2 | 170° C. | 130° C. |
| Adapter 4 | 170° C. | 130° C. |
| Die 1 | 170° C. | 170° C. |
| Die 2 | 170° C. | 170° C. |
| Die 3 | 170° C. | 170° C. |
| Line Speed |  | 122 feet per minute |

The multilayer films prepared above are converted into bags using an inline bag machine manufactured by Battenfeld Gloucester Engineering Co., Inc. downstream of the extrusion line nips. The slit films are tested as fast food sandwich wraps.

Examples 96–125

Polyester resins prepared as described in the Examples listed below in Table 18, except at a larger scale, are dried in a desiccant air dryer with a dew point of −40° C. overnight at a temperature of 60° C. The polyester resins are extrusion coated onto paperboard stock by feeding the dried pellets into a 2.5 inch commercial extruder having a barrel length to diameter ratio of 28:1. The five zones of the extruder are maintained at a temperature in the range noted below within Table 18. A single flight screw having eight compression flights, four metering flights, a two flight mixing section and six metering flights is used in the extruder. The screw speed is maintained at 180 revolutions per minute, (RPM). The molten polyester resins are passed through three 24×24 mesh screens. The polymers are passed through a center fed die with 0.75 inch lands having a die opening of 36 inches by 0.02 inches. The extrusion feed rate is held constant at 460 pounds per hour. The resulting extrudates are passed through a 5 inch air gap into the nip formed by a rubber-covered pressure roll and a chill roll. At the same time the paperboard stock noted below in Table 18, that is 32 inches wide, is fed into the nip with the roll in contact with the film. A nip pressure of 100 pounds per linear inch is applied. A 24 inch diameter mirror finished chill roll is maintained at a temperature of 19° C. during the extrusion trials. The coated paperboard is taken off the chill roll at a point 180 degrees from the nip formed by the pressure roll and the chill roll. The chill roll is operated at linear speeds of 300 feet per minute. At this coating speed, a polyester resin thickness of 1.25 mils is obtained. The polyester resin thickness can be varied through operational modifications.

TABLE 18

| Polymer Example | Extruder Example | Paper/Paperboard Temperature (° C.) | Stock |
| --- | --- | --- | --- |
| 96 | 1 | 160 | Parchment |
| 97 | 3 | 160 | 15 pound basis weight kraft paper |
| 98 | 4 | 155 | 18 pound basis weight natural paper |
| 99 | 5 | 185 | 18 pound basis weight bleached paper |
| 100 | 8 | 190 | 25 pound basis weight bleached kraft paper |
| 101 | 9 | 200 | 35 pound basis weight natural kraft paper |
| 102 | 10 | 205 | Parchment |
| 103 | 11 | 205 | 15 pound basis weight kraft paper |
| 104 | 12 | 150 | 18 pound basis weight bleached paper |
| 105 | 13 | 210 | 25 pound weight basis bleached kraft paper |
| 106 | 1 | 160 | Trilayered cup paperboard (210 g/m2 weight) |
| 107 | 3 | 160 | Trilayered cup paperboard (210 g/m2 weight) |
| 108 | 4 | 155 | Trilayered cup paperboard (210 g/m2 weight) |
| 109 | 5 | 185 | Trilayered cup paperboard (210 g/m2 weight) |
| 110 | 8 | 190 | Trilayered cup paperboard (210 g/m2 weight) |
| 111 | 9 | 200 | Trilayered cup paperboard (210 g/m2 weight) |
| 112 | 10 | 205 | Trilayered cup paperboard (210 g/m2 weight) |
| 113 | 11 | 205 | Trilayered cup paperboard (210 g/m2 weight) |
| 114 | 12 | 150 | Trilayered cup paperboard (210 g/m2 weight) |
| 115 | 13 | 210 | Trilayered cup paperboard (210 g/m2 weight) |
| 116 | 1 | 160 | 18 point paperboard |
| 117 | 3 | 160 | 12 point paperboard |
| 118 | 4 | 155 | 18 point paperboard |
| 119 | 5 | 185 | 12 point paperboard |
| 120 | 8 | 190 | 18 point paperboard |
| 121 | 9 | 200 | 12 point paperboard |
| 122 | 10 | 205 | 18 point paperboard |
| 123 | 11 | 205 | 12 point paperboard |
| 124 | 12 | 150 | 18 point paperboard |
| 125 | 13 | 210 | 12 point paperboard |

The polyesters made in Examples 96–105 are tested as fast food sandwich wrap packaging.

The polyesters made in Examples 96–105 are formed and heat sealed by conventional processes into the shape of envelopes, bags, including for, for example, waste, trash, leaf, airsickness, and groceries. The polyesters made in Examples 106–115 are formed by conventional processes into the shape of cups, glasses, bowls, trays, liquid containers and cartons, suitable for, for example, milk, juice, water, wine, yogurt, cream, and soda.

The polyesters made in Examples 116–125 are formed by conventional processes into the shape of trays, boxes, lidded sandwich containers, lidded salad containers, hinged lid sandwich containers, and hinged lid salad containers.

Example 126

Extrusion-coated paper laminates are prepared as described below. A resin produced as in Example 7, above, except at a larger scale, is dried at 60° C. overnight. The resin is then placed in a hopper above the inlet of a 1 inch, (2.5 cm), extruder, (Echlin Manufacturing Company Serial Number 0717), with an 18 inch wide film die with a 0.007 inch gap. An 18 inch wide nonwoven fabric is led continuously at a speed of 47–106 feet/minute through an extrusion coating machine made by Bertek Inc., of St. Albans, Vt. The paper to be coated, (11 inch wide, 18 pound paperstock), is fed over this support fabric, and the assembly is led through a corona treatment, (made by Intercon), through an S-warp between tow 4 inch diameter rolls, heated to 150–260° F., onto a polytetrafluoroethylene-coated, matte-finished chill roll with a diameter of 12 inches, (30 cm.), at 100–200° F., around 300 degrees of the circumference of this 12 inch diameter roll, while the resin is extruded through the die at a delivery rate found appropriate to yield a coating of the desired thickness, at a position between the chill and nip rolls as close as possible to the chill roll, (about 0.25–0.50 inches). The polymer temperature in the extruder is 355° F. and the polymer temperature in the die is 360° F. The polymer temperature can be adjusted to minimize flow irregularity. A film with 0.5 mil thickness is applied to the paper. The paper laminate is tested as a fast food sandwich wrap packaging.

Pieces of the above laminates, (8-inch by 8-inch squares), are placed in a rotary composter with about 0.5 cubic yards squared of mixed municipal solid waste, (from which glass, cans, and much of the light plastic and paper is removed), and sewage sludge in the ratio of about 2:1. The composter is rotated once a week and the temperature and moisture content is monitored. The laminates are tested for biodegradability.

Example 127

Extrusion-coated paper laminates are prepared as described below.

A resin produced as in Example 6, above, except at a larger scale, is dried at 60° C. overnight. The resin is then placed in a hopper above the inlet of a 1 inch, (2.5 cm), extruder, (Echlin Manufacturing Company Serial Number 0717), with an 18 inch wide film die with a 0.007 inch gap. An 18 inch wide nonwoven fabric is led continuously at a speed of 47–106 feet/minute through an extrusion coating machine made by Bertek Inc., of St. Albans, Vt. The paper to be coated, (11 inch wide, 18 pound basis weight bleached Kraft paperstock), is fed over the nonwoven fabric, and the paper and fabric are led through a corona treatment, (made by Intercon), through an S-warp between tow 4 inch diameter rolls, heated to 150–260° F., onto a polytetrafluoroethylene-coated, matte-finished chill roll with a diameter of 12 inches, (30 cm.), at 100–200° F., around 300 degrees of the circumference of the 12 inch diameter roll, while the resin is extruded through the die at a delivery rate found appropriate to yield a coating of the desired thickness, at a position between the chill and nip rolls as close as possible to the chill roll, (about 0.25–0.50 inches). The polymer temperature in the extruder is 315° F. and the polymer temperature in the die is 320° F. The polymer temperature can be adjusted to minimize flow irregularity. A film with 0.5 mil thickness is applied to the paper. The paper laminate is tested as a fast food sandwich wrap packaging.

Pieces of the above laminates (8-inch by 8-inch squares) are placed in a rotary composter with about 0.5 cubic yards squared of mixed municipal solid waste, (from which glass, cans, and much of the light plastic and paper is removed), and sewage sludge in the ratio of about 2:1. The composter is rotated once a week and the temperature and moisture content is monitored. The laminates are tested for biodegradability.

Example 128

A polymer prepared as described in Example 2, except at a larger scale, and poly(lactide), (from the Cargill Dow Company), are dried in a hopper dryer overnight at 60° C. to a −40° C. dew point. On a trilayered paperboard that weighs 210 grams/meter2 with a forward speed of 150 meters/minute is coextruded the Example 2 polymer and poly(lactide) in a weight ratio of 1:3. The melt temperature of the Example 2 polymer is 150° C. and the melt temperature of the poly(lactide) is 240° C. A coated paperboard is obtained wherein the total weight of the polymeric coating is 19.4 grams/meter$^2$ in a weight ratio of 75 weight percent of the poly(lactide), which formed the outer layer, and 25 weight percent of the polymer from Example 2, which formed the inner layer adhered to the paperboard.

The paperboard prepared above is formed by conventional processes into the shape of cups, glasses, bowls, trays, liquid containers and cartons, suitable for, for example, milk, juice, water, wine, yogurt, cream, and soda.

Examples 129–134

Calendered paper laminates are prepared by making an assembly of the film produced as described above in the Examples noted below in Table 19, coating onto release paper, in contact with a similar sized sheet of paper to be coated, and then pressing the assembly through the nip between a heated polished metal top roll and an unheated resilient (silk) roll at a surface speed of 5 yards/minute, at a temperature of 200° F. and under a pressure of 10 tons.

Details of the various paper substrates used in making the laminated paper products are given in Table 19, below.

TABLE 19

| Example | Film Example | Paper Substrate | Paper Basis Wt./Thickness (oz/yd.sup.2/mils) |
|---|---|---|---|
| 129 | 17 | Towel, (Scott, Viva) | 1.2/6 |
| 130 | 21 | Towel, (G. P., Sparkle) | 1.3/10 |
| 131 | 32 | Toilet Tissue, (Charmin) | 0.9/6 |
| 132 | 52 | Wrapping Tissue, (white) | 0.5/2 |
| 133 | 63 | Newsprint | 1.5/4 |
| 134 | 74 | Kraft, (recycled) | 2.8/6 |

Pieces of the above laminates (8-inch by 8-inch squares) are placed in a rotary composter with about 0.5 cubic yards squared of mixed municipal solid waste (from which glass, cans, and much of the light plastic and paper is removed), and sewage sludge in the ratio of about 2:1. The composter is rotated once a week and the temperature and moisture content is monitored. The laminates are tested for biodegradability.

Example 135

A laminated stock is produced from a combination of a paperboard and a corona-treated polyester film using a combination of two water-acrylic based acrylic adhesive formulations. The paperboard base stock is a bleached white paperboard of the type typically referred to as a solid bleached sulfate (SBS) paperboard, which is well known as a base stock for food packaging materials. The particular paperboard used here is uncoated milk carton stock with a thickness of 0.0235 inch and weighing 282 pounds per 3,000 square feet. The film is produced as described in Example 32, above, and is corona discharge treated by conventional means on one side to enhance adhesive bonding. The lamination process is run on a conventional wet-bond laminating machine with adhesive stations for applying adhesive to both the paperboard and to the film. Adhesive is applied to the paperboard with a 110 line gravure roll applicator delivering about 3 pounds of wet adhesive per 1,000 square feet of paperboard. The adhesive applied to the paperboard consists of 200 pounds of Rhoplex® N-1031 acrylic latex from the Rohm & Haas Company and 1.5 ounces of Foamaster NXZ defoamer (predispersed in an equal volume of water) from the Diamond Shamrock Chemical Company. Adhesive is applied to the corona-treated side of the polyester film. The adhesive applied consists of 375 pounds of Rhoplex® N-1031 acrylic latex from the Rohm & Haas Company, 11.5 pounds of Cymel® 325 melamine-formaldehyde crosslinking agent, 11.5 pounds of isopropyl alcohol, 23 pounds of water, and 3 ounces of Foamaster NXZ defoamer (predispersed in an equal volume of water) from the Diamond Shamrock Chemicals Company.

The laminating process is run with the paperboard and the film running simultaneously through the respective adhesive application stations, and then the paperboard and the film are both directed into a laminating nip where the two adhesive-coated surfaces are joined with the adhesive still moist on both surfaces. The laminating machine is run at a rate of 300 to 350 feet per minute. The laminated stock is run the laminating nip into a hot air oven with an air temperature of 400 degrees F. Residence time for the laminated stock in the oven is about 5 seconds. The laminated stock is then run over a chill roll and rewound into a finished roll.

The laminated stock prepared above is formed by conventional processes into the shape of cups, glasses, bowls, trays, liquid containers and cartons, suitable for, for example, milk, juice, water, wine, yogurt, cream, and soda.

Examples 136–165

These examples demonstrate the lamination of films containing the copolyesters of the present invention onto preformed substrates. The operation is conducted in a Lab Form Inc. forming machine with a 10 by 10-inch platen. The preformed substrate is shuttled onto the platen. The film is unrolled, preheated for the time noted below in Table 20 by "Black Box Heating" with infrared type heaters. The preheated film is then positioned over the preformed substrate and pulled down onto the preformed substrate. Examples 136–145 utilize vacuum lamination by drawing a vacuum through the preformed substrate, which, in turn, draws the film onto the contours of the preformed substrate. Examples 146–155 utilize plug assisted vacuum lamination whereby, in addition to the above described vacuum, a plug helps to push the preheated film from the side opposite the preformed substrate to help reduce film thinning into deep draw preformed substrates. Examples 156–165 utilize pressure lamination by applying an air pressure to the preheated film side opposite to the preformed substrate, which forces the film onto the contours of the preformed substrate. The lamination process typically takes from 5 to 100 seconds, at which time excess film is trimmed off the laminated substrate and the laminated substrate is ejected and cooled.

The preformed substrates used in examples 136–165 are as follows: A 9-inch molded "pulp plate", prepared by conventional processes. A formed frozen dinner paperboard "tray", prepared by conventional processes. A formed paperboard coffee "cup", 3.5 inches tall, prepared by conventional processes. A formed paperboard "bowl", 3 inches tall and 4 inches in diameter, prepared by conventional processes. A 9 inch "foam plate", obtained by carefully stripping off the barrier film from commercially available plates obtained from the EarthShell Company, (Stock Number PL9V00001). A 12 ounce "foam bowl", obtained by carefully stripping off the barrier film from commercially available bowls obtained from the EarthShell Company, (Stock Number BL12V0001). Hinged-lid salad and sandwich "foam containers" with a double-tab closure mechanism are obtained by carefully stripping off the barrier film from commercially available containers obtained from the EarthShell Company, (Stock Number CLS00001).

TABLE 20

| Example | Film Example | Film Preheat Time (seconds) | Preformed Substrate |
|---------|-------------|----------------------------|--------------------|
| 136 | 2 | 10 | pulp plate |
| 137 | 12 | 10 | tray |
| 138 | 30 | 20 | cup |
| 139 | 51 | 30 | bowl |
| 140 | 61 | 30 | foam plate |
| 141 | 74 | 40 | foam bowl |
| 142 | 78 | 40 | foam containers |
| 143 | 87 | 40 | pulp plate |
| 144 | 92 | 40 | tray |
| 145 | 95 | 30 | foam plate |
| 146 | 4 | 10 | cup |
| 147 | 11 | 30 | bowl |
| 148 | 32 | 30 | foam bowl |
| 149 | 52 | 30 | foam containers |
| 150 | 63 | 30 | cup |
| 151 | 75 | 40 | bowl |
| 152 | 79 | 40 | foam bowl |
| 153 | 88 | 40 | foam containers |
| 154 | 91 | 40 | cup |
| 155 | 94 | 30 | bowl |
| 156 | 8 | 25 | tray |
| 157 | 13 | 40 | cup |
| 158 | 35 | 40 | bowl |
| 159 | 54 | 20 | foam plate |
| 160 | 65 | 40 | foam bowl |
| 161 | 76 | 40 | foam containers |
| 162 | 80 | 40 | pulp plate |
| 163 | 89 | 40 | tray |
| 164 | 90 | 40 | foam plate |
| 165 | 93 | 30 | pulp plate |

I claim:

1. A sulfonated aliphatic-aromatic copolyester having a crystalline melting temperature $T_m$ and comprising an acid component, a glycol component and 0 to about 5.0 mole percent based on 100 mole % acid component of a polyfunctional branching agent selected from polyfunctional acid, glycol or mixtures thereof, wherein the acid component comprises a. about 94.9 to about 40.0 mole percent of an aromatic dicarboxylic acid component based on 100 mole percent total acid component, and b. about 5.0 to about 50.0 mole percent of an aliphatic dicarboxylic acid component based on 100 mole percent total acid component, and c. about 0.1 to about 5.0 mole percent of a sulfonate component based on 100 mole percent total acid component, and wherein the glycol component consists essentially of 1,4-butanediol.

2. The sulfonated aliphatic-aromatic copolyester of claim 1, having an inherent viscosity of at least 0.15, as measured on a 0.5 percent solution of the copolyester in a 50:50 solution of trifluoroacetic acid:dichloromethane solvent system at room temperature.

3. The sulfonated aliphatic-aromatic copolyester of claim 2, wherein said inherent viscosity is at least 0.35 dL/g.

4. The sulfonated aliphatic-aromatic copolyester of claim 1 wherein said second glycol component is selected from the group consisting of ethylene glycol, 1,3-propanediol, 1,6-hexanediol, 1,8-octanediol, 1,10-decanediol, 1,12-dodecanediol, 1,14-tetradecanediol, 1,16-hexadecanediol, dimer diol, 4,8-bis(hydroxymethyl)-tricyclo[5.2.1.0/2.6]decane, 1,4-cyclohexanedimethanol, isosorbide, di(ethylene glycol), tri(ethylene glycol), poly(alkylene ether)glycols in the molecular weight range of about 500 to about 4000, and mixtures derived therefrom.

5. The sulfonated aliphatic-aromatic copolyester of claim 1 wherein said sulfonate component is selected from the group consisting of metal salts of 5-sulfoisophthalic acid and metal salts of methyl 5-sulfoisophthalate.

6. The sulfonated aliphatic-aromatic copolyester of claim 1 wherein said aromatic dicarboxylic acid component is selected from the group consisting of: terephthalic acid, dimethyl terephthalate, bis(2-hydroxyethyl)terephthalate, bis(3-hydroxypropyl)terephthalate, bis(4-hydroxybutyl) terephthalate, isophthalic acid, dimethyl isophthalate, bis(2-hydroxyethyl)isophthalate, bis(3-hydroxypropyl)isophthalate, bis(4-hydroxybutyl)isophthalate; 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'-diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), and mixtures derived therefrom.

7. The sulfonated aliphatic-aromatic copolyester of claim 1, wherein the acid component comprises from about 80 to about 50 mole percent of said aromatic dicarboxylic acid component.

8. The sulfonated aliphatic-aromatic copolyester of claim 1, wherein said aliphatic dicarboxylic acid component is selected from the group consisting of oxalic acid, dimethyl oxalate, malonic acid, dimethyl malonate, succinic acid, dimethyl succinate, methylsuccinc acid, glutaric acid, dimethyl glutarate, bis(2-hydroxyethyl)glutarate, bis(3-hydroxypropyl)glutarate, bis(4-hydroxybutyl)glutarate, 2-methylglutaric acid, 3-methylglutaric acid, adipic acid, dimethyl adipate, bis(2-hydroxyethyl)adipate, bis(3-hydroxypropyl) adipate, bis(4-hydroxybutyl)adipate, 3-methyladipic acid, 2,2,5,5-tetramethylhexanedioic acid, pimelic acid, suberic acid, azelaic acid, dimethyl azelate, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, and mixtures derived therefrom.

9. The sulfonated aliphatic-aromatic copolyester of claim 1 wherein said aliphatic dicarboxylic acid component is selected from the group consisting of succinc acid, dimethyl succinate, glutaric acid, dimethyl glutarate, bis(2-hydroxyethyl)glutarate, bis(3-hydroxypropyl)glutarate, bis(4-hydroxybutyl)glutarate, adipic acid, dimethyl adipate, bis(2-hydroxyethyl)adipate, bis(3-hydroxypropyl)adipate, bis(4-hydroxybutyl)adipate and mixtures derived therefrom.

10. The sulfonated aliphatic-aromatic copolyester of claim 1, wherein the acid component comprises from about 20 to about 50 mole percent of said aliphatic dicarboxylic acid component.

11. The sulfonated aliphatic-aromatic copolyester of claim 1, wherein said branching agent is selected from the group consisting of: 1,2,4-benzenetricarboxylic acid; trimethyl-1,2,4-benzenetricarboxylate; tris(2-hydroxyethyl)-1,2,4-benzenetricarboxylate; tris(3-hydroxypropyl)-1,2,4-benzenetricarboxylate; tris(4-hydroxybutyl)-1,2,4-benzenetricarboxylate; 1,2,4-benzenetricarboxylic anhydride; 1,3,5-benzenetricarboxylic acid; 1,2,4,5-benzenetetracarboxylic acid; 1,2,4,5-benzenetetracarboxylic dianhydride; 3,3',4,4'-benzophenonetetracarboxylic dianhydride; 1,4,5,8-Naphthalenetetracarboxylic dianhydride; citric acid; tetrahydrofuran-2,3,4,5-tetracarboxylic acid; 1,3,5-cyclohexanetricarboxylic acid; pentaerythritol; Glycerol; 2-(hydroxymethyl)-1,3-propanediol; 2,2-bis(hydroxymethyl)propionic acid; and mixtures derived therefrom.

12. The sulfonated aliphatic-aromatic copolyester of claim 1, having an inherent viscosity of at least about 0.15 dL/g.

13. The sulfonated aliphatic-aromatic copolyester of claim 1, having an inherent viscosity of at least about 0.35 dL/g.

14. The sulfonated aliphatic-aromatic copolyester of claim 1, having an inherent viscosity of at least about 0.65 dL/g.

15. The sulfonated aliphatic-aromatic copolyester of claim 1, further comprising a filler.

16. The sulfonated aliphatic-aromatic copolyester of claim 15, wherein said filler comprises a first set of particles having a first average particle size, and a second set of particles having a second average particle size, and wherein second average particle size is at least about 2 times that of said first average particle size.

17. The sulfonated aliphatic-aromatic copolyester of claim 15, wherein said filler consists essentially of particles having an average diameter less than about 40 microns.

18. The sulfonated aliphatic-aromatic copolyester of claim 15, wherein said filler consists essentially of particles having an average diameter less than about 20 microns.

19. A blend comprising a sulfonated aliphatic-aromatic copolyester of claim 1 and at least one other polymer.

20. The blend of claim 19 wherein said other polymer is biodegradable.

21. The blend of claim 20 wherein said biodegradable polymer is selected from the group consisting of poly (hydroxy alkanoates), polycarbonates, poly(caprolactone), aliphatic polyesters, aliphatic-aromatic copolyesters, aliphatic-aromatic copolyetheresters, aliphatic-aromatic copolyamideesters, sulfonated aliphatic-aromatic copolyesters, sulfonated aliphatic-aromatic copolyetheresters, sulfonated aliphatic-aromatic copolyamideesters, and mixtures derived therefrom.

22. The blend of claim 19 wherein said other polymer is nonbiodegradable.

23. The blend of claim 19 wherein said other polymer is a natural polymer.

24. The blend of claim 23 wherein said natural polymer is a starch.

25. A shaped article formed from a sulfonated aliphatic-aromatic copolyester of claim 1.

26. A shaped article of claim 25 selected from the group consisting of films, sheets, fibers, melt blown containers, molded parts, and foamed parts.

27. A film comprising the sulfonated aliphatic-aromatic copolyester of claim 1.

28. The film of claim 27, having a thickness from about 0.025 mm to about 0.15 mm.

29. An oriented film according to claim 27.

30. The film of claim 29 wherein said film is biaxially oriented.

31. The film of claim 29 wherein said film is uniaxially oriented.

32. A multilayer film comprising a layer comprising a sulfonated aliphatic-aromatic copolyester of claim 1.

33. An article comprising a substrate and a coating on said substrate, said coating comprising an aliphatic-aromatic copolyetherester of claim 1.

34. The article of claim 33 wherein said coating has a thickness from about 0.2 to about 15 mils.

35. The article of claim 33 wherein said coating has a thickness from about 0.5 to about 2 mils.

36. The article of claim 33 wherein said substrate is selected from the group consisting of textiles, nonwovens, foil, paper, paperboard, and metals.

37. An article comprising a substrate having laminated thereon a sulfonated aliphatic-aromatic copolyester of claim 1.

38. The article of claim 37 wherein said substrate is selected from the group consisting of paper, paperboard, cardboard, fiberboard, cellulose, starch, plastic, polystyrene foam, glass, metals, polymeric foams, organic foams, inorganic foams, organic-inorganic foams, and polymeric films.

39. A package comprising an article of claim 37.

40. A wrap comprising a sulfonated aliphatic-aromatic copolyester of claim 1.

41. A sheet comprising a sulfonated aliphatic-aromatic copolyester of claim 1.

42. The sheet of claim 41, having a thickness of at least about 0.50 mm.

43. A fiber comprising a sulfonated aliphatic-aromatic copolyester of claim 1.

44. The fiber of claim 43 having a denier from about 0.1 to about 100.

45. The fiber of claim 43 having a denier from about 0.5 to 20.

46. A fiber comprising a sulfonated aliphatic-aromatic copolyester of claim 1 and at least one other polymer.

47. The fiber of claim 43 wherein said fiber comprises a blend of said sulfonated aliphatic-aromatic copolyester and one or more natural fibers.

48. The fiber of claim 43 wherein said fiber is a heterogeneous fiber.

49. A foamed article comprising a sulfonated aliphatic-aromatic copolyester of claim 15.

50. A shaped article formed from a sulfonated aliphatic-aromatic copolyester of claim 15.

51. A shaped article of claim 50 selected from the group consisting of films, sheets, fiber, melt blown containers, molded parts, and foamed parts.

52. A film comprising a sulfonated aliphatic-aromatic copolyester of claim 15.

53. The film of claim 52, having a thickness from about 0.025 mm to about 0.15 mm.

54. An oriented film according to claim 52.

55. A multilayer film comprising a layer comprising a sulfonated aliphatic-aromatic copolyester of claim 15.

56. An article comprising a substrate and a coating on said substrate, said coating comprising a sulfonated aliphatic-aromatic copolyester of claim 15.

57. An article comprising a substrate having laminated thereon a sulfonated aliphatic-aromatic copolyester of claim 15.

58. A wrap comprising a sulfonated aliphatic-aromatic copolyester of claim 15.

59. A sheet comprising a sulfonated aliphatic-aromatic copolyester of claim 15.

60. A foamed article comprising a sulfonated aliphatic-aromatic copolyester of claim 19.

61. A shaped article formed from a sulfonated aliphatic-aromatic copolyester of claim 19.

62. A shaped article of claim 61 selected from the group consisting of films, sheets, fiber, melt blown containers, molded parts, and foamed parts.

63. A film comprising a sulfonated aliphatic-aromatic copolyester of claim 19.

64. The film of claim 63, having a thickness from about 0.025 mm to about 0.15 mm.

65. An oriented film according to claim 63.

66. A multilayer film comprising a layer comprising a sulfonated aliphatic-aromatic copolyester of claim 19.

67. An article comprising a substrate and a coating on said substrate, said coating comprising a sulfonated aliphatic-aromatic copolyester of claim 19.

68. An article comprising a substrate having laminated thereon a sulfonated aliphatic-aromatic copolyester of claim 19.

69. A wrap comprising a sulfonated aliphatic-aromatic copolyester of claim 19.

70. A sheet comprising a sulfonated aliphatic-aromatic copolyester of claim 19.

71. A foamed article comprising a sulfonated aliphatic-aromatic copolyester of claim 19.

72. A shaped article formed from a sulfonated aliphatic-aromatic copolyester of claim 19.

73. A shaped article of claim 72 selected from the group consisting of films, sheets, fiber, melt blown containers, molded parts, and foamed parts.

74. A film comprising a sulfonated aliphatic-aromatic copolyester of claim 19.

75. The film of claim 74, having a thickness from about 0.025 mm to about 0.15 mm.

76. An oriented film according to claim 75.

77. A multilayer film comprising a layer comprising a sulfonated aliphatic-aromatic copolyester of claim 19.

78. An article comprising a substrate and a coating on said substrate, said coating comprising a sulfonated aliphatic-aromatic copolyester of claim 19.

79. An article comprising a substrate having laminated thereon a sulfonated aliphatic-aromatic copolyester of claim 19.

80. A wrap comprising a sulfonated aliphatic-aromatic copolyester of claim 19.

81. A sheet comprising a sulfonated aliphatic-aromatic copolyester of claim 19.

82. A foamed article comprising a sulfonated aliphatic-aromatic copolyester of claim 23.

83. A shaped article formed from a sulfonated aliphatic-aromatic copolyester of claim 23.

84. A shaped article of claim 83 selected from the group consisting of films, sheets, fiber, melt blown containers, molded parts, and foamed parts.

85. A film comprising a sulfonated aliphatic-aromatic copolyester of claim 23.

86. The film of claim 85, having a thickness from about 0.025 mm to about 0.15 mm.

87. An oriented film according to claim 85.

88. A multilayer film comprising a layer comprising a sulfonated aliphatic-aromatic copolyester of claim 23.

89. An article comprising a substrate and a coating on said substrate, said coating comprising a sulfonated aliphatic-aromatic copolyester of claim 23.

90. An article comprising a substrate having laminated thereon a sulfonated aliphatic-aromatic copolyester of claim 23.

91. A wrap comprising a sulfonated aliphatic-aromatic copolyester of claim 23.

92. A sheet comprising a sulfonated aliphatic-aromatic copolyester of claim 23.

93. A process for producing a package, comprising providing a substrate; forming said substrate into a desired package form; and laminating or coating said substrate with a sulfonated aliphatic-aromatic copolyester to form said package, wherein said sulfonated aliphatic-aromatic copolyaster has a crystalline melting temperature $T_m$ and consists essentially of an acid component, a glycol component, and 0 to about 5.0 mole percent based on 100 mole % acid component of a polyfunctional branching agent selected from polyfunctional acid, glycol or mixtures thereot wherein the acid component comprises
   a. about 94.9 to about 40.0 mole percent of an aromatic dicarboxylic acid component based on 100 mole percent total acid component, and
   b. about 5.0 to about 50.0 mole percent of an aliphatic dicarboxylic acid component based on 100 mole percent total acid component, and
   c. about 0.1 to about 5.0 mole percent of a sultonate component based on 100 mole percent total acid component, and wherein
   the glycol component consists essentially.

94. The process of claim 93 wherein said substrate comprises a material selected from the group consisting of paper, paperboard, inorganic foams, organic foams, and inorganic-organic foams.

95. The process of claim 93 wherein said package form is selected from the group consisting of wrappers, stretch wrap films, bags, cups, trays, cartons, boxes, bottles, crates, packaging films, blister pack wrappers, skin packaging, and hinged containers.

96. A process for producing a sulfonated aliphatic-aromatic copolyester having a crystalline melting temperature $T_m$, said process comprising providing a reaction mixture comprising an aromatic dicarboxylic component an aliphatic dicarboxylic acid component, a sulfonate component, a glycol component consisting essentially of 1,4-butanediol, and optionally a polyfunctional branching agent; and allowing said aromatic dicarboxylic acid component said aliphatic dicarboxylic acid component, said sulfonate component, said glycol component, and said polyfunctional branching agent to polymerize to form a sulfonated aliphatic-aromatic copolyester comprising an acid component, and a glycol component, wherein the acid component comprises
   a. about 94.9 to about 40.0 mole percent of an aromatic dicarboxylic acid component based on 100 mole percent total acid component, and
   b. about 5.0 to about 50.0 mole percent of an aliphatic dicarboxylic acid component based on 100 mole percent total acid component, and
   about 0.1 to about 5.0 mole percent of a sulfonate component based on 100 mole percent total acid component.

97. The process of claim 96, comprising providing said second glycol component in a quantity such that the glycol component of said polyester comprises up to 5.0 mole percent of said second glycol component, based on the total of said first glycol component and said second glycol component.

98. The process of claim 96, comprising providing said polyfunctional branching agent in a quantity such that said polyester comprises up to 5.0 mole percent of said polyfunctional branching agent, based on the total of said first glycol component, said second glycol component, and said polyfunctional branching agent.

* * * * *